(12) United States Patent
Rajagopal et al.

(10) Patent No.: US 12,724,647 B1
(45) Date of Patent: Sep. 1, 2026

(54) ON-DEMAND CODE EXECUTION COMPUTING RESOURCE MANAGEMENT

(71) Applicant: Amazon Technologies, Inc., Seattle, WA (US)

(72) Inventors: Hari Ohm Prasath Rajagopal, Tracy, CA (US); Prashant Kumar Singh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 376 days.

(21) Appl. No.: 18/478,028

(22) Filed: Sep. 29, 2023

(51) Int. Cl.
*G06F 9/50* (2006.01)

(52) U.S. Cl.
CPC .......... *G06F 9/5077* (2013.01); *G06F 9/5027* (2013.01)

(58) Field of Classification Search
None
See application file for complete search history.

(56) References Cited

U.S. PATENT DOCUMENTS

| | | | |
|---|---|---|---|
| 4,949,254 | A | 8/1990 | Shorter |
| 5,283,888 | A | 2/1994 | Dao et al. |
| 5,835,764 | A | 11/1998 | Platt et al. |
| 5,970,488 | A | 10/1999 | Crowe et al. |
| 5,983,197 | A | 11/1999 | Enta |
| 6,237,005 | B1 | 5/2001 | Griffin |
| 6,260,058 | B1 | 7/2001 | Hoenninger et al. |
| 6,385,636 | B1 | 5/2002 | Suzuki |
| 6,463,509 | B1 | 10/2002 | Teoman et al. |
| 6,501,736 | B1 | 12/2002 | Smolik et al. |

(Continued)

FOREIGN PATENT DOCUMENTS

| | | | |
|---|---|---|---|
| CA | 2975522 | A1 | 8/2016 |
| CN | 1341238 | A | 3/2002 |

(Continued)

OTHER PUBLICATIONS

Anonymous: "Amazon Elastic Compute Cloud User Guide for Linux Instances—first 400 pages of 795," Apr. 8, 2016 (Apr. 8, 2016, XP055946665, Retrieved from the Internet: URL:https://web.archive.org/web/20160408211543if_/http://docs.aws.amazon.com/AWSEC2/latest/UserGuide/ec2-ug.pdf (retrieved on Jul. 27, 2022] 795 pages.

(Continued)

*Primary Examiner* — Mustafa A Amin
(74) *Attorney, Agent, or Firm* — Knobbe, Martens, Olson & Bear, LLP

(57) ABSTRACT

Systems and methods are provided for an on-demand code execution service configured to receive, from a virtual computing component executing on a host computing device, a communication that a first process of an application of the virtual computing component has completed execution, wherein the virtual computing component is allotted a set of computing resources for execution; send, to the virtual computing component, a notification indicating that a computing resource allotted to the virtual computing component will be de-allocated; receive, from the virtual computing component, a request to delay de-allocation of the computing resource, wherein a second process of the application executes subsequent the virtual computing component sending the communication; and delay de-allocation of the computing resource based on the request from the virtual computing component.

20 Claims, 11 Drawing Sheets

(56) References Cited

U.S. PATENT DOCUMENTS 6,523,035 B1 2/2003 Fleming et al.
6,549,936 B1 4/2003 Hirabayashi
6,708,276 B1 3/2004 Yarsa et al.
7,036,121 B1 4/2006 Casabona et al.
7,308,463 B2 12/2007 Taulbee et al.
7,340,522 B1 3/2008 Basu et al.
7,360,215 B2 4/2008 Kraiss et al.
7,558,719 B1 7/2009 Donlin
7,577,722 B1 8/2009 Khandekar et al.
7,590,806 B2 9/2009 Harris et al.
7,640,574 B1 12/2009 Kim et al.
7,665,090 B1 2/2010 Tormasov et al.
7,707,579 B2 4/2010 Rodriguez
7,730,464 B2 6/2010 Trowbridge
7,774,191 B2 8/2010 Berkowitz et al.
7,823,186 B2 10/2010 Pouliot
7,831,464 B1 11/2010 Nichols et al.
7,870,153 B2 1/2011 Croft et al.
7,886,021 B2 2/2011 Scheifler et al.
7,949,677 B2 5/2011 Croft et al.
7,954,150 B2 5/2011 Croft et al.
8,010,679 B2 8/2011 Low et al.
8,010,990 B2 8/2011 Ferguson et al.
8,024,564 B2 9/2011 Bassani et al.
8,046,765 B2 10/2011 Cherkasova et al.
8,051,180 B2 11/2011 Mazzaferri et al.
8,051,266 B2 11/2011 DeVal et al.
8,065,676 B1 11/2011 Sahai et al.
8,065,682 B2 11/2011 Baryshnikov et al.
8,095,931 B1 1/2012 Chen et al.
8,117,356 B1 2/2012 Narad
8,127,284 B2 2/2012 Meijer et al.
8,146,073 B2 3/2012 Sinha
8,166,304 B2 4/2012 Murase et al.
8,171,473 B2 5/2012 Lavin
8,201,026 B1 6/2012 Bornstein et al.
8,209,695 B1 6/2012 Pruyne et al.
8,219,987 B1 7/2012 Vlaovic et al.
8,296,267 B2 10/2012 Cahill et al.
8,321,554 B2 11/2012 Dickinson
8,321,558 B1 11/2012 Sirota et al.
8,336,079 B2 12/2012 Budko et al.
8,352,608 B1 1/2013 Keagy et al.
8,387,075 B1 2/2013 McCann et al.
8,392,558 B1 3/2013 Ahuja et al.
8,402,514 B1 3/2013 Thompson et al.
8,417,723 B1 4/2013 Lissack et al.
8,429,282 B1 4/2013 Ahuja
8,448,165 B1 5/2013 Conover
8,479,195 B2 7/2013 Adams et al.
8,490,088 B2 7/2013 Tang
8,495,631 B2 7/2013 Waldspurger et al.
8,555,281 B1 10/2013 Van Dijk et al.
8,560,699 B1 10/2013 Theimer et al.
8,566,835 B2 10/2013 Wang et al.
8,601,323 B2 12/2013 Tsantilis
8,613,070 B1 12/2013 Borzycki et al.
8,615,589 B1 12/2013 Adogla et al.
8,631,130 B2 1/2014 Jackson
8,667,471 B2 3/2014 Wintergerst et al.
8,677,359 B1 3/2014 Cavage et al.
8,694,996 B2 4/2014 Cawlfield et al.
8,700,768 B2 4/2014 Benari
8,713,093 B1 4/2014 Upadhyay et al.
8,719,415 B1 5/2014 Sirota et al.
8,725,702 B1 5/2014 Raman et al.
8,756,322 B1 6/2014 Lynch
8,756,696 B1 6/2014 Miller
8,763,091 B1 6/2014 Singh et al.
8,769,519 B2 7/2014 Leitman et al.
8,793,676 B2 7/2014 Quinn et al.
8,799,236 B1 8/2014 Azari et al.
8,799,879 B2 8/2014 Wright et al.
8,806,266 B1 8/2014 Qu et al.
8,806,468 B2 8/2014 Meijer et al.
8,806,644 B1 8/2014 McCorkendale et al.
8,819,679 B2 8/2014 Agarwal et al.
8,825,863 B2 9/2014 Hansson et al.
8,825,964 B1 9/2014 Sopka et al.
8,839,035 B1 9/2014 Dimitrovich et al.
8,850,432 B2 9/2014 Mcgrath et al.
8,869,300 B2 10/2014 Singh et al.
8,874,952 B2 10/2014 Tameshige et al.
8,904,008 B2 12/2014 Calder et al.
8,949,457 B1 2/2015 Theroux et al.
8,966,495 B2 2/2015 Kulkarni
8,972,980 B2 3/2015 Banga et al.
8,990,807 B2 3/2015 Wu et al.
8,997,093 B2 3/2015 Dimitrov
9,002,871 B2 4/2015 Bulkowski et al.
9,021,501 B2 4/2015 Li et al.
9,026,658 B2 5/2015 Xu et al.
9,027,087 B2 5/2015 Ishaya et al.
9,038,068 B2 5/2015 Engle et al.
9,052,935 B1 6/2015 Rajaa
9,086,897 B2 7/2015 Oh et al.
9,086,924 B2 7/2015 Barsness et al.
9,092,837 B2 7/2015 Bala et al.
9,098,528 B2 8/2015 Wang
9,104,477 B2 8/2015 Kodialam et al.
9,110,732 B1 8/2015 Forschmiedt et al.
9,110,770 B1 8/2015 Raju et al.
9,111,037 B1 8/2015 Nalis et al.
9,112,813 B2 8/2015 Jackson
9,116,733 B2 8/2015 Banga et al.
9,130,900 B2 9/2015 Tran
9,141,410 B2 9/2015 Leafe et al.
9,141,947 B1 9/2015 Furr et al.
9,146,764 B1 9/2015 Wagner
9,152,406 B2 10/2015 De et al.
9,154,955 B1 10/2015 Bertz et al.
9,164,754 B1 10/2015 Pohlack
9,176,871 B1 11/2015 Serlet
9,183,019 B2 11/2015 Kruglick
9,189,778 B1 11/2015 Sh. Al-Rashidi
9,195,520 B2 11/2015 Turk
9,208,007 B2 12/2015 Harper et al.
9,218,190 B2 12/2015 Anand et al.
9,223,561 B2 12/2015 Orveillon et al.
9,223,966 B1 12/2015 Satish et al.
9,250,893 B2 2/2016 Blahaerath et al.
9,268,586 B2 2/2016 Voccio et al.
9,298,633 B1 3/2016 Zhao et al.
9,317,689 B2 4/2016 Aissi
9,323,556 B2 4/2016 Wagner
9,361,145 B1 6/2016 Wilson et al.
9,389,921 B2 7/2016 Muppirala et al.
9,405,582 B2 8/2016 Fuller et al.
9,411,645 B1 8/2016 Duan et al.
9,413,626 B2 8/2016 Reque et al.
9,417,918 B2 8/2016 Chin et al.
9,430,290 B1 8/2016 Gupta et al.
9,436,555 B2 9/2016 Dornemann et al.
9,461,996 B2 10/2016 Hayton et al.
9,471,775 B1 10/2016 Wagner et al.
9,471,776 B2 10/2016 Gu et al.
9,483,335 B1 11/2016 Wagner et al.
9,489,227 B2 11/2016 Oh et al.
9,497,136 B1 11/2016 Ramarao et al.
9,501,345 B1 11/2016 Lietz et al.
9,514,037 B1 12/2016 Dow et al.
9,537,788 B2 1/2017 Reque et al.
9,563,613 B1 2/2017 Dinkel et al.
9,565,190 B1 2/2017 Telvik et al.
9,575,798 B2 2/2017 Terayama et al.
9,588,790 B1 3/2017 Wagner et al.
9,594,590 B2 3/2017 Hsu
9,596,350 B1 3/2017 Dymshyts et al.
9,600,312 B2 3/2017 Wagner et al.
9,613,127 B1 4/2017 Rus et al.
9,626,204 B1 4/2017 Banga et al.
9,628,332 B2 4/2017 Bruno, Jr. et al.
9,635,132 B1 4/2017 Lin et al.
9,652,306 B1 5/2017 Wagner et al.

(56) References Cited

U.S. PATENT DOCUMENTS 9,652,617 B1 5/2017 Evans et al.
9,654,508 B2 5/2017 Barton et al.
9,661,011 B1 5/2017 Van Horenbeeck et al.
9,678,773 B1 6/2017 Wagner et al.
9,678,778 B1 6/2017 Youseff
9,703,681 B2 7/2017 Taylor et al.
9,715,402 B2 7/2017 Wagner et al.
9,720,661 B2 8/2017 Gschwind et al.
9,720,662 B2 8/2017 Gschwind et al.
9,727,725 B2 8/2017 Wagner et al.
9,733,967 B2 8/2017 Wagner et al.
9,760,387 B2 9/2017 Wagner et al.
9,760,443 B2 9/2017 Tarasuk-Levin et al.
9,767,271 B2 9/2017 Ghose
9,785,476 B2 10/2017 Wagner et al.
9,787,779 B2 10/2017 Frank et al.
9,798,831 B2 10/2017 Chattopadhyay et al.
9,799,017 B1 10/2017 Vermeulen et al.
9,811,363 B1 11/2017 Wagner
9,811,434 B1 11/2017 Wagner
9,817,695 B2 11/2017 Clark
9,830,175 B1 11/2017 Wagner
9,830,193 B1 11/2017 Wagner et al.
9,830,449 B1 11/2017 Wagner
9,864,636 B1 1/2018 Patel et al.
9,898,393 B2 2/2018 Moorthi et al.
9,910,713 B2 3/2018 Wisniewski et al.
9,921,864 B2 3/2018 Singaravelu et al.
9,928,108 B1 3/2018 Wagner et al.
9,929,916 B1 3/2018 Subramanian et al.
9,930,103 B2 3/2018 Thompson
9,930,133 B2 3/2018 Susarla et al.
9,952,896 B2 4/2018 Wagner et al.
9,977,691 B2 5/2018 Marriner et al.
9,979,817 B2 5/2018 Huang et al.
9,983,982 B1 5/2018 Kumar et al.
10,002,026 B1 6/2018 Wagner
10,002,036 B2 6/2018 Fuchs et al.
10,013,267 B1 7/2018 Wagner et al.
10,042,660 B2 8/2018 Wagner et al.
10,048,974 B1 8/2018 Wagner et al.
10,061,613 B1 8/2018 Brooker et al.
10,067,801 B1 9/2018 Wagner
10,102,040 B2 10/2018 Marriner et al.
10,108,443 B2 10/2018 Wagner et al.
10,139,876 B2 11/2018 Lu et al.
10,140,137 B2 11/2018 Wagner
10,146,635 B1 12/2018 Chai et al.
10,162,655 B2 12/2018 Tuch et al.
10,162,672 B2 12/2018 Wagner et al.
10,162,688 B2 12/2018 Wagner
10,191,861 B1 1/2019 Steinberg
10,193,839 B2 1/2019 Tandon et al.
10,198,298 B2 2/2019 Bishop et al.
10,203,990 B2 2/2019 Wagner et al.
10,248,467 B2 4/2019 Wisniewski et al.
10,255,090 B2 4/2019 Tuch et al.
10,277,708 B2 4/2019 Wagner et al.
10,282,229 B2 5/2019 Wagner et al.
10,303,492 B1 5/2019 Wagner et al.
10,303,576 B1 5/2019 Seymour et al.
10,318,347 B1 6/2019 Wagner
10,331,462 B1 6/2019 Varda et al.
10,346,625 B2 7/2019 Anderson et al.
10,353,678 B1 7/2019 Wagner
10,353,746 B2 7/2019 Reque et al.
10,360,025 B2 7/2019 Foskett et al.
10,360,067 B1 7/2019 Wagner
10,365,985 B2 7/2019 Wagner
10,387,177 B2 8/2019 Wagner et al.
10,402,231 B2 9/2019 Marriner et al.
10,423,158 B1 9/2019 Hadlich
10,437,629 B2 10/2019 Wagner et al.
10,445,140 B1 10/2019 Sagar et al.
10,452,441 B1 10/2019 Subramanian et al.
10,459,822 B1 10/2019 Gondi
10,496,547 B1 12/2019 Naenko et al.
10,503,626 B2 12/2019 Idicula et al.
10,528,390 B2 1/2020 Brooker et al.
10,531,226 B1 1/2020 Wang et al.
10,552,193 B2 2/2020 Wagner et al.
10,552,442 B1 2/2020 Lusk et al.
10,564,946 B1 2/2020 Wagner et al.
10,572,375 B1 2/2020 Wagner
10,592,269 B2 3/2020 Wagner et al.
10,608,973 B2 3/2020 Kuo et al.
10,615,984 B1 4/2020 Wang
10,623,476 B2 4/2020 Thompson
10,637,817 B2 4/2020 Kuo et al.
10,649,749 B1 5/2020 Brooker et al.
10,649,792 B1 5/2020 Kulchytskyy et al.
10,650,156 B2 5/2020 Anderson et al.
10,652,350 B2 5/2020 Wozniak
10,678,522 B1 6/2020 Yerramreddy et al.
10,686,605 B2 6/2020 Chhabra et al.
10,691,498 B2 6/2020 Wagner
10,713,080 B1 7/2020 Brooker et al.
10,719,367 B1 7/2020 Kim et al.
10,725,752 B1 7/2020 Wagner et al.
10,725,826 B1 7/2020 Sagar et al.
10,732,951 B2 8/2020 Jayanthi et al.
10,733,085 B1 8/2020 Wagner
10,740,149 B2 8/2020 Bogineni et al.
10,754,701 B1 8/2020 Wagner
10,776,091 B1 9/2020 Wagner et al.
10,776,171 B2 9/2020 Wagner et al.
10,817,331 B2 10/2020 Mullen et al.
10,824,484 B2 11/2020 Wagner et al.
10,831,898 B1 11/2020 Wagner
10,846,117 B1 11/2020 Steinberg
10,853,112 B2 12/2020 Wagner et al.
10,853,115 B2 12/2020 Mullen et al.
10,884,722 B2 1/2021 Brooker et al.
10,884,787 B1 1/2021 Wagner et al.
10,884,802 B2 1/2021 Wagner et al.
10,884,812 B2 1/2021 Brooker et al.
10,891,145 B2 1/2021 Wagner et al.
10,915,371 B2 2/2021 Wagner et al.
10,942,795 B1 3/2021 Yanacek et al.
10,949,237 B2 3/2021 Piwonka et al.
10,956,185 B2 3/2021 Wagner
10,956,244 B1 3/2021 Cho
10,972,534 B2 * 4/2021 Stephens ............. H04L 67/1023
11,010,188 B1 5/2021 Brooker et al.
11,016,815 B2 5/2021 Wisniewski et al.
11,044,198 B1 6/2021 Ahn et al.
11,082,333 B1 8/2021 Lam et al.
11,099,870 B1 8/2021 Brooker et al.
11,099,917 B2 8/2021 Hussels et al.
11,115,404 B2 9/2021 Siefker et al.
11,119,809 B1 9/2021 Brooker et al.
11,119,813 B1 9/2021 Kasaragod
11,119,826 B2 9/2021 Yanacek et al.
11,126,469 B2 9/2021 Reque et al.
11,132,213 B1 9/2021 Wagner
11,146,569 B1 10/2021 Brooker et al.
11,159,528 B2 10/2021 Siefker et al.
11,188,391 B1 11/2021 Sule
11,190,609 B2 11/2021 Siefker et al.
11,231,955 B1 1/2022 Shahane et al.
11,243,819 B1 2/2022 Wagner
11,243,953 B2 2/2022 Wagner et al.
11,263,034 B2 3/2022 Wagner et al.
11,272,015 B2 3/2022 Thum et al.
11,314,547 B1 4/2022 Tang et al.
11,327,992 B1 5/2022 Batsakis et al.
11,354,169 B2 6/2022 Marriner et al.
11,360,793 B2 6/2022 Wagner et al.
11,392,497 B1 7/2022 Brooker et al.
11,394,636 B1 7/2022 Walker et al.
11,411,771 B1 8/2022 Dawani et al.
11,461,124 B2 10/2022 Wagner et al.
11,467,890 B2 10/2022 Wagner
11,550,713 B1 1/2023 Piwonka et al.

(56) References Cited

U.S. PATENT DOCUMENTS 11,561,811 B2 1/2023 Wagner
11,593,270 B1 2/2023 Brooker et al.
11,656,892 B1 5/2023 Harris et al.
11,714,675 B2 8/2023 Brooker et al.
11,778,053 B1 10/2023 Allen
11,816,504 B2 11/2023 Bogineni et al.
11,843,517 B1 12/2023 Prateek et al.
11,966,303 B2 4/2024 Mason et al.
11,966,308 B2 4/2024 Hicks et al.
12,056,515 B1 8/2024 Mills et al.
12,063,166 B1 8/2024 Samba et al.
12,081,629 B1 9/2024 Wei et al.
12,177,110 B1 12/2024 Choudhry et al.
12,381,878 B1 8/2025 Gupta et al.
12,476,978 B2 11/2025 Rajagopal et al.
2001/0044817 A1 11/2001 Asano et al.
2002/0083012 A1 6/2002 Bush et al.
2002/0120685 A1 8/2002 Srivastava et al.
2002/0172273 A1 11/2002 Baker et al.
2003/0071842 A1 4/2003 King et al.
2003/0084434 A1 5/2003 Ren
2003/0149801 A1 8/2003 Kushnirskiy
2003/0177186 A1 9/2003 Goodman et al.
2003/0191795 A1 10/2003 Bernardin et al.
2003/0208569 A1 11/2003 O'Brien et al.
2003/0229794 A1 12/2003 James, II et al.
2004/0003087 A1 1/2004 Chambliss et al.
2004/0019886 A1 1/2004 Berent et al.
2004/0044721 A1 3/2004 Song et al.
2004/0049768 A1 3/2004 Matsuyama et al.
2004/0098154 A1 5/2004 McCarthy
2004/0158551 A1 8/2004 Santosuosso
2004/0205493 A1 10/2004 Simpson et al.
2004/0249947 A1 12/2004 Novaes et al.
2004/0268358 A1 12/2004 Darling et al.
2005/0027611 A1 2/2005 Wharton
2005/0044301 A1 2/2005 Vasilevsky et al.
2005/0120160 A1 6/2005 Plouffe et al.
2005/0132167 A1 6/2005 Longobardi
2005/0132368 A1 6/2005 Sexton et al.
2005/0149535 A1 7/2005 Frey et al.
2005/0193113 A1 9/2005 Kokusho et al.
2005/0193283 A1 9/2005 Reinhardt et al.
2005/0237948 A1 10/2005 Wan et al.
2005/0257051 A1 11/2005 Richard
2005/0262183 A1 11/2005 Colrain et al.
2005/0262512 A1 11/2005 Schmidt et al.
2006/0010440 A1 1/2006 Anderson et al.
2006/0015740 A1 1/2006 Kramer
2006/0031448 A1 2/2006 Chu et al.
2006/0036941 A1 2/2006 Neil
2006/0080678 A1 4/2006 Bailey et al.
2006/0123066 A1 6/2006 Jacobs et al.
2006/0129684 A1 6/2006 Datta
2006/0155800 A1 7/2006 Matsumoto
2006/0168174 A1 7/2006 Gebhart et al.
2006/0184669 A1 8/2006 Vaidyanathan et al.
2006/0200668 A1 9/2006 Hybre et al.
2006/0212332 A1 9/2006 Jackson
2006/0218601 A1 9/2006 Michel
2006/0242647 A1 10/2006 Kimbrel et al.
2006/0242709 A1 10/2006 Seinfeld et al.
2006/0248195 A1 11/2006 Toumura et al.
2006/0259763 A1 11/2006 Cooperstein et al.
2006/0282330 A1 12/2006 Frank et al.
2006/0288120 A1 12/2006 Hoshino et al.
2007/0033085 A1 2/2007 Johnson
2007/0050779 A1 3/2007 Hayashi
2007/0067321 A1 3/2007 Bissett et al.
2007/0076244 A1 4/2007 Suzuki et al.
2007/0094396 A1 4/2007 Takano et al.
2007/0101325 A1 5/2007 Bystricky et al.
2007/0112864 A1 5/2007 Ben-Natan
2007/0130341 A1 6/2007 Ma
2007/0174419 A1 7/2007 O'Connell et al.
2007/0180449 A1 8/2007 Croft et al.
2007/0180450 A1 8/2007 Croft et al.
2007/0180493 A1 8/2007 Croft et al.
2007/0186212 A1 8/2007 Mazzaferri et al.
2007/0192082 A1 8/2007 Gaos et al.
2007/0192329 A1 8/2007 Croft et al.
2007/0198656 A1 8/2007 Mazzaferri et al.
2007/0199000 A1 8/2007 Shekhel et al.
2007/0220009 A1 9/2007 Morris et al.
2007/0226700 A1 9/2007 Gal et al.
2007/0240160 A1 10/2007 Paterson-Jones
2007/0255604 A1 11/2007 Seelig
2007/0300297 A1 12/2007 Dawson et al.
2008/0028409 A1 1/2008 Cherkasova et al.
2008/0052401 A1 2/2008 Bugenhagen et al.
2008/0052725 A1 2/2008 Stoodley et al.
2008/0082977 A1 4/2008 Araujo et al.
2008/0104247 A1 5/2008 Venkatakrishnan et al.
2008/0104608 A1 5/2008 Hyser et al.
2008/0115143 A1 5/2008 Shimizu et al.
2008/0126110 A1 5/2008 Haeberle et al.
2008/0126486 A1 5/2008 Heist
2008/0127125 A1 5/2008 Anckaert et al.
2008/0147893 A1 6/2008 Marripudi et al.
2008/0178278 A1 7/2008 Grinstein et al.
2008/0184340 A1 7/2008 Nakamura et al.
2008/0189468 A1 8/2008 Schmidt et al.
2008/0195369 A1 8/2008 Duyanovich et al.
2008/0201568 A1 8/2008 Quinn et al.
2008/0201711 A1 8/2008 Amir Husain
2008/0209423 A1 8/2008 Hirai
2008/0244547 A1 10/2008 Wintergerst et al.
2008/0288940 A1 11/2008 Adams et al.
2008/0307098 A1 12/2008 Kelly
2009/0006897 A1 1/2009 Sarsfield
2009/0013153 A1 1/2009 Hilton
2009/0018892 A1 1/2009 Grey et al.
2009/0025009 A1 1/2009 Brunswig et al.
2009/0034537 A1 2/2009 Colrain et al.
2009/0055810 A1 2/2009 Kondur
2009/0055829 A1 2/2009 Gibson
2009/0070355 A1 3/2009 Cadarette et al.
2009/0077569 A1 3/2009 Appleton et al.
2009/0125902 A1 5/2009 Ghosh et al.
2009/0158275 A1 6/2009 Wang et al.
2009/0158407 A1 6/2009 Nicodemus et al.
2009/0177860 A1 7/2009 Zhu et al.
2009/0183162 A1 7/2009 Kindel et al.
2009/0193410 A1 7/2009 Arthursson et al.
2009/0198769 A1 8/2009 Keller et al.
2009/0204960 A1 8/2009 Ben-yehuda et al.
2009/0204964 A1 8/2009 Foley et al.
2009/0222922 A1 9/2009 Sidiroglou et al.
2009/0271472 A1 10/2009 Scheifler et al.
2009/0288084 A1 11/2009 Astete et al.
2009/0300151 A1 12/2009 Friedman et al.
2009/0300599 A1 12/2009 Piotrowski
2009/0307430 A1 12/2009 Bruening et al.
2010/0023940 A1 1/2010 Iwamatsu et al.
2010/0031274 A1 2/2010 Sim-Tang
2010/0031325 A1 2/2010 Maigne et al.
2010/0036925 A1 2/2010 Haffner
2010/0037031 A1 2/2010 DeSantis et al.
2010/0058342 A1 3/2010 Machida
2010/0058351 A1 3/2010 Yahagi
2010/0064299 A1 3/2010 Kacin et al.
2010/0070678 A1 3/2010 Zhang et al.
2010/0070725 A1 3/2010 Prahlad et al.
2010/0083036 A1* 4/2010 Calinoiu ............... G06F 11/366
714/2
2010/0083048 A1 4/2010 Calinoiu et al.
2010/0083248 A1 4/2010 Wood et al.
2010/0094816 A1 4/2010 Groves, Jr. et al.
2010/0106926 A1 4/2010 Kandasamy et al.
2010/0114825 A1 5/2010 Siddegowda
2010/0115098 A1 5/2010 De Baer et al.
2010/0122343 A1 5/2010 Ghosh
2010/0131936 A1 5/2010 Cheriton
2010/0131959 A1 5/2010 Spiers et al.

(56) References Cited

U.S. PATENT DOCUMENTS

2010/0146004 A1 6/2010 Sim-Tang
2010/0169477 A1 7/2010 Stienhans et al.
2010/0186011 A1 7/2010 Magenheimer
2010/0198972 A1 8/2010 Umbehocker
2010/0199285 A1 8/2010 Medovich
2010/0257116 A1 10/2010 Mehta et al.
2010/0257269 A1 10/2010 Clark
2010/0269109 A1 10/2010 Cartales
2010/0298011 A1 11/2010 Pelley et al.
2010/0299541 A1 11/2010 Ishikawa et al.
2010/0312871 A1 12/2010 Desantis et al.
2010/0325727 A1 12/2010 Neystadt et al.
2010/0329149 A1 12/2010 Singh et al.
2010/0329643 A1 12/2010 Kuang
2011/0004687 A1 1/2011 Takemura
2011/0010690 A1 1/2011 Howard et al.
2011/0010722 A1 1/2011 Matsuyama
2011/0023026 A1 1/2011 Oza
2011/0029970 A1 2/2011 Arasaratnam
2011/0029984 A1 2/2011 Norman et al.
2011/0035785 A1 2/2011 Mihara
2011/0040812 A1 2/2011 Phillips
2011/0055378 A1 3/2011 Ferris et al.
2011/0055396 A1 3/2011 DeHaan
2011/0055683 A1 3/2011 Jiang
2011/0078679 A1 3/2011 Bozek et al.
2011/0099204 A1 4/2011 Thaler
2011/0099551 A1 4/2011 Fahrig et al.
2011/0131572 A1 6/2011 Elyashev et al.
2011/0134761 A1 6/2011 Smith
2011/0141124 A1 6/2011 Halls et al.
2011/0153541 A1 6/2011 Koch et al.
2011/0153727 A1 6/2011 Li
2011/0153838 A1 6/2011 Belkine et al.
2011/0154353 A1 6/2011 Theroux et al.
2011/0173637 A1 7/2011 Brandwine et al.
2011/0179162 A1 7/2011 Mayo et al.
2011/0184993 A1 7/2011 Chawla et al.
2011/0208866 A1 8/2011 Marmolejo-Meillon et al.
2011/0225277 A1 9/2011 Freimuth et al.
2011/0231680 A1 9/2011 Padmanabhan et al.
2011/0247005 A1 10/2011 Benedetti et al.
2011/0252430 A1 10/2011 Chapman et al.
2011/0258603 A1 10/2011 Wisnovsky et al.
2011/0265067 A1 10/2011 Schulte et al.
2011/0265069 A1 10/2011 Fee et al.
2011/0265164 A1 10/2011 Lucovsky
2011/0271276 A1 11/2011 Ashok et al.
2011/0276945 A1 11/2011 Chasman et al.
2011/0276963 A1 11/2011 Wu et al.
2011/0296412 A1 12/2011 Banga et al.
2011/0314465 A1 12/2011 Smith et al.
2011/0321033 A1 12/2011 Kelkar et al.
2011/0321051 A1 12/2011 Rastogi
2012/0011496 A1 1/2012 Shimamura
2012/0011511 A1 1/2012 Horvitz et al.
2012/0016721 A1 1/2012 Weinman
2012/0041970 A1 2/2012 Ghosh et al.
2012/0054744 A1 3/2012 Singh et al.
2012/0060207 A1 3/2012 Mardikar et al.
2012/0072762 A1 3/2012 Atchison et al.
2012/0072914 A1 3/2012 Ota
2012/0072920 A1 3/2012 Kawamura
2012/0079004 A1 3/2012 Herman
2012/0096271 A1 4/2012 Ramarathinam et al.
2012/0096468 A1 4/2012 Chakravorty et al.
2012/0102307 A1 4/2012 Wong
2012/0102333 A1 4/2012 Wong
2012/0102481 A1 4/2012 Mani et al.
2012/0102493 A1 4/2012 Allen et al.
2012/0110155 A1 5/2012 Adlung et al.
2012/0110164 A1 5/2012 Frey et al.
2012/0110570 A1 5/2012 Jacobson et al.
2012/0110588 A1 5/2012 Bieswanger et al.
2012/0110603 A1 5/2012 Kaneko et al.
2012/0124563 A1 5/2012 Chung et al.
2012/0131379 A1 5/2012 Tameshige et al.
2012/0144290 A1 6/2012 Goldman et al.
2012/0166624 A1 6/2012 Suit et al.
2012/0173709 A1 7/2012 Li et al.
2012/0192184 A1 7/2012 Burckart et al.
2012/0197795 A1 8/2012 Campbell et al.
2012/0197958 A1 8/2012 Nightingale et al.
2012/0198442 A1 8/2012 Kashyap et al.
2012/0198514 A1 8/2012 McCune et al.
2012/0204164 A1 8/2012 Castanos et al.
2012/0209947 A1 8/2012 Glaser et al.
2012/0222038 A1 8/2012 Katragadda et al.
2012/0233464 A1 9/2012 Miller et al.
2012/0254193 A1 10/2012 Chattopadhyay et al.
2012/0324052 A1 12/2012 Paleja et al.
2012/0324236 A1 12/2012 Srivastava et al.
2012/0331113 A1 12/2012 Jain et al.
2013/0014101 A1 1/2013 Ballani et al.
2013/0042234 A1 2/2013 DeLuca et al.
2013/0054804 A1 2/2013 Jana et al.
2013/0054927 A1 2/2013 Raj et al.
2013/0055262 A1 2/2013 Lubsey et al.
2013/0061208 A1 3/2013 Tsao et al.
2013/0061212 A1 3/2013 Krause et al.
2013/0061220 A1 3/2013 Gnanasambandam et al.
2013/0067484 A1 3/2013 Sonoda et al.
2013/0067494 A1 3/2013 Srour et al.
2013/0080641 A1 3/2013 Lui et al.
2013/0091387 A1 4/2013 Bohnet et al.
2013/0097601 A1 4/2013 Podvratnik et al.
2013/0111032 A1 5/2013 Alapati et al.
2013/0111469 A1 5/2013 B et al.
2013/0124807 A1 5/2013 Nielsen et al.
2013/0132283 A1 5/2013 Hayhow et al.
2013/0132942 A1 5/2013 Wang
2013/0132953 A1 5/2013 Chuang et al.
2013/0139152 A1 5/2013 Chang et al.
2013/0139166 A1 5/2013 Zhang et al.
2013/0145354 A1 6/2013 Bruening et al.
2013/0151587 A1 6/2013 Takeshima et al.
2013/0151648 A1 6/2013 Luna
2013/0151684 A1 6/2013 Forsman et al.
2013/0152047 A1 6/2013 Moorthi et al.
2013/0167147 A1 6/2013 Corrie et al.
2013/0179574 A1 7/2013 Calder et al.
2013/0179881 A1 7/2013 Calder et al.
2013/0179894 A1 7/2013 Calder et al.
2013/0179895 A1 7/2013 Calder et al.
2013/0181998 A1 7/2013 Malakapalli et al.
2013/0185719 A1 7/2013 Kar et al.
2013/0185729 A1 7/2013 Vasic et al.
2013/0191847 A1 7/2013 Sirota et al.
2013/0191924 A1 7/2013 Tedesco
2013/0198319 A1 8/2013 Shen et al.
2013/0198743 A1 8/2013 Kruglick
2013/0198748 A1 8/2013 Sharp et al.
2013/0198763 A1 8/2013 Kunze et al.
2013/0205092 A1 8/2013 Roy et al.
2013/0205114 A1 8/2013 Badam et al.
2013/0219390 A1 8/2013 Lee et al.
2013/0227097 A1 8/2013 Yasuda et al.
2013/0227534 A1 8/2013 Ike et al.
2013/0227563 A1 8/2013 McGrath
2013/0227641 A1 8/2013 White et al.
2013/0227710 A1 8/2013 Barak et al.
2013/0232190 A1 9/2013 Miller et al.
2013/0232480 A1 9/2013 Winterfeldt et al.
2013/0239125 A1 9/2013 Iorio
2013/0246944 A1 9/2013 Pandiyan et al.
2013/0262556 A1 10/2013 Xu et al.
2013/0263117 A1 10/2013 Konik et al.
2013/0274006 A1 10/2013 Hudlow et al.
2013/0275376 A1 10/2013 Hudlow et al.
2013/0275958 A1 10/2013 Ivanov et al.
2013/0275969 A1 10/2013 Dimitrov
2013/0275975 A1 10/2013 Masuda et al.
2013/0283141 A1 10/2013 Stevenson et al.
2013/0283176 A1 10/2013 Hoole et al.

(56) References Cited

U.S. PATENT DOCUMENTS

2013/0290538 A1 10/2013 Gmach et al.
2013/0291087 A1 10/2013 Kailash et al.
2013/0297964 A1 11/2013 Hegdal et al.
2013/0298183 A1 11/2013 McGrath et al.
2013/0311650 A1 11/2013 Brandwine et al.
2013/0326506 A1 12/2013 McGrath et al.
2013/0326507 A1 12/2013 McGrath et al.
2013/0332660 A1 12/2013 Talagala et al.
2013/0339950 A1 12/2013 Ramarathinam et al.
2013/0346470 A1 12/2013 Obstfeld et al.
2013/0346946 A1 12/2013 Pinnix
2013/0346952 A1 12/2013 Huang et al.
2013/0346964 A1 12/2013 Nobuoka et al.
2013/0346987 A1 12/2013 Raney et al.
2013/0346994 A1 12/2013 Chen et al.
2013/0347095 A1 12/2013 Barjatiya et al.
2014/0007097 A1 1/2014 Chin et al.
2014/0019523 A1 1/2014 Heymann et al.
2014/0019735 A1 1/2014 Menon et al.
2014/0019965 A1 1/2014 Neuse et al.
2014/0019966 A1 1/2014 Neuse et al.
2014/0040343 A1 2/2014 Nickolov et al.
2014/0040857 A1 2/2014 Trinchini et al.
2014/0040880 A1 2/2014 Brownlow et al.
2014/0047437 A1 2/2014 Wu et al.
2014/0058871 A1 2/2014 Marr et al.
2014/0059209 A1* 2/2014 Alnoor ................ G06F 11/1438 709/224
2014/0059226 A1 2/2014 Messerli et al.
2014/0059552 A1 2/2014 Cunningham et al.
2014/0068568 A1 3/2014 Wisnovsky
2014/0068608 A1 3/2014 Kulkarni
2014/0068611 A1 3/2014 McGrath et al.
2014/0073300 A1 3/2014 Leeder et al.
2014/0081984 A1 3/2014 Sitsky et al.
2014/0082165 A1 3/2014 Marr et al.
2014/0082201 A1 3/2014 Shankari et al.
2014/0101643 A1 4/2014 Inoue
2014/0101649 A1 4/2014 Kamble et al.
2014/0108722 A1 4/2014 Lipchuk et al.
2014/0109087 A1 4/2014 Jujare et al.
2014/0109088 A1 4/2014 Dournov et al.
2014/0109092 A1 4/2014 Jacobson et al.
2014/0129667 A1 5/2014 Ozawa
2014/0130040 A1 5/2014 Lemanski
2014/0137110 A1 5/2014 Engle et al.
2014/0164551 A1 6/2014 Resch et al.
2014/0165060 A1* 6/2014 Muller ................ G06F 9/45558 718/1
2014/0173614 A1 6/2014 Konik et al.
2014/0173616 A1 6/2014 Bird et al.
2014/0180862 A1 6/2014 Certain et al.
2014/0189677 A1 7/2014 Curzi et al.
2014/0189704 A1 7/2014 Narvaez et al.
2014/0201735 A1 7/2014 Kannan et al.
2014/0207912 A1 7/2014 Thibeault
2014/0214752 A1 7/2014 Rash et al.
2014/0215073 A1 7/2014 Dow et al.
2014/0229221 A1 8/2014 Shih et al.
2014/0229942 A1 8/2014 Wiseman et al.
2014/0245297 A1 8/2014 Hackett
2014/0258777 A1 9/2014 Cheriton
2014/0279581 A1 9/2014 Devereaux
2014/0280325 A1 9/2014 Krishnamurthy et al.
2014/0282418 A1 9/2014 Wood et al.
2014/0282559 A1 9/2014 Verduzco et al.
2014/0282615 A1 9/2014 Cavage et al.
2014/0282629 A1 9/2014 Gupta et al.
2014/0283045 A1 9/2014 Brandwine et al.
2014/0289286 A1 9/2014 Gusak
2014/0298295 A1 10/2014 Overbeck
2014/0304246 A1 10/2014 Helmich et al.
2014/0304698 A1 10/2014 Chigurapati et al.
2014/0304815 A1 10/2014 Maeda
2014/0317617 A1 10/2014 O'Donnell
2014/0330936 A1 11/2014 Factor et al.
2014/0331222 A1 11/2014 Zheng
2014/0337953 A1 11/2014 Banatwala et al.
2014/0344457 A1 11/2014 Bruno, Jr. et al.
2014/0344736 A1 11/2014 Ryman et al.
2014/0351674 A1 11/2014 Grube et al.
2014/0359093 A1 12/2014 Raju et al.
2014/0359608 A1 12/2014 Tsirkin et al.
2014/0365781 A1 12/2014 Dmitrienko et al.
2014/0372489 A1 12/2014 Jaiswal et al.
2014/0372533 A1 12/2014 Fu et al.
2014/0380085 A1 12/2014 Rash et al.
2015/0006487 A1 1/2015 Yang et al.
2015/0025989 A1 1/2015 Dunstan
2015/0033241 A1 1/2015 Jackson et al.
2015/0039891 A1 2/2015 Ignatchenko et al.
2015/0040229 A1 2/2015 Chan et al.
2015/0046926 A1 2/2015 Kenchammana-Hosekote et al.
2015/0046971 A1 2/2015 Huh et al.
2015/0052258 A1 2/2015 Johnson et al.
2015/0058914 A1 2/2015 Yadav
2015/0067019 A1 3/2015 Balko
2015/0067830 A1 3/2015 Johansson et al.
2015/0074659 A1 3/2015 Madsen et al.
2015/0074661 A1 3/2015 Kothari et al.
2015/0074662 A1 3/2015 Saladi et al.
2015/0074675 A1 3/2015 Qi et al.
2015/0081885 A1 3/2015 Thomas et al.
2015/0095822 A1 4/2015 Feis et al.
2015/0106805 A1 4/2015 Melander et al.
2015/0120928 A1 4/2015 Gummaraju et al.
2015/0121391 A1 4/2015 Wang
2015/0134626 A1 5/2015 Theimer et al.
2015/0135287 A1 5/2015 Medeiros et al.
2015/0142747 A1 5/2015 Zou
2015/0142952 A1 5/2015 Bragstad et al.
2015/0143374 A1 5/2015 Banga et al.
2015/0143381 A1 5/2015 Chin et al.
2015/0146716 A1 5/2015 Olivier et al.
2015/0154046 A1 6/2015 Farkas et al.
2015/0161384 A1 6/2015 Gu et al.
2015/0163231 A1 6/2015 Sobko et al.
2015/0178019 A1 6/2015 Hegdal et al.
2015/0178110 A1 6/2015 Li et al.
2015/0186129 A1 7/2015 Apte et al.
2015/0188775 A1 7/2015 Van Der Walt et al.
2015/0199218 A1 7/2015 Wilson et al.
2015/0205596 A1 7/2015 Hiltegen et al.
2015/0206139 A1 7/2015 Lea
2015/0212818 A1 7/2015 Gschwind et al.
2015/0227598 A1 8/2015 Hahn et al.
2015/0229645 A1 8/2015 Keith et al.
2015/0235144 A1 8/2015 Gusev et al.
2015/0242225 A1 8/2015 Muller et al.
2015/0254248 A1 9/2015 Burns et al.
2015/0256514 A1 9/2015 Laivand et al.
2015/0256621 A1 9/2015 Noda et al.
2015/0261578 A1 9/2015 Greden et al.
2015/0264014 A1 9/2015 Budhani et al.
2015/0269494 A1 9/2015 Kardes et al.
2015/0271073 A1 9/2015 Saladi et al.
2015/0271280 A1 9/2015 Zhang et al.
2015/0289220 A1 10/2015 Kim et al.
2015/0309923 A1 10/2015 Iwata et al.
2015/0319160 A1 11/2015 Ferguson et al.
2015/0319174 A1 11/2015 Hayton et al.
2015/0324174 A1 11/2015 Bromley et al.
2015/0324182 A1 11/2015 Barros et al.
2015/0324210 A1 11/2015 Carlson
2015/0324229 A1 11/2015 Valine
2015/0332048 A1 11/2015 Mooring et al.
2015/0332195 A1 11/2015 Jue
2015/0334173 A1 11/2015 Coulmeau et al.
2015/0350701 A1 12/2015 Lemus et al.
2015/0356294 A1 12/2015 Tan et al.
2015/0363181 A1 12/2015 Alberti et al.
2015/0363304 A1 12/2015 Nagamalla et al.
2015/0370560 A1 12/2015 Tan et al.
2015/0370591 A1 12/2015 Tuch et al.

(56) References Cited

U.S. PATENT DOCUMENTS

2015/0370592 A1 12/2015 Tuch et al.
2015/0371244 A1 12/2015 Neuse et al.
2015/0378762 A1 12/2015 Saladi et al.
2015/0378764 A1 12/2015 Sivasubramanian et al.
2015/0378765 A1 12/2015 Singh et al.
2015/0379167 A1 12/2015 Griffith et al.
2016/0011901 A1 1/2016 Hurwitz et al.
2016/0012099 A1 1/2016 Tuatini et al.
2016/0019081 A1 1/2016 Chandrasekaran et al.
2016/0019082 A1 1/2016 Chandrasekaran et al.
2016/0019536 A1 1/2016 Ortiz et al.
2016/0021112 A1 1/2016 Katieb
2016/0026486 A1 1/2016 Abdallah
2016/0048606 A1 2/2016 Rubinstein et al.
2016/0070714 A1 3/2016 D'Sa et al.
2016/0072727 A1 3/2016 Leafe et al.
2016/0072781 A1 3/2016 Zhang et al.
2016/0077901 A1 3/2016 Roth et al.
2016/0092320 A1 3/2016 Baca
2016/0092493 A1 3/2016 Ko et al.
2016/0098285 A1 4/2016 Davis et al.
2016/0100036 A1 4/2016 Lo et al.
2016/0103739 A1 4/2016 Huang et al.
2016/0110188 A1 4/2016 Verde et al.
2016/0117163 A1 4/2016 Fukui et al.
2016/0117254 A1 4/2016 Susarla et al.
2016/0119289 A1 4/2016 Jain et al.
2016/0124665 A1 5/2016 Jain et al.
2016/0124978 A1 5/2016 Nithrakashyap et al.
2016/0140180 A1 5/2016 Park et al.
2016/0150053 A1 5/2016 Janczuk et al.
2016/0188367 A1 6/2016 Zeng
2016/0191420 A1 6/2016 Nagarajan et al.
2016/0198235 A1 7/2016 Liu et al.
2016/0203219 A1 7/2016 Hoch et al.
2016/0212007 A1 7/2016 Alatorre et al.
2016/0226955 A1 8/2016 Moorthi et al.
2016/0282930 A1 9/2016 Ramachandran et al.
2016/0285906 A1 9/2016 Fine et al.
2016/0292016 A1 10/2016 Bussard et al.
2016/0294614 A1 10/2016 Searle et al.
2016/0306613 A1 10/2016 Busi et al.
2016/0315910 A1 10/2016 Kaufman
2016/0350099 A1 12/2016 Suparna et al.
2016/0350124 A1 12/2016 Gschwind et al.
2016/0357536 A1 12/2016 Firlik et al.
2016/0364265 A1 12/2016 Cao et al.
2016/0364316 A1 12/2016 Bhat et al.
2016/0371127 A1 12/2016 Antony et al.
2016/0371156 A1 12/2016 Merriman
2016/0378449 A1 12/2016 Khazanchi et al.
2016/0378525 A1 12/2016 Bjorkengren
2016/0378547 A1 12/2016 Brouwer et al.
2016/0378554 A1 12/2016 Gummaraju et al.
2017/0004169 A1 1/2017 Merrill et al.
2017/0032000 A1 2/2017 Sharma et al.
2017/0041144 A1 2/2017 Krapf et al.
2017/0041309 A1 2/2017 Ekambaram et al.
2017/0060615 A1 3/2017 Thakkar et al.
2017/0060621 A1 3/2017 Whipple et al.
2017/0068574 A1 3/2017 Cherkasova et al.
2017/0075749 A1 3/2017 Ambichl et al.
2017/0083381 A1 3/2017 Cong et al.
2017/0085447 A1 3/2017 Chen et al.
2017/0085502 A1 3/2017 Biruduraju
2017/0085591 A1 3/2017 Ganda et al.
2017/0091235 A1 3/2017 Yammine et al.
2017/0091296 A1 3/2017 Beard et al.
2017/0093684 A1 3/2017 Jayaraman et al.
2017/0093920 A1 3/2017 Ducatel et al.
2017/0134519 A1 5/2017 Chen et al.
2017/0142099 A1 5/2017 Hinohara et al.
2017/0147656 A1 5/2017 Choudhary et al.
2017/0149740 A1 5/2017 Mansour et al.
2017/0153965 A1 6/2017 Nitta et al.
2017/0161059 A1 6/2017 Wood et al.
2017/0177266 A1 6/2017 Doerner et al.
2017/0177441 A1 6/2017 Chow
2017/0177854 A1 6/2017 Gligor et al.
2017/0188213 A1 6/2017 Nirantar et al.
2017/0192825 A1 7/2017 Biberman et al.
2017/0221000 A1 8/2017 Anand
2017/0230262 A1 8/2017 Sreeramoju et al.
2017/0230499 A1 8/2017 Mumick et al.
2017/0249130 A1 8/2017 Smiljamic et al.
2017/0264681 A1 9/2017 Apte et al.
2017/0272462 A1 9/2017 Kraemer et al.
2017/0285278 A1 10/2017 Ota
2017/0286187 A1 10/2017 Chen et al.
2017/0286278 A1 10/2017 Thomas et al.
2017/0288878 A1 10/2017 Lee et al.
2017/0308520 A1 10/2017 Beahan, Jr. et al.
2017/0315163 A1 11/2017 Wang et al.
2017/0322824 A1 11/2017 Reuther et al.
2017/0329578 A1 11/2017 Iscen
2017/0346808 A1 11/2017 Anzai et al.
2017/0353851 A1 12/2017 Gonzalez et al.
2017/0364345 A1 12/2017 Fontoura et al.
2017/0371720 A1 12/2017 Basu et al.
2017/0372142 A1 12/2017 Bilobrov
2018/0004555 A1 1/2018 Ramanathan et al.
2018/0004556 A1 1/2018 Marriner et al.
2018/0032410 A1 2/2018 Kang et al.
2018/0046453 A1 2/2018 Nair et al.
2018/0046482 A1 2/2018 Karve et al.
2018/0060132 A1 3/2018 Maru et al.
2018/0060221 A1 3/2018 Yim et al.
2018/0060318 A1 3/2018 Yang et al.
2018/0067841 A1 3/2018 Mahimkar
2018/0067873 A1 3/2018 Pikhur et al.
2018/0069702 A1 3/2018 Ayyadevara et al.
2018/0081717 A1 3/2018 Li
2018/0089232 A1 3/2018 Spektor et al.
2018/0095738 A1 4/2018 Dürkop et al.
2018/0113770 A1 4/2018 Hasanov et al.
2018/0113793 A1 4/2018 Fink et al.
2018/0121665 A1 5/2018 Anderson et al.
2018/0129684 A1 5/2018 Wilson et al.
2018/0144263 A1 5/2018 Saxena et al.
2018/0150339 A1 5/2018 Pan et al.
2018/0152401 A1 5/2018 Tandon et al.
2018/0152405 A1 5/2018 Kuo et al.
2018/0152406 A1 5/2018 Kuo et al.
2018/0165110 A1 6/2018 Htay
2018/0192101 A1 7/2018 Bilobrov
2018/0225096 A1 8/2018 Mishra et al.
2018/0227300 A1 8/2018 Nakic et al.
2018/0239636 A1 8/2018 Arora et al.
2018/0253333 A1 9/2018 Gupta
2018/0268130 A1 9/2018 Ghosh et al.
2018/0275987 A1 9/2018 Vandeputte
2018/0285101 A1 10/2018 Yahav et al.
2018/0300111 A1 10/2018 Bhat et al.
2018/0314845 A1 11/2018 Anderson et al.
2018/0316552 A1 11/2018 Subramani Nadar et al.
2018/0341504 A1 11/2018 Kissell
2018/0365422 A1 12/2018 Callaghan et al.
2018/0367517 A1 12/2018 Tus
2018/0375781 A1 12/2018 Chen et al.
2019/0004866 A1 1/2019 Du et al.
2019/0018715 A1 1/2019 Behrendt et al.
2019/0028552 A1 1/2019 Johnson et al.
2019/0034095 A1 1/2019 Singh et al.
2019/0043231 A1 2/2019 Uzgin et al.
2019/0072529 A1 3/2019 Andrawes et al.
2019/0073430 A1 3/2019 Webster
2019/0079751 A1 3/2019 Foskett et al.
2019/0102278 A1 4/2019 Gahlin et al.
2019/0140831 A1 5/2019 De Lima Junior et al.
2019/0141015 A1 5/2019 Nellen
2019/0147085 A1 5/2019 Pal et al.
2019/0147515 A1 5/2019 Hurley et al.
2019/0171423 A1 6/2019 Mishra et al.
2019/0179678 A1 6/2019 Banerjee et al.

(56) References Cited

U.S. PATENT DOCUMENTS

2019/0179684 A1 6/2019 On et al.
2019/0179725 A1 6/2019 Mital et al.
2019/0180036 A1 6/2019 Shukla
2019/0188288 A1 6/2019 Holm et al.
2019/0235848 A1 8/2019 Swiecki et al.
2019/0238590 A1 8/2019 Talukdar et al.
2019/0250937 A1 8/2019 Thomas et al.
2019/0268152 A1 8/2019 Sandoval et al.
2019/0278938 A1 9/2019 Greene et al.
2019/0286475 A1 9/2019 Mani
2019/0286492 A1 9/2019 Gulsvig Wood et al.
2019/0303117 A1 10/2019 Kocberber et al.
2019/0311115 A1 10/2019 Lavi et al.
2019/0318312 A1 10/2019 Foskett et al.
2019/0320038 A1 10/2019 Walsh et al.
2019/0324813 A1 10/2019 Bogineni et al.
2019/0339955 A1 11/2019 Kuo et al.
2019/0361802 A1 11/2019 Li et al.
2019/0363885 A1 11/2019 Schiavoni et al.
2019/0370113 A1 12/2019 Zhang et al.
2019/0384643 A1* 12/2019 Gao ..................... G06F 9/5022
2020/0007456 A1 1/2020 Greenstein et al.
2020/0026527 A1 1/2020 Xu et al.
2020/0028936 A1 1/2020 Gupta et al.
2020/0034471 A1 1/2020 Danilov et al.
2020/0065079 A1 2/2020 Kocberber et al.
2020/0073770 A1 3/2020 Mortimore, Jr. et al.
2020/0073987 A1 3/2020 Perumala et al.
2020/0081745 A1 3/2020 Cybulski et al.
2020/0110691 A1 4/2020 Bryant et al.
2020/0120120 A1 4/2020 Cybulski
2020/0134030 A1 4/2020 Natanzon et al.
2020/0136933 A1 4/2020 Raskar
2020/0153798 A1 5/2020 Liebherr
2020/0153897 A1 5/2020 Mestery et al.
2020/0167208 A1 5/2020 Floes et al.
2020/0192646 A1 6/2020 Yerramreddy et al.
2020/0213151 A1 7/2020 Srivatsan et al.
2020/0213359 A1 7/2020 Arbel et al.
2020/0241930 A1 7/2020 Garg et al.
2020/0327236 A1 10/2020 Pratt et al.
2020/0348979 A1 11/2020 Calmon
2020/0349067 A1 11/2020 Syamala et al.
2020/0366587 A1 11/2020 White et al.
2020/0401455 A1 12/2020 Church et al.
2021/0019056 A1 1/2021 Mangione-Tran
2021/0081233 A1 3/2021 Mullen et al.
2021/0117534 A1 4/2021 Maximov et al.
2021/0124822 A1 4/2021 Tiwary et al.
2021/0176333 A1 6/2021 Coleman et al.
2021/0200552 A1* 7/2021 Liu ....................... G06F 21/556
2021/0294646 A1 9/2021 Hassaan et al.
2021/0311758 A1 10/2021 Cao et al.
2021/0314388 A1 10/2021 Zhou et al.
2022/0012083 A1 1/2022 Brooker et al.
2022/0050790 A1* 2/2022 Goodman ........... G06F 12/1009
2022/0147400 A1 5/2022 Cowan
2022/0214863 A1 7/2022 Clement et al.
2022/0376979 A1 11/2022 Vishnoi et al.
2022/0383324 A1 12/2022 Sheshadri et al.
2022/0391238 A1 12/2022 Wagner
2023/0024699 A1 1/2023 Bayoumi et al.
2023/0033818 A1 2/2023 Baughman et al.
2023/0142895 A1 5/2023 Campbell et al.
2023/0359508 A1 11/2023 Kalley et al.
2023/0409412 A1 12/2023 Kruegel et al.
2024/0160461 A1 5/2024 Nanda et al.
2025/0080416 A1 3/2025 Mitrache et al.
2025/0110800 A1 4/2025 Rajagopal et al.

FOREIGN PATENT DOCUMENTS

CN 101002170 A 7/2007
CN 101267334 A 9/2008
CN 101345757 A 1/2009
CN 101496005 A 7/2009
CN 101627388 A 1/2010
CN 101640700 A 2/2010
CN 101764824 A 6/2010
CN 102171712 A 8/2011
CN 102246152 A 11/2011
CN 102365858 A 2/2012
CN 102420846 A 4/2012
CN 102761549 A 10/2012
CN 103098027 A 5/2013
CN 103140828 A 6/2013
CN 103384237 A 11/2013
CN 103731427 A 4/2014
CN 104111848 A 10/2014
CN 104160378 A 11/2014
CN 104243479 A 12/2014
CN 104903854 A 9/2015
CN 105122243 A 12/2015
CN 105956000 A 9/2016
CN 106921651 A 7/2017
CN 107534672 A 1/2018
CN 114208112 A 3/2022
EP 2663052 A1 11/2013
EP 3508975 A1 7/2019
JP 2002-287974 A 10/2002
JP 2006-107599 A 4/2006
JP 2007-080161 A 3/2007
JP 2007-538323 A 12/2007
JP 2010-026562 A 2/2010
JP 2011-065243 A 3/2011
JP 2011-233146 A 11/2011
JP 2011-257847 A 12/2011
JP 2012-078893 A 4/2012
JP 2012-104150 A 5/2012
JP 2013-156996 A 8/2013
JP 2014-525624 A 9/2014
JP 2016-507100 A 3/2016
JP 2017-534107 A 11/2017
JP 2017-534967 A 11/2017
JP 2018-503896 A 2/2018
JP 2018-512087 A 5/2018
JP 2018-536213 A 12/2018
KR 10-357850 B1 10/2002
WO WO 2008/114454 A1 9/2008
WO WO 2009/137567 A1 11/2009
WO WO 2012/039834 A1 3/2012
WO WO 2012/050772 A1 4/2012
WO WO 2013/106257 A1 7/2013
WO WO 2015/078394 A1 6/2015
WO WO 2015/108539 A1 7/2015
WO WO 2015/149017 A1 10/2015
WO WO 2016/053950 A1 4/2016
WO WO 2016/053968 A1 4/2016
WO WO 2016/053973 A1 4/2016
WO WO 2016/090292 A1 6/2016
WO WO 2016/126731 A1 8/2016
WO WO 2016/164633 A1 10/2016
WO WO 2016/164638 A1 10/2016
WO WO 2017/059248 A1 4/2017
WO WO 2017/112526 A1 6/2017
WO WO 2017/172440 A1 10/2017
WO WO 2018/005829 A1 1/2018
WO WO 2018/039514 A1 1/2018
WO WO 2018/098443 A1 5/2018
WO WO 2018/098445 A1 5/2018
WO WO 2020/005764 A1 1/2020
WO WO 2020/006081 A1 1/2020
WO WO 2020/069104 A1 4/2020
WO WO 2020/123439 A1 6/2020
WO WO 2020/264431 A1 12/2020
WO 2021/127577 A1 6/2021
WO WO 2021/108435 A1 6/2021
WO WO 2023/107649 A1 6/2023

OTHER PUBLICATIONS

Anonymous: "Amazon Simple Workflow Service Developer Guide API Version Jan. 25, 2012," Jun. 11, 2016 (Jun. 11, 2016),

(56) References Cited

OTHER PUBLICATIONS

XP055946928, Retrieved from the Internet: URL:https://web.archive.org/web/20160111075522if_/http://docs.aws.amazon.com/amazonswf/latest/developerguide/swf-dg.pdf [retrieved on Jul. 28, 2022] in 197 pages.
Anonymous: "alias (command)—Wikipedia," Jun. 28, 2016, pp. 106, XP093089956, Retrieved from the Internet: URL:https://en.wikipedia.org/w/index.php?title=Alias_(command)&oldid=727315645 [retrieved on Oct. 9, 2023.
Anonymous: "AWS Flow Framework for Java," Apr. 7, 2016 (Apr. 7, 2016), XP055946535, Retrieved from the Internet: URL:https://web.archive.org/web/20160407214715if_/http://docs.aws.amazon.com/amazonswf/latest/awsflowguide/swf-aflow.pdf, [retrieved Jul. 27, 2022] in 139 pages.
Abebe et al., "EC-Store: Bridging the Gap Between Storage and Latency in Distribute Erasure CodedSystems", IEEE 38th International Conference on Distributed Computing Systems, 2018, pp. 255-266.
Adapter Pattern, Wikipedia,https://en.wikipedia.org/w/index.php?title=Adapter_pattern&oldid=654971255, [retrieved May 26, 2016], 6 pages.
Amazon, "AWS Lambda: Developer Guide", Jun. 26, 2016 Retrieved from the Internet, URL:http://docs.aws.amazon.com/lambda/latest/dg/lambda-dg.pdf, [retrieved on Aug. 30, 2017], 314 pages.
Amazon, "AWS Lambda: Developer Guide", Apr. 30, 2016 Retrieved from the Internet, URL:https://web.archive.org/web/20160430050158/http://docs.aws.amazon.com:80/lambda/latest/dg/lambda-dg.pdf, 346 pages.
Amazon, "AWS Lambda: Developer Guide", Retrieved from the Internet, 2019, URL :http://docs.aws.amazon.com/lambda/ latest/dg/lambda-dg.pdf, 521 pages.
Balazinska et al., Moirae: History-Enhanced Monitoring, Published: Jan. 2007, 12 pages.
Bebenita et al., "Trace-Based Compilation in Execution Environments without Interpreters," ACM, Copyright 2010, 10 pages.
Ben-Yehuda et al., "Deconstructing Amazon EC2 Spot Instance Pricing", ACM Transactions on Economics and Computation 1.3, Sep. 2013, 15 pages.
Bhadani et al., Performance evaluation of web servers using central load balancing policy over virtual machines on cloud, Jan. 2010, 4 pages.
Das et al., Adaptive Stream Processing using Dynamic Batch Sizing, Nov. 2014, 13 pages.
Deis, Container, Jun. 2014, 1 page.
Dean et al., "MapReduce: Simplified Data Processing on Large Clusters", ACM, 2008, pp. 107-113.
Dombrowski, M., et al., Dynamic Monitor Allocation in the Java Virtual Machine, JTRES '13, Oct. 9-11, 2013, pp. 30-37.
Dornemann et al., "On-Demand Resource Provisioning for BPEL Workflows Using Amazon's Elastic Compute Cloud", 9th IEEE/ACM International Symposium on Cluster Computing and the Grid, 2009, pp. 140-147.
Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.
Ekanayake et al, "Twister: A Runtime for Iterative MapReduce", ACM, 2010, pp. 810-818.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Fan et al., Online Optimization of VM Deployment in IaaS Cloud, Dec. 17, 2012-Dec. 19, 2012, 6 pages.
Hammoud et al, "Locality-Aware Reduce Task Scheduling for MapReduce", IEEE, 2011, pp. 570-576.
Han et al., Lightweight Resource Scaling for Cloud Applications, May 13, 2012-May 16, 2012, 8 pages.
Hoffman, Auto scaling your website with Amazon Web Services (AWS)—Part 2, Cardinalpath, Sep. 2015, 15 pages.
Huang et al., "Erasure Coding in Windows Azure Storege", USENIX, 2012 in 12 pages.
Kamga et al., Extended scheduler for efficient frequency scaling in virtualized systems, Jul. 2012, 8 pages.
IBM, what is Severless computing, https://www.ibm.com/topics/serverless#;-:test=Serverless%20is%20a%20cloud%20computing, managing%20servers%20or%20backend%20infrastructure, pp. 1-11 (Year: 2023).
Kazempour et al., AASH: an asymmetry-aware scheduler for hypervisors, Jul. 2010, 12 pages.
Kim et al., "MRBench: A Benchmark for Map-Reduce Framework", IEEE, 2008, pp. 11-18.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Lagar-Cavilla et al., "SnowFlock: Virtual Machine Cloning as a First-Class Cloud Primitive", ACM Transactions on Computer Systems, vol. 29, No. 1, Article 2, Publication date: Feb. 2011, in 45 pages.
Lin, "MR-Apriori: Association Rules Algorithm Based on MapReduce", IEEE, 2014, pp. 141-144.
Meng et al., Efficient resource provisioning in compute clouds via VM multiplexing, Jun. 2010, 10 pages.
Merkel, "Docker: Lightweight Linux Containers for Consistent Development and Deployment", LinuxJournal, vol. 2014 Issue 239, Mar. 2014, XP055171140, 16 pages.
Monteil, Coupling profile and historical methods to predict execution time of parallel applications. Parallel and Cloud Computing, Jul. 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Neenan, Sarah Compare Serverless tools and services in the Public cloud, https://www.techtarget.com/searchcloudcomputing/feature/Compare-serverless-tools-and-services-in-the-public-cloud, TechTarget, pp. 1-4 (Year: 2023).
Qian, H., and D. Medhi, et al., Estimating Optimal Cost of Allocating Virtualized Resources With Dynamic Demand, ITC 2011, Sep. 2011, pp. 320-321.
Rashmi et al., "EC-Cache: Load-Balance, Low-Latency Cluster Caching with Online Erasure Coding", USENIX, 2016, pp. 401-417.
Ryden et al., "Nebula: Distributed Edge Cloud for Data-Intensive Computing", IEEE, 2014, pp. 491-492.
Sakamoto, et al. "Platform for Web Services using Proxy Server"; Research Report from Information Processing Society, Mar. 22, 2002, vol. 2002, No. 31.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, Nov. 10, 2009, 4 pages.
Tan et al., Provisioning for large scale cloud computing services, Jun. 2012, 2 pages.
Tange, "GNU Parallel: The Command-Line Power Tool", vol. 36, No. 1, Jan. 1, 1942, pp. 42-47.
Vaghani, S.B., Virtual Machine File System, ACM SIGOPS Operating Systems Review 44(4):57-70, Dec. 2010.
Wang et al., "Improving utilization through dynamic VM resource allocation in hybrid cloud environment", Parallel and Distributed V Systems (ICPADS), IEEE, Dec. 16, 2014-Dec. 19, 2014. Retrieved on Feb. 14, 2019, Retrieved from the internet: URL<https://ieeexplore.ieee.org/stamp/stamp.jsp?tp=&arnumber=7097814, 8 pages.
Wikipedia: Serverless computing, https://en.wikipedia.org/wiki/Serverless_computing, pp. 107 (Year: 2023).
Wood, Timothy, et al. "Cloud Net: dynamic pooling of cloud resources by live WAN migration of virtual machines." ACM Sigplan Notices 46.7 (2011): 121-132. (Year: 2011).

(56) References Cited

OTHER PUBLICATIONS

Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yang, The Application of MapReduce in the Cloud Computing:, IEEE, 2011, pp. 154-156.
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Preliminary Report on Patentability for Application No. PCT/US2020/062060 dated Jun. 9, 2022 in 9 pages.
International Search Report and Written Opinion mailed Oct. 15, 2019 for International Application No. PCT/US2019/039246 in 16 pages.
International search Report and written opinion received for PCT application No. PCT/US2024/048187, mailed on Jan. 30, 2025, 9 pages.
International search Report and written opinion received for PCT application No. PCT/US2024/048189, mailed on Jan. 24, 2025, 11 pages.
International Search Report for Application No. PCT/US2019/038520 dated Aug. 14, 2019, 9 pages.
International Search Report for Application No. PCT/US2019/065365 dated Mar. 19, 2020, 10 pages.
International Search Report for Application No. PCT/US2020/039996 dated Oct. 8, 2020, 10 pages.
International Search Report for Application No. PCT/US2020/062060 dated Mar. 5, 2021, 10 pages.
Search Query Report from IP.com, performed May 27, 2021, pp. 1-5.
Search Query Report from IP.com, performed Dec. 2, 2020, pp. 1-4.
Sharma A. et al., "Building a Multi-Tenant SaaS Solution Using AWS Serverless Services," Aug. 26, 2021, XP093030094, retrieved from the internet: URL:https://aws.amazon.com/blogs/apn/building-a- multi-tenant-saas-solution-using-aws-serverless-services/ [retrieved on Mar. 9, 2023] the whole document, pp. 1-13.
Vaquero, L., et al., "Dynamically Scaling Applications in the cloud", ACM SIGCOMM Computer Communication Review 41(1), Jan. 2011, pp. 45-52.
Wikipedia Recursion web page from date Mar. 26, 2015, retrieved using the WayBackMachine, from https://web.archive.org/web/20150326230100/https://en .wikipedia.org/wiki/Recursion_(computer science), 2015, pp. 1-20.
Wikipedia subroutine web page, retrieved from https://en.wikipedia.org/wiki/Subroutine, retrieved on Sep. 10, 2019, pp. 1-16.
Yue et al., AC 2012-4107: Using Amazon EC2 in Computer and Network Security Lab Exercises: Design, Results, and Analysis, 2012, American Society for Engineering Education, Jun. 10, 2012, 21 pages.
Anonymous: "Amazon Cognito Developer Guide," Jun. 24, 2001, XP093030075, retrieved from the internet: URL: https://web.archive.org/web/20210624153941if_/https://docs.aws.amazon.com/cognito/latest/devel operguide/cognito-dg.pdf [retrieved on Mar. 9, 2023] the whole document, 382 pages.
Anonymous: "AWS Lambda Developer Guide," Jul. 1, 2021, XP093024770, retrieved from the internet: URL: https://web.archieve.org/web/20210701100128if_/https://docs.aws.amazon.com/lambda/latest/dg/lambda-dg.pdf [retrieved on Feb. 17, 2023] the whole document, 1019 pages.
Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017], 28 pages.
Anonymous: SaaS Tenant Isolution Strategies Isolating Resources in a Multi-Tenant Environment,: Aug. 1, 2020, XP093030095, retrieved from the internet: URL:https://dl.awsstatic.com/whitepapers/saas-tenant-isolation-strategies.pdf [retrieved on Mar. 9, 2023] the whole document, 38 pages.
Anonymous: "Security Overview of AWS Lambda," Aug. 11, 2021, XP093030100, retrieved from the internet: URL: https://web.archive.org/web/202108110441 32if_/https://docs.aws.amazon.com/whitepapers/latest/ security-overview-aws-lambda/security-overview-aws-lambda.pdf [retrieved Mar. 9, 2023] the whole document, 20 pages.
Bryan Liston, "Ad Hoc Big Data Processing Made Simple with Serverless Map Reduce", Nov. 4, 2016, Amazon Web Services <https :/laws. amazon .com/bl ogs/compute/ad-hoc-big-data-processi ng-made-si mple-with-serverless- mapred uce >, 11 pages.
CodeChef ADMIN discussion web page, retrieved from https://discuss.codechef.com/t/ what-are-the-memory-limit-and-stack-size-on-codechef/14159, retrieved on Sep. 10, 2019, pp. 1-2.
CodeChef IDE web page, Code, Compile & Run, retrieved from https://www.codechef.com/ide, retrieved on Sep. 9, 2019, pp. 1-2.
Czajkowski, G., and L. Daynes, Multitasking Without Compromise: A Virtual Machine Evolution, ACM SIGPLAN Notices—Supplemental Issue, 47(4a), Apr. 2012, pp. 60-73.
European Examination Report, re EP Application No. 17743108.7, dated Oct. 12, 2022. 9 pages.
Extended European Search Report in application No. 17776325.7 dated Oct. 23, 2019, 9 pages.
Extended Search Report in European Application No. 15846542.7 dated Aug. 27, 2018, 8 pages.
Extended Search Report in European Application No. 15846932.0 dated May 3, 2018, 11 pages.
Extended Search Report in European Application No. 15847202.7 dated Sep. 9, 2018, 10 pages.
Extended Search Report in European Application No. 19199402.9 dated Mar. 6, 2020, 7 pages.
Ha et al., "A Concurrent Trace-based Just-In-Time Compiler for Single-threaded JavaScript", utexas.edu, Jun. 2009, pp. 47-54.
http://discuss.codechef.com discussion web page from date Nov. 11, 2012, retrieved using the WayBackMachine, from https://web.archive.org/web/20121111040051 /http://discuss.codechef.com/questions/2881 /why-are-simple-java-programs-using-up-so-much-space, 2012, pp. 1-2.
http://www.codechef.com/ide web page from date Apr. 5, 2015, retrieved using the WayBackMachine, from https://web.archive.org/web/20150405045518/http://www.codechef.com/ide, 2015, pp. 1-2.
https://www.codechef.com code error help page from Jan. 2014, retrieved from https://www.codechef.com/Jan. 14/status/ERRORva123, 2014, pp. 1-2.
Huang, Zhe, Danny HK Tsang, and James She. "A virtual machine consolidation framework for mapreduce enabled computing clouds." 2012 24th International Teletraffic Congress (ITC 24). IEEE, Sep. 4, 2012-Sep. 7, 2012, pp. 73-80.
International Preliminary Report on Patentability and Written Opinion in PCT/US2019/053123 dated Mar. 23, 2021, 8 pages.
International Preliminary Report on Patentability for Application No. PCT/US2019/038520 dated Dec. 29, 2020, 7 pages.
International Preliminary Report on Patentability for Application No. PCT/US2019/065365 dated Jun. 8, 2021, 9 pages.
International Preliminary Report on Patentability for Application No. PCT/US2020/039996 dated Jan. 6, 2022, 9 pages.
International Preliminary Report on Patentability in PCT/US/2017/023564 dated Oct. 2, 2018, 12 pages.
International Preliminary Report on Patentability in PCT/US2015/052810 dated Apr. 4, 2017, 9 pages.
International Preliminary Report on Patentability in PCT/US2015/052833 dated Apr. 4, 2017, 9 pages.
International Preliminary Report on Patentability in PCT/US2015/052838 dated Apr. 4, 2017, 10 pages.
International Preliminary Report on Patentability in PCT/US2015/064071 dated Jun. 6, 2017, 12 pages.
International Preliminary Report on Patentability in PCT/US2016/016211 dated Aug. 17, 2017, 7 pages.

(56) References Cited

OTHER PUBLICATIONS

International Preliminary Report on Patentability in PCT/US2016/026514 dated Oct. 10, 2017, 9 pages.
International Preliminary Report on Patentability in PCT/US2016/026520 dated Oct. 10, 2017, 9 pages.
International Preliminary Report on Patentability in PCT/US2016/054774 dated Apr. 3, 2018, 9 pages.
International Preliminary Report on Patentability in PCT/US2016/066997 dated Jun. 26, 2018, 8 pages.
International Preliminary Report on Patentability in PCT/US2017/039514 dated Jan. 1, 2019, 8 pages.
International Preliminary Report on Patentability in PCT/US2017/040054 dated Jan. 1, 2019, 12 pages.
International Preliminary Report on Patentability mailed Dec. 29, 2020 for International Application No. PCT/US2019/039246 in 8 pages.
International Search Report and Written Opinion in PCT/US/2017/023564 dated Jun. 6, 2017, 12 pages.
International Search Report and Written Opinion in PCT/US2015/052810 dated Dec. 17, 2015, 9 pages.
International Search Report and Written Opinion in PCT/US2015/052833 dated Jan. 13, 2016, 9 pages.
International Search Report and Written Opinion in PCT/US2015/052838 dated Dec. 18, 2015, 10 pages.
International Search Report and Written Opinion in PCT/US2015/064071dated Mar. 16, 2016, 14 pages.
International Search Report and Written Opinion in PCT/US2016/016211 dated Apr. 13, 2016, 8 pages.
International Search Report and Written Opinion in PCT/US2016/026514 dated Jun. 8, 2016, 11 pages.
International Search Report and Written Opinion in PCT/US2016/026520 dated Jul. 5, 2016, 11 pages.
International Search Report and Written Opinion in PCT/US2016/054774 dated Dec. 16, 2016, 11 pages.
International Search Report and Written Opinion in PCT/US2016/066997 dated Mar. 20, 2017, 10 pages.
International Search Report and Written Opinion in PCT/US2017/039514 dated Oct. 10, 2017, 9 pages.
International Search Report and Written Opinion in PCT/US2017/040054 dated Sep. 21, 2017, 14 pages.
International Search Report and Written Opinion in PCT/US2019/053123 dated Jan. 7, 2020, 10 pages.

* cited by examiner

COMPUTING DEVICES 602

ON-DEMAND CODE EXECUTION COMPUTING RESOURCE MANAGEMENT

BACKGROUND

Computing systems can utilize communication networks to exchange data. In some implementations, a computing system can receive, and process data provided by another computing system. For example, a computing system receive data entered using another computing system, store the data, process the data, and so on.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any specific element or act, the most significant digit(s) in a reference number typically refers to the figure number in which that element is first introduced.

DETAILED DESCRIPTION

Figure 1:
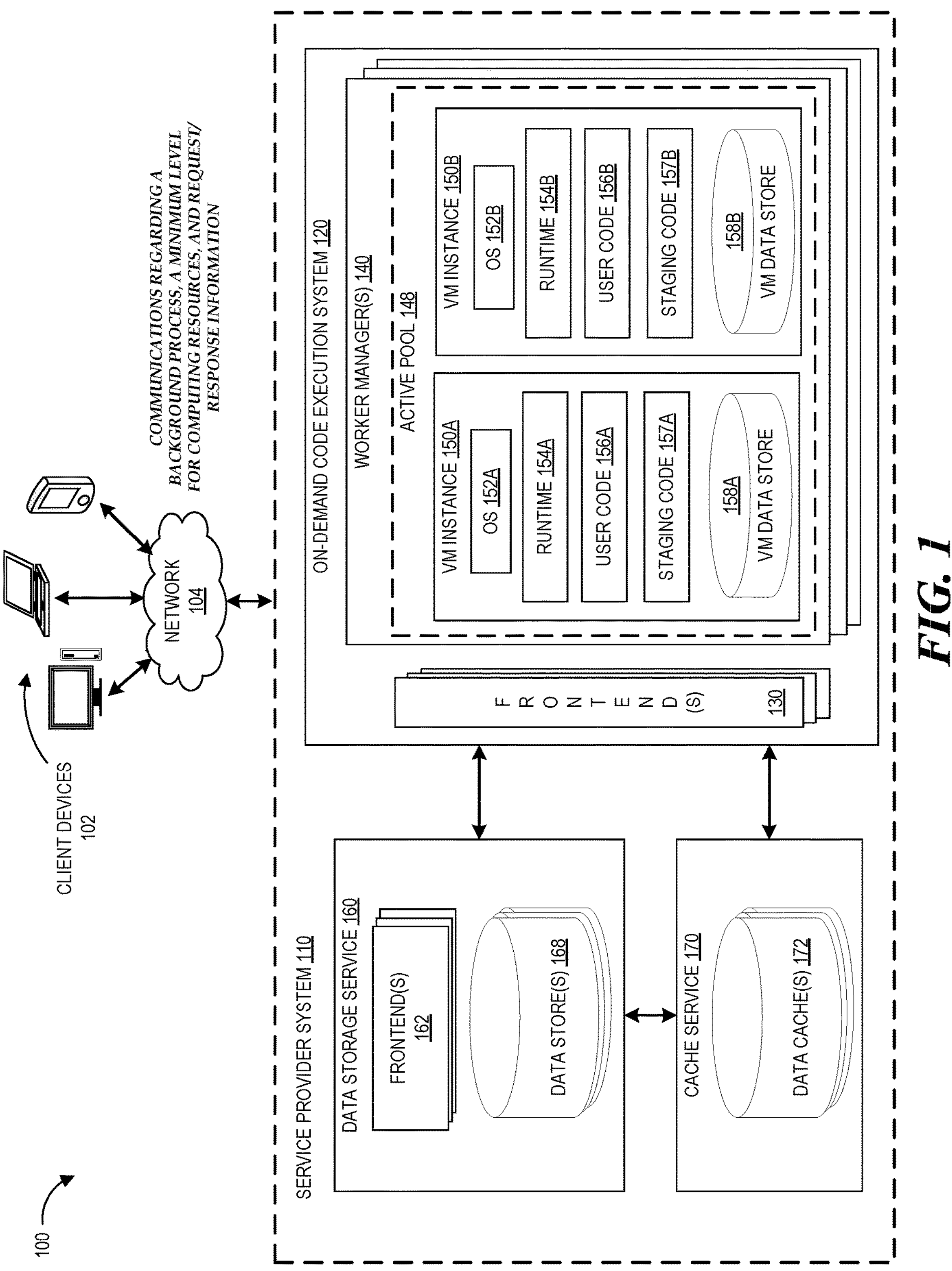
FIG. 1 is a block diagram of an illustrative computing environment in which environment in which an on-demand code execution system can operate in conjunction with a data storage system according to some embodiments.

The present disclosure relates to managing application instances with code executing in an on-demand ("serverless") manner, including code that executes synchronously (e.g., according to a request-response model), and additional code that is longer running or executes asynchronously (e.g., as a background process outside of the request-response model). To provide computing resources for the additional code of such application instances even after the initially-requested application code has completed execution (e.g., after a response has been sent according to the request-response model), a protocol may be implemented for delaying de-allocation of computing resources allocated to the application instances. In this way, application developers can gain the benefits of an on-demand or "serverless" platform while ensuring that longer-running background process or other asynchronous tasks can also execute on the same platform.

Introduction

Some data centers may include a number of interconnected computing systems to provide computing resources to users of the data center. To facilitate increased utilization of data center resources, virtualization technologies allow a single physical computing device to host one or more instances of virtual execution environments that appear and operate as independent computing devices to users of a data center. With virtualization, the single physical computing device can create, maintain, delete, or otherwise manage virtual execution environments such as virtual machines (VMs), microVMs, containers, or other virtual computing components in a dynamic manner. In turn, users can request computer resources from a data center, including single computing devices or a configuration of networked computing devices, and be provided with varying numbers of virtual resources.

In addition to computational resources, data centers provide a number of other beneficial services to client devices. For example, data centers may provide data storage services configured to store data submitted by client devices and enable retrieval of that data over a network. A variety of types of data storage services can be provided, often varying according to their input/output (I/O) mechanisms. Some data centers include an on-demand code execution system, sometimes referred to as a serverless function execution system.

Generally described, on-demand code execution systems enable execution of arbitrary user-designated function or application code, without requiring the user to create, maintain, or configure an execution environment (e.g., a physical or virtual machine) in which the function or application code is executed. For example, whereas conventional computing services often require a user to provision a specific device (virtual or physical), install an operating system on the device, configure application settings, define network interfaces, and so on, an on-demand code execution system may enable a user to submit code and may provide to the user an application programming interface (API) that, when used, enables the user to request execution of the code. Upon receiving a call through the API, the on-demand code execution system may dynamically generate an execution environment for the code, provision the environment with the code, execute the code, and provide a result. Thus, an on-demand code execution system can remove a need for a user to handle configuration and management of environments for code execution. Due to the flexibility of on-demand code execution system to execute arbitrary function or application code, such a system can be used to create a variety of network services. For example, such a system could be used to create a "micro-service," a network service that implements a small number of functions (or only one function), and that interacts with other services to provide an application. As another example, such a system could be used to implement a software-as-a-service (SaaS) platform that provides customers with the ability to deploy entire applications in an on-demand serverless manner (instead of—or in addition to—individual functions).

In the context of on-demand code execution systems, the instance of function or application code executing to provide such a service is often referred to as "invoked code," or more specifically as an "invoked function" or an "invoked application," or simply as "code," a "function," or an "application," respectively, for brevity. The terms "application," "application code," and "application software" are used herein in accordance with their usual and customary meaning in the field of computer technology, and refer to a computer program (or set of computer programs) designed to carry out a specific task (or set of tasks) other than those relating solely to the operation of a computing system itself. "Functions," "function code," or "function software" may define a "task," and implement specific functionality corresponding to that task when executed on a virtual machine instance of the on-demand code execution system. Applications may include functions or may call external functions. Applications are typically executed by or at the instruction of end users but are not necessarily interactive. For example, an application may be scheduled to execute or be triggered to execute in response to an event and may perform various processing tasks before terminating without any end user interaction.

The infrastructure or configuration of an on-demand code execution system may place certain limitations on running functions or applications. In some cases, these limitations can interfere with or prevent use of the on-demand code execution system to execute long-running processes (e.g., background processes, asynchronous processes) in addition to executing function or application code according to a request-response model or other synchronous execution model. For example, it may be desirable to run a background process requiring a small amount of computing resources for a relatively long period of time (compared to execution according to a request-response model), while also being able to scale additional computing resources as required for other operations (e.g., processing requests in a synchronous manner). However, conventional on-demand code execution systems allocate resources only to meet the requirements of an invoked function according to a request-response model or other synchronous execution model. Users requiring a longer-running process in addition to this are required to create, maintain, or configure a separate execution environment for that process, which, for those users, significantly reduces the deployment and management benefits of using an on-demand code execution system. To avoid deploying an application or system across different environments and platforms, users may opt to create, configure, and maintain a single execution environment outside of the on-demand code execution service, which altogether eliminates the cost, deployment, and management benefits of using an on-demand code execution.

Some aspects of the present disclosure address some or all of the issues noted above, among others, with an on-demand code execution system that allocates computing resources to applications in a dynamic manner and provides for delayed de-allocation of some or all of the computing resources depending upon the processing needs of individual application components. Dynamic provisioning of computing resources provides a desired degree of performance to finish request-response or other synchronous operations, while also allowing a background or asynchronous process to run to completion in a resource-efficient and cost-effective manner. This dynamic resource provisioning can provide time and computing resources for applications to complete background process, without requiring the resources to be provisioned to the applications permanently or otherwise for substantially longer than needed to complete execution of desired code.

With reference to an illustrative embodiment, an on-demand code execution system may provision computing resources to a virtual execution environment for an application to complete a synchronous operation (e.g., a specific task or function such as creating a ticket-id for a helpdesk ticket). In this example, a request proxy module or some other component of the on-demand code execution system may communicate to the virtual execution environment to execute the synchronous operation (e.g., create the helpdesk ticket). In response, an application running in the virtual execution environment may complete this synchronous task (e.g., create the helpdesk ticket) and generate a response (e.g., a message including the ticket-id). In addition, the application may execute longer-running or asynchronous code related to the initial request (e.g., additional ticket setup or processing tasks), and may therefore require continued availability of some or all of the computing resources after completion of the initial task according to the request-response protocol. Conventional serverless code execution platforms automatically de-allocate some or all resources allocated for code execution after execution completes according to the request-response model, thereby interfering with or effectively ending execution of additional longer-running or asynchronous code. In contrast, an on-demand code execution system implemented according to the present disclosure can delay de-allocation of the computing resources to allow execution of longer-running or asynchronous code to complete. For example, to ensure that the resources are not de-allocated from the application before completion of the longer-running or asynchronous code, the request proxy or some other component of the on-demand code execution system may send a notification to the application that computing resources are going to be de-allocated. If the application requires additional time to complete execution of the longer-running or asynchronous code, the application may respond to the notification with a request to delay de-allocation. In response to such a request to delay de-allocation, the on-demand code execution system may delay the de-allocation of resources for a predetermined or dynamically determined period of time. In this way, the application is afforded an opportunity to complete execution of code outside of a request-response model, without requiring the on-demand code execution system to allocate resources to the application permanently or otherwise for substantially longer than needed.

Additional aspects of the present disclosure relate to managing the requested de-allocation of computing resources such that allocation of the resources does not exceed certain parameters (e.g., maximum delay time or delay quantity thresholds), even if further delays to de-allocation are requested. In some embodiments, the request proxy module or some other component of the on-demand code execution system may allow a maximum quantity of runtime extensions to be granted. In other embodiments, there may be a maximum total length of time that de-allocation may be delayed. For example, a virtual execution environment may request for an nth runtime extension (e.g., a sixth runtime extension) but the request proxy module or some other component of the on-demand code execution system, may only allow n−1 runtime extensions (e.g., five runtime extensions total). In this example, the request proxy module or some other component of the on-demand code execution system may deny the request because the maximum quantity of runtime extensions has been exceeded. In another example, the virtual execution environment may request for a runtime extension that, if granted, would result in a total accumulated length of time de-allocation has been delayed to exceed a threshold (e.g., a total accumulated length of time exceeding two minutes, when two minutes is the maximum accumulated length of time that de-allocation may be delayed for security or resource management purposes). In this example, the request proxy module or some other component of the on-demand code execution system, may deny the request because the maximum length of time a runtime extension can be extended would be exceeded. Thus, in some embodiments: (i) if the virtual execution environment does not request a runtime extension for a single synchronous operation, (ii) the maximum quantity of runtime extensions would be exceeded for the single synchronous operation, or (iii) the maximum length of time a runtime extension can be extended by would be exceeded for the single synchronous operation, the on-demand code execution system may proceed with de-allocation of computing resources allocated to the virtual execution environment.

Various aspects of the disclosure will be described with regard to certain examples and embodiments, which are intended to illustrate but not limit the disclosure. Although aspects of some embodiments described in the disclosure will focus, for the purpose of illustration, management of on-demand code execution systems to fulfill user requirements for long-running background processes, the examples are illustrative only and are not intended to be limiting. In some embodiments, the techniques described herein may be applied to additional or alternative types of function code (e.g., subroutines), data sets, and on-demand code execution system configurations. Additionally, any feature used in any embodiment described herein may be used in any combination with any other feature or in any other embodiment, without limitation.

Example Network Environment

An on-demand code execution system may provide a network-accessible service enabling users to submit or designate computer-executable source code—also referred to herein simply as "code" for brevity—to be executed by virtual machine instances on the on-demand code execution system.

Code on the on-demand code execution system may define applications with interactive, request-response-based, or otherwise short-running processes. The applications may also have long-running background processes. Users may submit a computing resource level necessary to run the background processes. This level may be a minimum non-zero level of computing capacity allocated to a virtual machine instance for running the user submitted computer executable source code. Any background process submitted by a user may be initiated on startup of a virtual machine instance of the on-demand code execution system, or triggered by some other event (e.g., after responding to an initial request, after a period of time has elapsed, etc.). Long-running background processes may include, but are not limited to, monitoring of data storage for a change in the number of items in the data storage or monitoring of a queue containing user requests to determine whether a threshold number of requests has been reached. For example, a background process may monitor the number of items in a cache and send an alert if it reaches a threshold. In a non-limiting example, the cache may be 10,000 items. If the background process notes that this threshold has been hit, it may delete the cache or call another function/application or API to perform an action in response to this threshold being hit. In some aspects, the action may be to transmit a message to a client device. As another example, a background process may be used to monitor an external storage unit (e.g., cloud storage). In a non-limiting example, a background process may be configured to run at intervals to determine whether there is a new item (e.g., a file) in the container. If a new item is found, the background process may transmit a message to a client device.

Additionally, or alternatively, code on the on-demand code execution system may define a "task," and implement specific functionality corresponding to that task when executed on a virtual machine instance of the on-demand code execution system. Tasks may be implemented as stand-alone on-demand functions, or as features of a larger application (e.g., an application with an additional background process as described above). Individual implementations of the task on the on-demand code execution system may be referred to as an "execution" of the task (or a "task execution"). For example, the task may be implemented using a request-response protocol in which a request is received, and application or function code is invoked to respond to the request.

In some embodiments, the on-demand code execution system may enable users to directly trigger execution of an application or an individual task based on a variety of potential events, such as transmission of an API request or specially formatted hypertext transport protocol ("HTTP") packet to the on-demand code execution system. The on-demand code execution system can therefore execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre initialized (e.g., booted into an operating system and executing a complete or substantially complete runtime environment) and configured to enable execution of user-defined code, such that the code may be rapidly executed in response to a request to execute the code, without delay caused by initializing the virtual machine instance. The pre-warmed or pre initialized virtual machine instances may be allocated a minimum non-zero level of computing capacity to run a background process (es), as described above, and begin executing the process(es) when booted. Thus, when an execution of an "on-demand" task is triggered, the code corresponding to that task can be executed within a pre-initialized virtual machine in a very short amount of time. The background process(es) may continue to run during and subsequent to the execution of the "on-demand" task.

Specifically, to execute applications or individual tasks, the on-demand code execution system described herein may maintain a pool of executing virtual machine instances that are ready for use as soon as a request to execute a task is received. Due to the pre initialized nature of these virtual machines, delay (sometimes referred to as latency) associated with executing the application code or stand-alone task code (e.g., instance and language runtime startup time) can be significantly reduced, often to sub 100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. Any virtual machine instance may additionally be configured to run background process(es).

For example, a user may submit code necessary to begin execution of the background process(es) and provide a minimum non-zero level of computing capacity necessary to run the background process(es). The code necessary to begin execution of the background process(es) may include startup code run during bootup of a virtual machine instance and code containing data and instructions for the background process(es). In a non-limiting embodiment, the on-demand code execution system may boot a virtual machine instance with the minimum non-zero level of computing capacity allocated, and the virtual machine instance may begin executing the background process on execution of startup code provided by the user. A virtual machine instance running background process(es) may additionally execute task(s). For example, a virtual machine instance may be configured to run a background process to monitor the number of items in a cache and send an alert if it reaches a threshold. While this process is running the on-demand code execution system may receive a request to execute program code (a "task").

When the on-demand code execution system receives a request to execute a task, the on-demand code execution system may select a virtual machine instance for executing the program code of the user based on the one or more computing constraints related to the task (e.g., a required operating system or runtime) and cause the task to be executed on the selected virtual machine instance. The tasks can be executed in isolated containers that are created on the virtual machine instances or may be executed within a virtual machine instance isolated from other virtual machine instances acting as environments for other tasks. Since the virtual machine instances in the pool have already been booted and loaded with specific operating systems and language runtimes, and optionally background process(es) by the time the requests are received, the delay associated with finding compute capacity that can handle the requests (e.g., by executing the user code in one or more containers created on the virtual machine instances) can be significantly reduced.

As used herein, the term "virtual machine instance" is intended to refer to an execution of software or other executable code that emulates hardware to provide an environment or platform on which software may execute (an example "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). Virtual machine instances on the host device may share network bandwidth for communication with external computing resources. For example, multiple client devices may communicate with different subsets of virtual machine instances within the host device using allocated bandwidth controlled by the on-demand code-execution system. The on-demand code execution system may make adjustments to the allocations of network bandwidth based on processes being run the virtual machine instances on each host device.

While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, applications, tasks or other processes may be executed within a software "container," which provides a runtime environment without itself providing virtualization of hardware. Containers may be implemented within virtual machines to provide additional security or may be run outside of a virtual machine instance. Both virtual machine instances and containers can be configured to load and execute background process(es).

FIG. 1 is a block diagram of an illustrative operating environment 100 in which a service provider system 110 operates to enable client devices 102 to submit or request invocation of user-defined code by an on-demand code execution system 120.

By way of illustration, various example client devices 102 are shown in communication with the service provider system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like.

Generally described, the data storage service 160 can operate to enable clients to read, write, modify, and delete data, such as files, objects, blocks, or records, each of which represents a set of data associated with an identifier (an "object identifier" or "resource identifier") that can be interacted with as an individual resource. For example, an object may represent a single file submitted by a client device 102 (though the data storage service 160 may or may not store such an object as a single file). This object-level interaction can be contrasted with other types of storage services, such as block-based storage in which data is manipulated at the level of individual blocks or database storage in which data manipulation may occur at the level of tables or the like.

The data storage service 160 illustratively includes one or more frontends 162, which provide an interface (a command-line interface (CLIs), application programing interface (APIs), or other programmatic interface) through which client devices 102 can interface with the service 160 to configure the service 160 on their behalf and to perform I/O operations on the service 160. For example, a client device 102 may interact with a frontend 162 to create a collection of data objects on the service 160 (e.g., a "bucket" of objects) and to configure permissions for that collection. Client devices 102 may thereafter create, read, update, or delete objects within the collection based on the interfaces of the frontends 162. In one embodiment, the frontend 162 provides a REST-compliant HTTP interface supporting a variety of request methods, each of which corresponds to a requested I/O operation on the service 160. By way of non-limiting example, request methods may include:

- a GET operation requesting retrieval of an object stored on the service 160 by reference to an identifier of the object;
- a PUT operation requesting storage of an object to be stored on the service 160, including an identifier of the object and input data to be stored as the object;
- a DELETE operation requesting deletion of an object stored on the service 160 by reference to an identifier of the object; and
- a LIST operation requesting listing of objects within an object collection stored on the service 160 by reference to an identifier of the collection.

A variety of other operations may also be supported.

During general operation, frontends 162 may be configured to obtain a call to a request method and apply that request method to input data for the method. For example, a frontend 162 can respond to a request to PUT input data into the service 160 as an object by storing that input data as the object on the service 160.

Data may be stored, for example, on data stores 168, which correspond to any persistent or substantially persistent storage (including hard disk drives (HDDs), solid state drives (SSDs), network accessible storage (NAS), storage area networks (SANs), non-volatile random access memory (NVRAM), or any of a variety of storage devices known in the art). As a further example, the frontend 162 can respond to a request to access a data set or portion thereof from the service 160 by retrieving the requested data from the stores 168 (e.g., an object representing input data to a GET resource request), and returning the object to a requesting client device 102.

In some cases, calls to a request method may invoke one or more native data manipulations provided by the service 160. For example, a SELECT operation may provide an SQL-formatted query to be applied to an object (also identified within the request), or a GET operation may provide a specific range of bytes of an object to be returned.

The service provider system 110 illustratively includes a cache service 170 configured to cache data sets for code executed by the on-demand code execution system 120. Data may be cached, for example, on data caches 172, which correspond to any data storage such hard disk drives (HDDs), solid state drives (SSDs), network accessible storage (NAS), storage area networks (SANs), non-volatile random access memory (NVRAM), random access memory (RAM), or any of a variety o0f storage devices known in the art. Although illustrated as separate and outside of the data storage service and the on-demand code execution system 120, in some embodiments the cache service 170 may be implemented within one or both of the data storage service 160 or on-demand code execution system 120 (e.g., on physical or logical commuting systems that are part of the data storage service 160 or on-demand code execution system 120).

The client devices 102, data storage service 160, and on-demand code execution system 120 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The system 120 includes one or more frontends 130 which enable interaction with the on-demand code execution system 120. In an illustrative embodiment, the frontends 130 serve as a "front door" to the other services provided by the on-demand code execution system 120, enabling users (via client devices 102) to provide, request execution of, and view results of computer executable code. The frontends 130 include a variety of components to enable interaction between the on-demand code execution system 120 and other computing devices. For example, each frontend 130 may include a request interface providing client devices 102 with the ability to upload or otherwise communicate user-specified code to the on-demand code execution system 120 and to thereafter request execution of that code. In one embodiment, the request interface communicates with external computing devices (e.g., client devices 102, frontend 162, etc.) via a graphical user interface (GUI), CLI, or API. The frontends 130 process the requests and make sure that the requests are properly authorized. For example, the frontends 130 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," "function code," "application code," and "program code," may be used interchangeably. Such user code may be executed to achieve a specific function, for example, in connection with a specific data transformation developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, or Ruby (or another programming language).

To manage requests for code execution, the frontend 130 can include an execution queue, which can maintain a record of requested task executions. Illustratively, the number of simultaneous task executions by the on-demand code execution system 120 is limited, and as such, new task executions initiated at the on-demand code execution system 120 (e.g., via an API call, via a call from an executed or executing task, etc.) may be placed on the execution queue and processed, e.g., in a first-in-first-out order. In some embodiments, the on-demand code execution system 120 may include multiple execution queues, such as individual execution queues for each user account. For example, users of the service provider system 110 may desire to limit the rate of task executions on the on-demand code execution system 120 (e.g., for cost reasons). Thus, the on-demand code execution system 120 may utilize an account-specific execution queue to throttle the rate of simultaneous task executions by a specific user account. In some instances, the on-demand code execution system 120 may prioritize task executions, such that task executions of specific accounts or of specified priorities bypass or are prioritized within the execution queue. In other instances, the on-demand code execution system 120 may execute tasks immediately or substantially immediately after receiving a call for that task, and thus, the execution queue may be omitted.

The frontend 130 can further include an output interface configured to output information regarding the execution of tasks on the on-demand code execution system 120. Illustratively, the output interface may transmit data regarding task executions (e.g., results of a task, errors related to the task execution, or details of the task execution, such as total time required to complete the execution, total data processed via the execution, etc.) to the client devices 102 or the data storage service 160.

In some embodiments, the on-demand code execution system 120 may include multiple frontends 130. In such embodiments, a load balancer may be provided to distribute the incoming calls to the multiple frontends 130, for example, in a round-robin fashion. In some embodiments, the manner in which the load balancer distributes incoming calls to the multiple frontends 130 may be based on the location or state of other components of the on-demand code execution system 120. For example, a load balancer may distribute calls to a geographically nearby frontend 130, or to a frontend with capacity to service the call. In instances where each frontend 130 corresponds to an individual instance of another component of the on-demand code execution system 120, such as the active pool 148 described below, the load balancer may distribute calls according to the capacities or loads on those other components. Calls may in some instances be distributed between frontends 130 deterministically, such that a given call to execute a task will always (or almost always) be routed to the same frontend 130. This may, for example, assist in maintaining an accurate execution record for a task, to ensure that the task executes only a desired number of times. For example, calls may be distributed to load balance between frontends 130. Other distribution techniques, such as anycast routing, will be apparent to those of skill in the art.

The on-demand code execution system 120 further includes one or more worker managers 140 that manage the execution environments, such as virtual machine instances 150 (shown as VM instance 150A and 150B, generally referred to as a "VM"), used for servicing incoming calls to execute tasks. For example, the worker manager 140 may work with a supervisor process or processes. The supervisor process may be a part of the worker manager 140 or there may be a supervisor process associated with other components of the on-demand code execution system (e.g., a host device, a virtual machine, etc.). The supervisor process(es) may allocate resources to the execution environments. Additionally, or alternatively, the supervisor process(es) may generate execution environments with specific configurations and execute relevant startup code, where present. The startup code may include instructions to begin executing background process(es). While the following will be described with reference to virtual machine instances 150 as examples of such environments, embodiments of the present disclosure may utilize other environments, such as software containers. In the example illustrated in FIG. 1, each worker manager 140 manages an active pool 148, which is a group (sometimes referred to as a pool) of virtual machine instances 150 executing on one or more physical host computing devices that are initialized to execute a given task (e.g., by having the code of the task and any dependency data objects loaded into the instance).

Although the virtual machine instances 150 are described here as being assigned to a specific task, in some embodiments, the instances may be assigned to a group of tasks, such that the instance is tied to the group of tasks and any tasks of the group can be executed within the instance. For example, the tasks in the same group may belong to the same security group (e.g., based on their security credentials) such that executing one task in a container on a specific instance 150 after another task has been executed in another container on the same instance does not pose security risks. A task may be associated with permissions encompassing a variety of aspects controlling how a task may execute. For example, permissions of a task may define what network connections (if any) can be initiated by an execution environment of the task. As another example, permissions of a task may define what authentication information is passed to a task, controlling what network-accessible resources are accessible to execution of a task (e.g., objects on the service 160). In one embodiment, a security group of a task is based on one or more such permissions. For example, a security group may be defined based on a combination of permissions to initiate network connections and permissions to access network resources. As another example, the tasks of the group may share common dependencies, such that an environment used to execute one task of the group can be rapidly modified to support execution of another task within the group.

Additionally, or alternatively, in some embodiments the instances may be executing background process(es). For example, a virtual machine instance may be allocated a minimum level of resources to run background process(es). During booting of the virtual machine, the background process(es) may begin executing. Additionally, or alternatively, the user may submit startup code which is used to begin executing the background process(es). The background processes may run during and/or subsequent to a specific task or group of tasks. For example, a virtual machine instance may be configured to run a background process to monitor the number of items in a cache and send an alert if it reaches a threshold. While this process is running, the frontend 130 may receive a request to execute a task. In some embodiments, the background process may continue to run while the task is being processed. In some embodiments, multiple additional tasks may run simultaneously while the background process continues to execute. Additionally, or alternatively, multiple requests may be received at different times by frontend 130. The tasks associated with each request may be run while the background process continues to execute.

Once a triggering event to execute a task has been successfully processed by a frontend 130, the frontend 130 passes a request to a worker manager 140 to execute the task. In one embodiment, each frontend 130 may be associated with a corresponding worker manager 140 (e.g., a worker manager 140 co-located or geographically nearby to the frontend 130) and thus, the frontend 130 may pass most or all requests to that worker manager 140. In another embodiment, a frontend 130 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). In another embodiment, a frontend 130 may determine a worker manager 140 or individual host to which to pass the execution request based on a prior invocation of an application on the host (e.g., the application has been instantiated and may receive requests for processing while continuing to execute a background process). Various other mechanisms for distributing calls between worker managers 140 will be apparent to one of skill in the art.

Thereafter, the worker manager 140 may modify a virtual machine instance 150 (if necessary) and execute the code of the task within the instance 150. As discussed above, the instance 150 may already be running background process (es). The worker manager 140 may modify the virtual machine instance to execute the code of the task without interrupting execution of the background process(es). As shown in FIG. 1, respective instances 150 may have operating systems (OS) 152 (shown as OS 152A and 152B), language runtimes 154 (shown as runtime 154A and 154B), and user code 156 (shown as user code 156A and 156B). The OS 152, runtime 154, and user code 156 may collectively enable execution of the user code to implement the task. Thus, via operation of the on-demand code execution system 120, tasks may be rapidly executed within an execution environment.

In accordance with aspects of the present disclosure, each VM 150 additionally includes staging code 157 executable to facilitate staging of input data on the VM 150 and handling of output data written on the VM 150, as well as a VM data store 158 accessible through a local file system of the VM 150. Illustratively, the staging code 157 represents a process executing on the VM 150 (or potentially a host device of the VM 150) and configured to obtain data from the data storage service 160 or cache service 170 and place that data into the VM data store 158. The staging code 157 can further be configured to obtain data written to a file within the VM data store 158, and to transmit that data to the data storage service 160 or cache service 170. Because such data is available at the VM data store 158, user code 156 is not required to obtain data over a network, simplifying user code 156 and enabling further restriction of network communications by the user code 156, thus increasing security. Rather, as discussed above, user code 156 may interact with input data and output data as files on the VM data store 158, by use of file handles passed to the code 156 during an execution. In some embodiments, input and output data may be stored as files within a kernel-space file system of the data store 158. In other instances, the staging code 157 may provide a virtual file system, such as a filesystem in user-space (FUSE) interface, which provides an isolated file system accessible to the user code 156, such that the user code's access to the VM data store 158 is restricted.

As used herein, the term "local file system" generally refers to a file system as maintained within an execution environment, such that software executing within the environment can access data as file, rather than via a network connection. In accordance with aspects of the present disclosure, the data storage accessible via a local file system may itself be local (e.g., local physical storage), or may be remote (e.g., accessed via a network protocol, like NFS, or represented as a virtualized block device provided by a network-accessible service). Thus, the term "local file system" is intended to describe a mechanism for software to access data, rather than physical location of the data.

The VM data store 158 can include any persistent or non-persistent data storage device. In one embodiment, the VM data store 158 is physical storage of the host device, or a virtual disk drive hosted on physical storage of the host device. In another embodiment, the VM data store 158 is represented as local storage, but is in fact a virtualized storage device provided by a network accessible service. For example, the VM data store 158 may be a virtualized disk drive provided by a network-accessible block storage service. In some embodiments, the data storage service 160 may be configured to provide file-level access to objects stored on the data stores 168, thus enabling the VM data store 158 to be virtualized based on communications between the staging code 157 and the service 160. For example, the data storage service 160 can include a file-level interface providing network access to objects within the data stores 168 as files. The file-level interface may, for example, represent a network-based file system server (e.g., a network file system (NFS)) providing access to objects as files, and the staging code 157 may implement a client of that server, thus providing file-level access to objects of the service 160.

In some instances, the VM data store 158 may represent virtualized access to another data store executing on the same host device of a VM instance 150. For example, an active pool 148 may include one or more data staging VM instances (not shown in FIG. 1), which may be co-tenanted with VM instances 150 on the same host device. A data staging VM instance may be configured to support retrieval and storage of data from the service 160 (e.g., data objects or portions thereof, input data passed by client devices 102, etc.), and storage of that data on a data store of the data staging VM instance. The data staging VM instance may, for example, be designated as unavailable to support execution of user code 156, and thus be associated with elevated permissions relative to instances 150 supporting execution of user code. The data staging VM instance may make this data accessible to other VM instances 150 within its host device (or, potentially, on nearby host devices), such as by use of a network-based file protocol, like NFS. Other VM instances 150 may then act as clients to the data staging VM instance, enabling creation of virtualized VM data stores 158 that, from the point of view of user code 156A, appear as local data stores. Beneficially, network-based access to data stored at a data staging VM can be expected to occur very quickly, given the co-location of a data staging VM and a VM instance 150 within a host device or on nearby host devices.

While some examples are provided herein with respect to use of IO stream handles to read from or write to a VM data store 158, IO streams may additionally be used to read from or write to other interfaces of a VM instance 150 (while still removing a need for user code 156 to conduct operations other than stream-level operations, such as creating network connections). For example, staging code 157 may "pipe" input data to an execution of user code 156 as an input stream, the output of which may be "piped" to the staging code 157 as an output stream. As another example, a staging VM instance or a hypervisor to a VM instance 150 may pass input data to a network port of the VM instance 150, which may be read-from by staging code 157 and passed as an input stream to the user code 157. Similarly, data written to an output stream by the task code 156 may be written to a second network port of the instance 150A for retrieval by the staging VM instance or hypervisor. In yet another example, a hypervisor to the instance 150 may pass input data as data written to a virtualized hardware input device (e.g., a keyboard) and staging code 157 may pass to the user code 156 a handle to the IO stream corresponding to that input device. The hypervisor may similarly pass to the user code 156 a handle for an IO stream corresponding to a virtualized hardware output device, and read data written to that stream as output data. Thus, the examples provided herein with respect to file streams may generally be modified to relate to any IO stream.

The data storage service 160, cache service 170, and on-demand code execution system 120 are depicted in FIG. 1 as operating in a distributed computing environment including several computer systems that are interconnected using one or more computer networks (not shown in FIG. 1). The data storage service 160, cache service 170, and on-demand code execution system 120 could also operate within a computing environment having a fewer or greater number of devices than are illustrated in FIG. 1. Thus, the depiction of the data storage service 160, cache service 170, and on-demand code execution system 120 in FIG. 1 should be taken as illustrative and not limiting to the present disclosure. For example, the on-demand code execution system 120 or various constituents thereof could implement various Web services components, hosted or "cloud" computing environments, or peer to peer network configurations to implement at least a portion of the processes described herein. In some instances, the data storage service 160, cache service 170, and on-demand code execution system 120 may be combined into a single service. Further, the data storage service 160, cache service 170, and on-demand code execution system 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the data storage service 160, cache service 170, and on-demand code execution system 120 are illustrated as connected to the network 104. In some embodiments, any of the components within the data storage service 160, cache service 170, and on-demand code execution system 120 can communicate with other components of the on-demand code execution system 120 via the network 104. In other embodiments, not all components of the data storage service 160, cache service 170, and on-demand code execution system 120 are capable of communicating with other components of the virtual execution environment 100. In one example, only the frontends 130 and 162 (which may in some instances represent multiple frontends) of the on-demand code execution system 120 and the data storage service 160, respectively, may be connected to the network 104, and other components of the data storage service 160 and on-demand code execution system 120 may communicate with other components of the environment 100 via the respective frontends 130 and 162.

While some functionalities are generally described herein with reference to an individual component of the data storage service 160, cache service 170, and on-demand code execution system 120, other components or a combination of components may additionally or alternatively implement such functionalities. Thus, the specific configuration of elements within FIG. 1 is intended to be illustrative.

Figure 2:
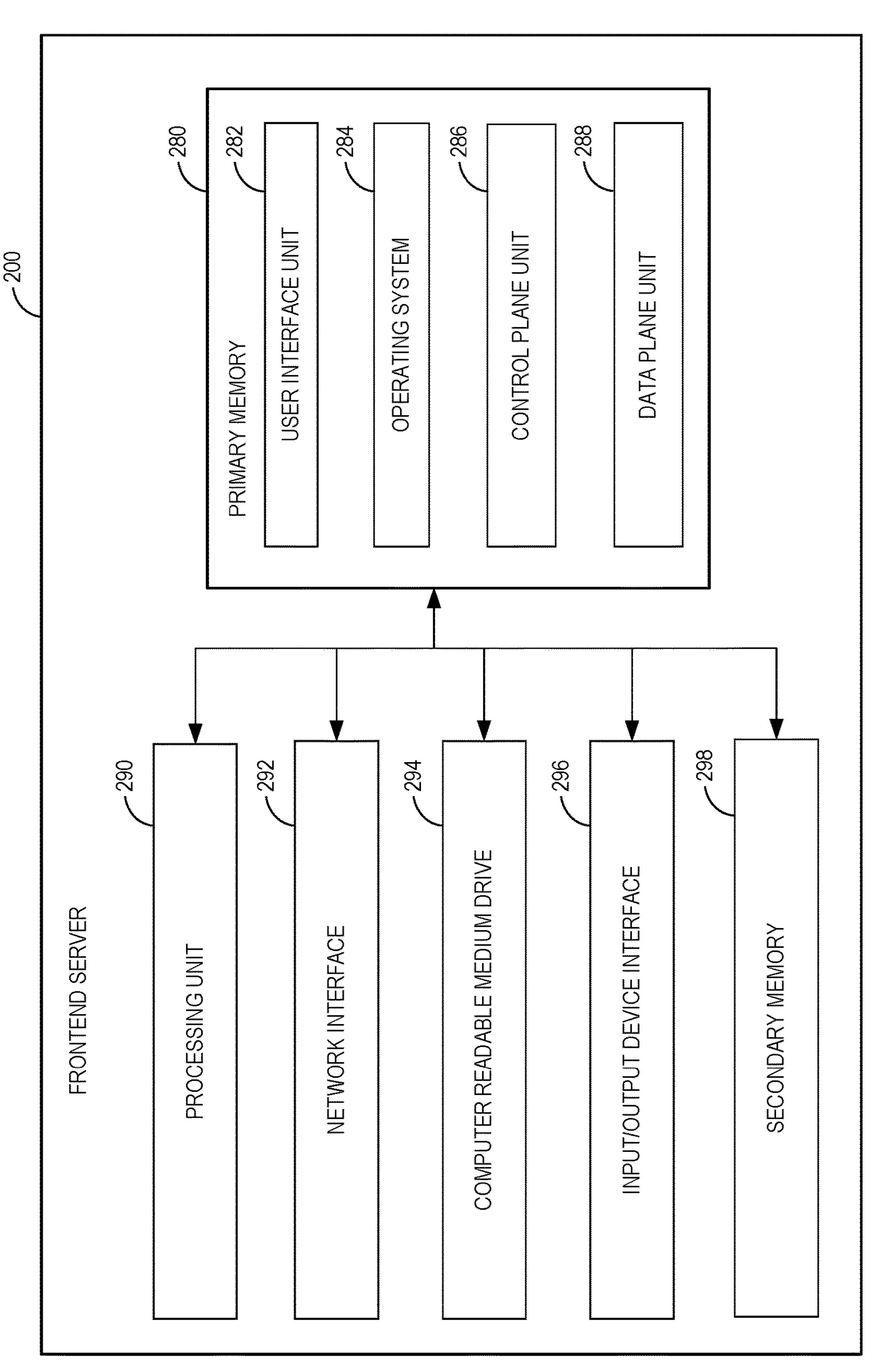
FIG. 2 is a block diagram of an illustrative computing system configured to provide data management across function invocations in the on-demand code execution system according to some embodiments.

FIG. 2 depicts a general architecture of a frontend server 200 computing device implementing a frontend 162 of FIG. 1. The general architecture of the frontend server 200 depicted in FIG. 2 includes an arrangement of computer hardware and software that may be used to implement aspects of the present disclosure. The hardware may be implemented on physical electronic devices, as discussed in greater detail below. The frontend server 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the frontend server 200 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from primary memory 280 or secondary memory 298 and further provide output information for an optional display (not shown) via the input/output device interface 296. The input/output device interface 296 may also accept input from an optional input device (not shown).

The primary memory 280 or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, and the like. The primary memory 280 is assumed for the purposes of description to represent a main working memory of the worker manager 140, with a higher speed but lower total capacity than secondary memory 298.

The primary memory 280 may store an operating system 284 that provides computer program instructions for use by the processing unit 290 in the general administration and operation of the frontend server 200. The memory 280 may further include computer program instructions and other information for implementing aspects of the present disclosure. For example, in one embodiment, the memory 280 includes a user interface unit 282 that generates user interfaces (or instructions therefor) for display upon a computing device, e.g., via a navigation or browsing interface such as a browser or application installed on the computing device.

The memory 280 may include a control plane unit 286 and data plane unit 288 each executable to implement aspects of the present disclosure. Illustratively, the control plane unit 286 may include code executable to enable definition or submission of function code to be executed. The data plane unit 288 may illustratively include code enabling handling of I/O operations on the data storage service 160 or cache service 170, including retrieving data sets, generating data references to be used by other functions to access the data sets, caching the data sets, etc.

The frontend server 200 of FIG. 2 is one illustrative configuration of such a device, of which others are possible. For example, while shown as a single device, a frontend server 200 may in some embodiments be implemented as multiple physical host devices. Illustratively, a first device of such a frontend server 200 may implement the control plane unit 286, while a second device may implement the data plane unit 288.

While described in FIG. 2 as a frontend server 200, similar components may be utilized in some embodiments to implement other devices shown in the environment 100 of FIG. 1. For example, a similar device may implement a worker manager 140, as described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 patent"), the entirety of which is hereby incorporated by reference.

Example Lifecycle of a Virtual Machine

Figure 3:
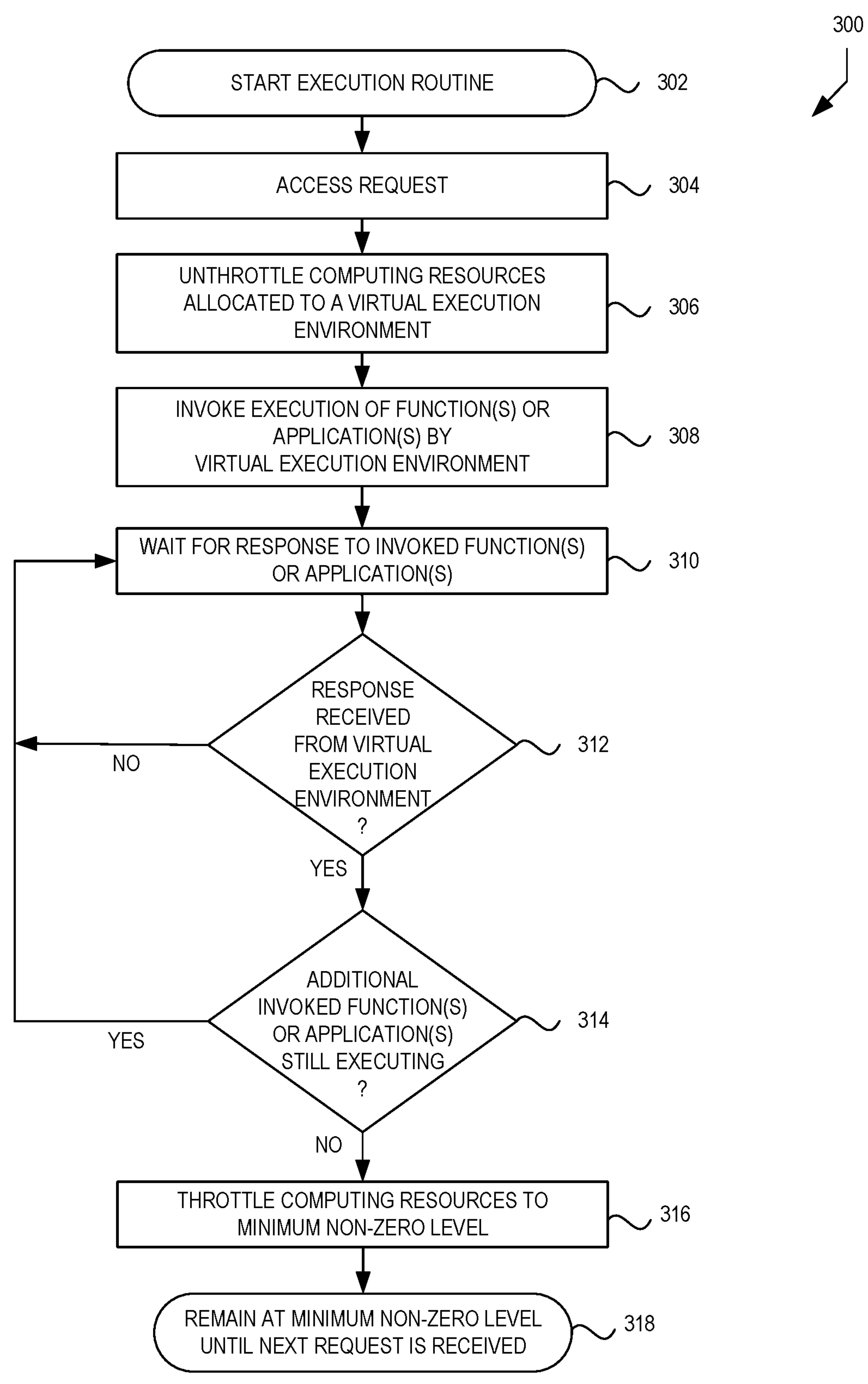
FIG. 3 illustrates an example routine for a request/response cycle executed on a virtual execution environment (e.g., a virtual machine instance, a container, etc.) by an on-demand code execution system.

FIG. 3 illustrates an example routine 300 for managing computing resources allocated to a virtual execution environment (e.g., a virtual machine instance, a container, or another virtual computing component) during a request/response cycle. The virtual execution environment described herein may be pre-warmed or pre-initialized to run a background process, as described above with reference to FIG. 1. As a review, the virtual execution environment may be allocated a minimum non-zero level of computing capacity and may be executing a background process. The execution routine begins at block 302.

At block 304, the on-demand code execution system (e.g., on-demand code execution system 120 of FIG. 1) may access a request. The request may be submitted from a client device (e.g., client devices 102 of FIG. 1). Once submitted, the request may be processed by a frontend (e.g., frontend 130 of FIG. 1). Additionally, or alternatively, the request may be received by a request proxy of a virtual execution environment. The request proxy may be a component of a virtual execution environment configured to monitor requests from client devices. The request proxy may subsequently communicate with other components of the virtual execution environment in order to generate a response to each request. For example, requests received from client devices may be stored. For example, requests received from client devices may be stored in a queue. The request proxy may retrieve and/or remove requests from the queue. The request proxy may then determine what actions need to be taken to generate a response to the request. For example, the request proxy may determine that the level of computing capacity allocated to the virtual execution environment needs to be increased and that certain functions should be invoked to obtain the response. The request proxy may then generate instructions to take these actions, as will be discussed in more detail at blocks 306 and 308.

At block 306, the on-demand code execution system may adjust the computing resources allocated to a virtual execution environment. In some embodiments, the adjustment may be to increase the level of computing capacity allocated to a virtual execution environment. Such an adjustment may be referred to as "unthrottling" the computing resources, in contrast to "throttling" the computing resources whereby the adjustment is to reduce level computing capacity allocated to the virtual execution environment. For example, a virtual execution environment allocated a minimum non-zero level of computing capacity may be unthrottled to a maximum level of computing capacity, where the maximum level of computing capacity is greater than the minimum non-zero level of computing capacity. In some embodiments, this action may be performed by the request proxy described at block 304. For example, in some embodiments, the request proxy may communicate with a supervisor process to unthrottle resources allocated to the virtual execution environment. Of course, in some embodiments the supervisor process may access and/or remove requests from a queue and unthrottle computing resources for a virtual execution environment in response to the request.

In some embodiments, the minimum non-zero level of computing capacity and maximum non-zero level of computing capacity may be specified by the client device. For example, the client device may provide configuration data for the virtual execution environment including application and function code and a minimum non-zero level of computing capacity. In some embodiments, the configuration data may also include a maximum level of computing capacity that is greater than the minimum level of computing capacity. The maximum level of computing capacity may be configured to be sufficient to allow the execution of invoked function(s) or application(s). Application configuration data may also specify a background process, and a request/response process. In further embodiments, the configuration data may define a range of computing resources bounded by the minimum non-zero level of computing capacity and the maximum level of computing capacity. In some embodiments, the configuration data may specify intermediate levels for each function or application configured to be run by the virtual execution environment, where the intermediate levels fall within the range of computing resources.

In some embodiments, the maximum level of computing capacity may be specified by the supervisor process. For example, the request proxy or the supervisor process may determine that an application needs to be invoked to generate a response to a request. The supervisor process may then determine a maximum level of computing capacity based on the amount of resources required to run the invoked application. The determination may be based on past data relating to computing resources allocated when the application was successful in generating the requested response as opposed to computing resources allocated when the application failed to generate the requested response. While the previous example specified an invoked application, the same process could also be applied to an invoked function. The process may also be applied to each function or application configured to run in the virtual execution environment.

As another example, the supervisor process may determine a maximum level of computing capacity for a virtual execution environment based on resources allocated to other virtual execution environments under supervision by the supervisor process. For example, the supervisor process may be a component of a host device included in the on-demand code execution system. The host device may have a certain amount of computing resources, such as memory and/or network bandwidth, available for allocation to virtual execution environments which may run on the host device. The supervisor process may determine how those computing resources should be allocated to the virtual execution environments running on the host device. For example, the host device may have available computing resources including network bandwidth of 10 megabits per second (Mbps) and a processing capacity of 10 vCPUs, where each vCPU may be equivalent to a CPU core. Additionally, or alternatively, each vCPU may be equivalent to CPU time, which may be an allocation of processing time on available processing resources. If 10 virtual execution environments are running on the host device, then each device may be allocated 1 Mbps of network bandwidth and 1vCPU.

In some embodiments, each execution environment may be running a background process and be initially allocated a minimum non-zero level of computing capacity out of the available computing resources of the host device. The remainder of the available computing resources may be allocated as needed to enable task execution by the virtual execution environments. For example, referring back to the previous example, 10 virtual machines may run on a host device with available computing resources including a network bandwidth of 10 Mbps and a processing capacity of 10 vCPUs. The minimum non-zero level for each environment may be 0.1 Mbps and 0.1 vCPU. Accordingly, the remainder of the available computing resources may be 9 Mbps and 9 vCPU. Typically, a virtual execution environment may have a maximum level of computing capacity of less than the remainder of the available computing resources (e.g., 2 Mbps or 2 vCPU). However, the total of the maximum level of computing capacity for each virtual environment on the host computing device may exceed the remainder of the available computing resources (e.g., if 10 virtual execution environments had a total maximum level of 12 vCPUs). Such a scenario—which may be referred to as oversubscription—may nevertheless be managed so as not to negatively affect the virtual execution environments (e.g., by provisioning virtual execution environment together that are unlikely to require their respective maximum levels of computing capacity concurrently).

In some embodiments, a virtual execution environment may have a maximum level of computing capacity greater than the maximum available computing resources (e.g., maximum of 9.1 Mbps and 9.1 vCPU in the example above). If the request proxy generates instructions to unthrottle resources associated with the virtual execution environment to the maximum level, the supervisor process may allocate the remainder of the available computing resources to that virtual execution environment.

Although the examples above have the same minimum non-zero level for each virtual execution environment, the minimum non-zero level may vary between virtual execution environments. The allocation of the available computing resources may be shifted between virtual execution environments of the host device provided that the amount of computing resources allocated to all of the virtual execution environments of the host device is within the available computing resources of the host device and each virtual execution environment is allocated at least the minimum non-zero level of computing capacity for that virtual execution environment. For example, a virtual execution environment may be configured such that the computing resources allocated to the virtual machine may fall within a range defined by a minimum non-zero level and a maximum non-zero level. In addition, multiple virtual execution environments may be unthrottled simultaneously, provided that the amount of computing resources allocated to all of the virtual execution environments of the host device is within the available computing resources of the host device.

In a non-limiting embodiment, the computing resources for a virtual execution environment may not be unthrottled because the computing resources were already unthrottled to actively process another request. For example, a first request may be accessed and/or removed from a queue by the request proxy. Based, at least in part, on the request, the request proxy may instruct the supervisor process to unthrottle resources to a maximum level and/or invoke an application to generate a first response to that request. While the virtual execution environment was generating the first response, the request proxy may access and remove a second request from the queue. Because the computing resources would still be unthrottled to a maximum level to generate the first response the first request, the resources would not be further unthrottled to generate a second response to the second request.

In some embodiments, the supervisor process may be a component of a worker manager (e.g., worker manager 140) and determine the level of computing capacity allocated to each virtual execution environments (e.g., virtual machines, containers, etc.) hosted by the worker manager. For example, a worker manager may have access to certain amount of computing resources. Those computing resources are available to be allocated to the virtual execution environments hosted by the worker manager. Each virtual execution environment may be allocated a minimum non-zero level of computing capacity. Each virtual execution environment may be allocated additional computing resources from the remainder of the available computing resources accessible to the worker manager, as described above with respect to the example of host devices. In some embodiments, other components of the on-demand code execution system (e.g., a host device, a virtual machine, etc.) may include a supervisor process. The supervisor process may have access to available computing resources for a worker manager, host device, or similar entity. The amount of available computing resources may vary based on demands of other virtual execution environments of the worker manager, host device, or similar entity. The supervisor process may be configured to request allocation of computing resources, greater than the minimum non-zero level, necessary to generate a response to request(s). For example, a maximum level of computing capacity may be defined within the configuration data for the virtual execution environment. The supervisor process may request the maximum level of computing capacity from a host device to generate a response to a request. The host device or a component of the host device may be configured to provide the maximum level of computing capacity to the virtual execution environment, if available. If the maximum level of computing capacity is not available, the host device or a component of the host device may be configured to allocate the available resources to the virtual execution environment.

At block 308, the on-demand code execution system may invoke execution of application(s) or function(s) on the virtual execution environment. In some embodiments, the on-demand code execution system may invoke the execution of multiple applications and/or functions in response to requests from a client device. In further embodiments, the response for each request may be generated in the order received. For example, a first request may be received from the client device. To generate a first response, the on-demand code execution system may invoke one or more functions. In embodiments with multiple functions, the functions may be executed in a pre-determined order to complete a set of processing tasks and generate the first response. Additionally, or alternatively, the on-demand code execution system may invoke an application to perform various processing tasks and generate the first response. The application may call one or more functions to execute these tasks. While the first response is being generated, a second request may be received from the client device. The on-demand code execution system may wait until the first response has been generated or until a set response period has timed out to invoke function(s) or application(s) to generate the second response.

In some embodiments, responses for multiple requests may be generated simultaneously. For example, the on-demand code execution system may receive a first request from a client device and invoke function(s) or application(s) to generate a first response to this request. While generating the first response, the on-demand code execution system may receive a second request from the client device. Without waiting for the until the first response has been generated or until a set response period has timed out, the on-demand code execution system may invoke function(s) or application(s) to generate the second response.

In some embodiments, the requests may be executed in order of importance. In some embodiments, each request may contain data indicating its importance with respect to the execution of other requests. For example, a request of high importance may contain an exclamation point or the text "High Importance." A request of medium importance may contain an exclamation point or the text "Medium Importance," and a request of low importance may contain an exclamation point or the text "Low Importance." In a non-limiting embodiment, a first request of medium importance may be received, a second request of high importance may be received, and a third request of low importance may be received simultaneously or in quick succession. The on-demand code execution system may generate a first response to the second request, followed by a second response to the first request, followed by a third response to a third request.

At blocks 310 and 312, the on-demand code execution system may determine whether a first response has been generated by the invoked function(s) or application(s). The determination may occur through receipt of the first response by a request proxy. In some embodiments, the virtual execution environment used to generate the first response may send the first response, once generated, to a request proxy. The request proxy may then forward the response to the client device. The client device may be the client device that initiated the request. Additionally, or alternatively, the client device that initiated the request may belong to a group of client devices which share a unique identifier. In some embodiments, the request proxy may forward the first response to all client devices of that group. In other embodiments, the request proxy may forward the first response to a subset of client devices of that group.

Additionally, or alternatively, after invoking the function (s) or application(s) as described above with respect to block 308, the request proxy may determine whether the response has been generated by monitoring the execution of the function(s) or application(s) and determining whether they have successfully executed. If they have successfully executed, the request proxy may retrieve the response and forward the response to a client device. Additionally, or alternatively, the supervisor process may obtain the response from the function/application and then provide it to the request proxy. Once a response is obtained, the on-demand code execution system may proceed to block 314 to determine whether additional invoked function(s) or application (s) are still executing. In some embodiments, the application may not generate a response at the completion of a particular function or task, or the response may be a confirmation or completion message that is not intended to be forwarded on to a client device (e.g., a confirmation that is only to be logged).

If no response is received or obtained by the request proxy, the on-demand code execution system may repeat blocks 310 and 312 until a response is received. Additionally, or alternatively, the on-demand code execution system may repeat blocks 310 and 312 for a set time period. If a response is not received or obtained during that set time period, the on-demand code execution system may proceed to block 314 to determine whether additional invoked function(s) or application(s) are still executing. In some embodiments, the set time period is provided in the configuration data for the virtual execution environments. In some embodiments, the on-demand code execution system may have a standard set time period for all virtual execution environments. In some embodiments, the set time period may be 15 minutes.

At block 314, the on-demand code execution system may determine whether additional function(s) or application(s) are still executing after the receipt of the first response or the timeout of a set time period to obtain a first response. The additional function(s) or application(s) may be associated with the generation of the first response. For example, the additional function(s) may be running to delete intermediate data created during the generation of the first response. Additionally, or alternatively, the additional function(s) or application(s) may have been invoked by the on-demand code execution system during the generation of a second response, where the second response is generated after receipt of a second request.

After determining that no additional function(s) or application(s) are still executing, the on-demand code execution system may determine whether additional requests have been received. For example, a request proxy may check a queue used to store received requests. If the queue is empty, the on-demand code execution system may proceed to throttle computing resources at block 316, where throttling computing resources decreases the computing capacity to the minimum non-zero level.

At block 316, the on-demand code execution system may throttle for the virtual execution environment to a minimum non-zero level. In some embodiments, the minimum non-zero level may be specified by a user. For example, the user may communicate the minimum non-zero level to the on-demand code execution system as part of configuration instructions. Additionally, or alternatively, the user may communicate the minimum non-zero level to the on-demand code execution system as part of a request. In some embodiments, the user may be associated with a customer account. For example, a customer account may be associated with a unique identifier. Each user associated with that customer account may share the unique identifier. Accordingly, the on-demand code execution system may accept communications associated with the unique identifier even if the communications come from multiple users.

The minimum non-zero level may be sufficient to continue execution of background process(es) of the virtual computing environment. For example, a virtual execution environment may be executing a background process at a first time. The virtual execution environment may continue executing the background process during the generation of a request to an on-demand request. After the response is received or the set time period to generate the response has timed out, the on-demand code execution system may check for additional requests as discussed above with respect to block 314. If there are no requests, the request proxy may communicate with the supervisor process to throttle resources to the virtual execution environment to a minimum non-zero level.

At block 318, the on-demand code execution system may remain at the minimum non-zero level until the next request is received. As discussed above, the background process(es) may still be executing. For example, background processes may include, but are not limited to, monitoring of data storage for a change in the number of items in the data storage or monitoring of a queue containing user requests to determine whether a threshold number of requests has been reached. On receipt of a new request, blocks 302-318 may repeat to generate a response to this request.

In some embodiments, a background process may communicate with another computing system during execution. For example, a background process may be used to monitor an external storage location (e.g., cloud storage). In a non-limiting example, a background process may be configured to run at intervals to determine whether there is a new item (e.g., a file) in the external storage location. If a new item is found, the background process may process the file, move the file to another location, transmit a message to the client device, or perform some other operation. If a message is sent to the client device, then the client device may take further action in response to the message. For example, the client device may transmit a new request to the on-demand code execution system in response to this message. Blocks 302-318 may repeat to generate a response to this request.

In some embodiments, the background process may cease executing. For example, the server including the virtual execution environment may fail. Another example may be the timeout of a virtual execution environment. For example, the virtual execution environment may be hosted by a host device. The host device may host the virtual machine for a predetermined time period. In a non-limiting embodiment, the pre-determined time period may be 6 hours. A background process may also stop executing when the customer deletes the application For example, the customer may send a request to a frontend that they no longer wish to have the virtual execution environment hosted on the host device.

Figure 4:
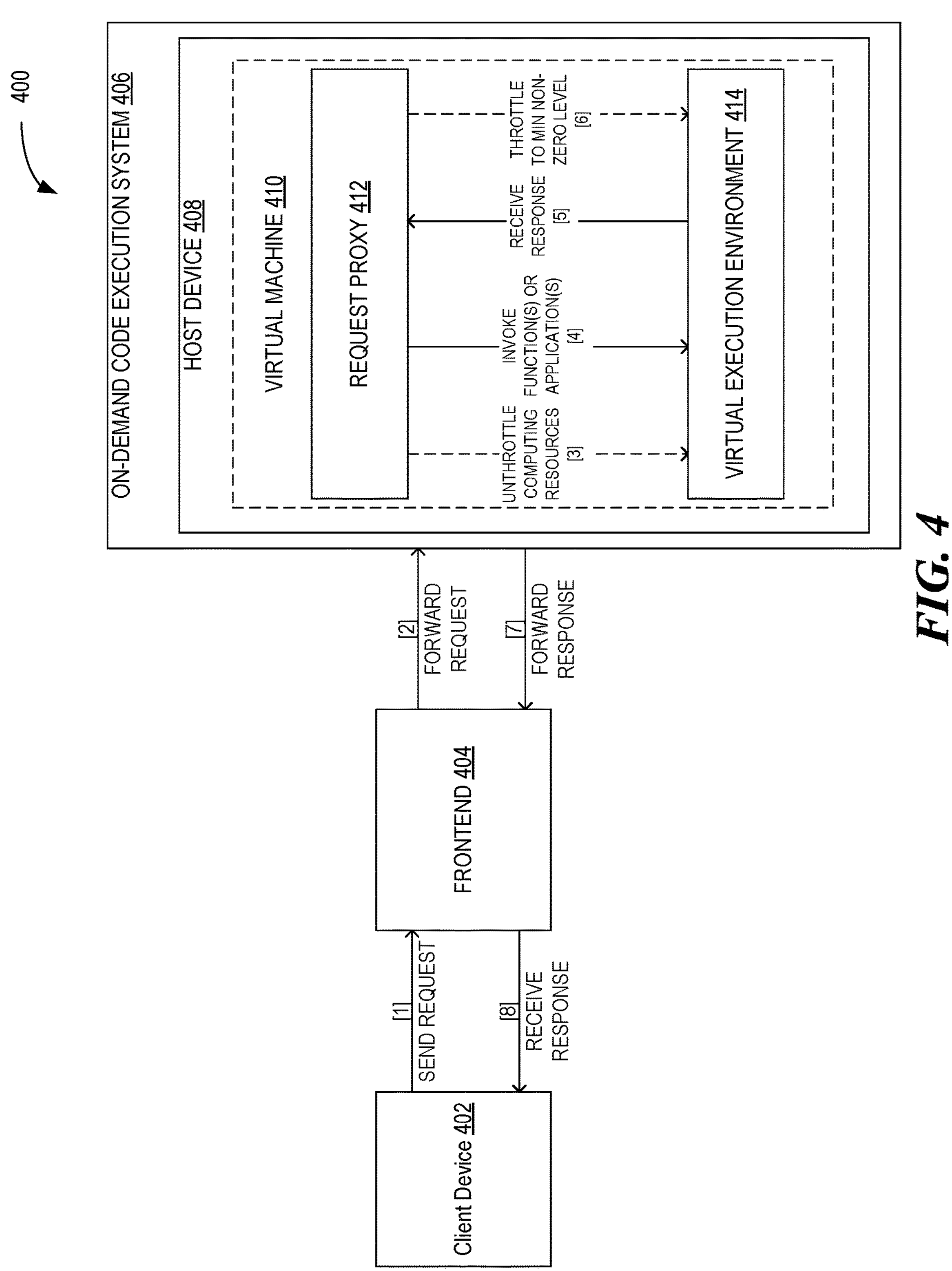
FIG. 4 illustrates a diagram depicting interactions between a client device and components of an on-demand code execution system during execution of a first request.

FIG. 4 illustrates a diagram depicting interactions 400 between a client device and components of an on-demand code execution system 406 during processing of a first request. Client device 402 may be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like. In some embodiments client device 402 may be one of client device(s) 102 of FIG. 1.

At [1], client device 402 may send a request. The request may include one or more tasks that the client device 402 requests to have executed to generate a specific response. Additionally, or alternatively, the request may contain data indicative of the importance of the request, such as a text string with the phrase "High Importance." In some embodiments, the request may contain additional data required for task execution. For example, the request may contain a level of computing capacity required to provide a response to the request. The level of computing capacity may be between a minimum non-zero level of computing capacity and a maximum level of computing capacity specified in configuration data for the virtual execution environment 414. In some embodiments, the virtual execution environment 414 may be a container for a customer application where the customer application may include function(s) which may be invoked by the request proxy 412. The request may also contain the data locations where the on-demand code execution may access any additional data required for task execution.

The client device 402 may transmit the request to a frontend, such as frontend 404. The frontend 404 may be external to the on-demand code execution center. Additionally, or alternatively, the client device 402 may transmit the request to a data storage, and the frontend 404 may retrieve the request from that data storage. In some embodiments the data storage may be a request queue, as will be discussed in more detail in FIGS. 5A-B. The frontend 404 may then forward the request at [2] to a component of the on-demand code execution system 406, such as the request proxy 412. Additionally, or alternatively, the frontend 404 may transmit the request to a data storage, such as a queue, and the request proxy 412 may retrieve the request from that queue.

In some embodiments, the on-demand code execution system 406 may contain one or more frontends (e.g., frontends 130 of FIG. 1). For example, the client device 402 may transmit the request to the on-demand code execution system. A frontend 130 may receive and process the request prior to providing the request to another component of the on-demand code execution system. Additionally, or alternatively, the client device 402 may transmit the request to a data storage, such as a queue, and the frontend 130 may retrieve the request from that data storage. The frontend 130 may then transmit the request to another component of the on-demand code execution system 406 including, but not limited to, host device 408, virtual machine 410, request proxy 412 or the virtual execution environment 414. For example, the frontend 130 may transmit the request to the request proxy 412. Additionally, or alternatively, the frontend 130 may transmit the request to a data storage, such as a queue, and the request proxy 412 may retrieve the request from that queue.

In some embodiments, both external frontends and internal frontends may be used to receive the request from the client device 402. For example, the client device may send a request to the external frontend 404 at [1]. The frontend 404 may forward the request at [2] to the on-demand code execution system at [2], and the on-demand code execution system may receive the request through one or more internal frontends (e.g., frontends 130 of FIG. 1). The request may be forwarded to components of the on-demand code execution system for processing. For example, the request may be forwarded to the request proxy 412 for processing. Additionally, or alternatively, an internal frontend may transmit the request to a data storage, such as a queue, and the request proxy 412 may retrieve the request from that queue.

The request proxy may be a component of the virtual machine 410, where the virtual machine 410 is hosted on host device 408, and host device 408 is a component of the on-demand code execution system 406. The request proxy may generate instructions to one or more virtual execution environments of the virtual machine 410. For example, the request proxy 412 may access the request, as described above, determine that a response can or should be generated to this request by virtual execution environment 414, and generate instructions based on the request to virtual execution environment 414. Virtual execution environment 414 may already be running background process(es) using a minimum non-zero level of computing capacity allocated to virtual execution environment 414.

In some embodiments, the virtual execution machine 410 may be an execution environment for a specific application, and the virtual machine may include a one or more virtual execution environments 414 for the application, such as one or more containers for the specific application. The request proxy may determine, based, at least partly, on the request that the specific application needs to be invoked to generate a response to the request. Additionally, or alternatively, the request proxy may determine based at least partly on the request that specific function(s) that are configured to be run in specific pre-initialized virtual execution environment need to be invoked to generate a response to the request. After making this determination, the request proxy 412 may generate instructions for that specific virtual execution environment, where the instructions may include instructions to unthrottle computing resources to the virtual execution environment and to invoke the required function(s) and/or applications. For example, the request proxy 412 may generate instructions to unthrottle computing resources and invoke function(s) or application(s) of the virtual execution environment 414 to generate a response to the request. In some embodiments, the request proxy 412 may generate instructions to more than one virtual execution environment. For example, the request proxy may determine that more than one virtual execution environment of the application (e.g., more than one container) is needed to generate a response to a request. Additionally, or alternatively, the request proxy may receive multiple requests where each request requires a function(s) and/or application(s) configured to be executed on different virtual execution environments Accordingly, the request proxy 412 may generate instructions for the multiple virtual execution environments to generate responses to the multiple request. The instructions to unthrottle the computing resources may be directed to a supervisor process, as described above with respect to FIG. 3 at block 306. In some embodiments, the supervisor process may be a component of the on-demand code execution system 406 and control resource allocation to host devices of the on-demand code execution system 406, such as host device 408.

In some embodiments, there may be a supervisor process that is a component of the host device 408 and controls resources allocated to virtual machines, such as virtual machine 410 hosted on the host device 408. The supervisor process of the host machine may operate in addition to a supervisor process of the on-demand code execution system 406. Of course, the supervisor process of the host device 408 may be the only supervisor process used to control resource allocation.

In some embodiments, there may be a supervisor process that is a component of the virtual machine 410 and controls resources allocated to virtual execution environments within the virtual machine 410. This supervisor process may operate in addition to a supervisor process of the host device 408 and/or the on-demand code execution system 406. Of course, the supervisor process of the virtual machine 410 may be the only supervisor process used to control resource allocation.

The request proxy 412 of a virtual machine 410 may work alone or with supervisor process(es) to generate a response to a request. For example, the request proxy 412 may access a request. Based, at least partly on this request, the request proxy 412 may send instructions to a supervisor process of the virtual machine 410 to unthrottle computing resources. The supervisor process may unthrottle computing resources as indicated by the dashed line at [3], where unthrottling computing resources refers to increasing the computing resources allocated to a virtual execution environment (e.g., virtual execution environment 414 of FIG. 4). For example, when the supervisor process receives instructions to unthrottle computing resources, it may allocate a maximum level of computing capacity to the virtual execution environment 414. Of course, the supervisor process may also allocate an intermediate level of computing capacity between a minimum non-zero level and a maximum level of computing capacity, as discussed above with respect to block 306 of FIG. 3. Alternatively, the request proxy 412 may directly unthrottle computing resources at [3] without using a separate supervisor process to do so.

In some embodiments, a supervisor process of the virtual execution machine 410 may communicate with a supervisor process of the host device 408, and/or a supervisor process of the on-demand code execution system 406 to request allocation of a maximum level of computing capacity to the virtual execution environment 414. The maximum level of computing capacity may be defined in configuration data for the virtual execution environment 414. Once the resources allocated to the virtual execution environment 414 are increased to the maximum level of computing capacity, the request proxy 412 may generate instructions to invoke function(s) or application(s) at [4] on virtual execution environment 414. Of course, in some embodiments, the request proxy 412 may simultaneously unthrottle computing resources at [3] and instructions to invoke function(s) or application(s) at [4].

The invoked function(s) or application(s) may generate a response to the request and forward this response at [5] to the request proxy 412. Additionally, or alternatively, the supervisor process may receive the response to the request from the invoked function(s) or application(s) and forward this response at [5] to the request proxy 412.

The request proxy 412 may receive the requested response at [5], transmitted by the virtual machine or a component of the virtual machine. Once the response is received, in some embodiments, the request proxy 412 may initiate throttling of the computing resources to a minimum non-zero level at [6]. The minimum non-zero level may also be referred to as a minimum level for brevity. Of course, in other embodiments, request proxy 412 may first forward the response to frontend 404 or the client device 402 at [7] prior to initiating throttling the computing resources to a minimum non-zero level at [6].

In some embodiments, the virtual execution environment may transmit the response to data storage. For example, the virtual execution environment 414 may contain an internal data storage to store responses generated for multiple requests. The request proxy 412 may obtain the response for the request sent by the client device 402 at [1] from this data storage. Additionally, or alternatively, the virtual execution environment 414 may transmit the response to a data storage of the on-demand code execution system 406 or a component of on-demand code execution system 406 including, but not limited to host device 408, virtual machine 410. Request proxy 412 may obtain the response from this data storage at [6]. After receiving the response, request proxy 412 may forward the response to frontend 404 at [7]. Frontend 404 may then forward the response to the client device 402, which receives the forwarded response at [8]. In some embodiments, the virtual execution environment 414 may transmit the response to frontend 404 or otherwise cause the response to be send to the client device 402 without use of a request proxy 412.

While the illustrative interactions discussed above with respect to FIG. 4 are discussed with respect to generating a response for one request, multiple requests may be processed. For example, the client device 402 may send multiple requests simultaneously at [1] to frontend 404. Frontend 404 may forward these requests to on-demand code execution system 406 at [2]. Frontend 404 may order these requests prior to forwarding the requests to on-demand code execution system 406 at [2]. For example, each request may contain an indication of importance. For example, the requests may include text strings such as "high importance," "medium importance" "low importance." Additionally, or alternatively, the requests may include a number generated by the client to indicate their importance. For example, the requests including lower numbers may be less important than requests including higher numbers. Instead of forwarding the requests simultaneously, as received, frontend 404 may send requests in the order of importance. Of course, frontend 404 may generate a table indicating the order in which the requests should be executed and forward this table with the request to on-demand code execution system 406 at [2]. Additionally, a frontend of on-demand code execution system 406 (e.g., frontend 130 of FIG. 1) may order the requests. For example, the frontend of the on-demand code execution system 406 may place the requests into a queue in the by the importance ranking described above. Other components of on-demand code execution system 406 including, but not limited to, the host device 408, virtual machine 410, and request proxy 412 may order the requests in the manner described above with respect to frontend 404.

In some embodiments, client device 402 may send additional requests while a request is executing on on-demand code execution system 406. For example, client device 402 may send a first request at [1] to frontend 404. Frontend 404 may forward the request to on-demand code execution system 406. The request may be accessed by the request proxy 412. For example, on-demand code execution system 406 or one or more components of 406 may place the first request into temporary data storage, such as a cache or a queue, and request proxy 412 may retrieve the first request from that data storage. Once the first request is retrieved by request proxy 412, request proxy 412 may initiate unthrottling of the computing resources to a level greater than a minimum non-zero level of computing capacity. This level may be a maximum level of computing capacity or an intermediate level of computing capacity between a maximum level of computing capacity and a minimum non-zero level of computing capacity. Request proxy 412 may subsequently or simultaneously invoke function(s) or application(s) using virtual execution environment 414 to generate a first response to the first request. While those function(s) or application(s) are processing, request proxy 412 may access a second request in the manner described above with respect to the first request. Request proxy 412 may initiate unthrottling of further computing resources to generate a second response to the second request. Additionally, or alternatively, the request proxy 412 may not unthrottle additional computing resources to generate a second response for the second request. For example, in some embodiments, the computing resources for virtual execution environment 414 may already by unthrottled to a maximum level of computing capacity and there is no further unthrottling that may occur. Regardless, request proxy 412 may invoke function(s) or applications to generate a second response to the second request. and transmit the first response and second response back to client device 402. Request proxy 412 may transmit the first response prior to transmitting the second response, or, in some embodiments, request proxy 412 may transmit the responses simultaneously. For example, request proxy 412 may receive the first response and second response from virtual execution environment 414 at the same time instead of receiving the first response and then the second response because the first response may take longer to generate than the second response in some embodiments. Additionally, or alternatively, request proxy 412 may hold responses for a period of time and transmit responses received during that period in a batch to frontend 404 or client device 402. In some embodiments, request proxy 412 may wait until no further requests are received for a set period of time prior to throttling computing resources for virtual execution environment 414 to a minimum non-zero level at [6].

Figure 5A:
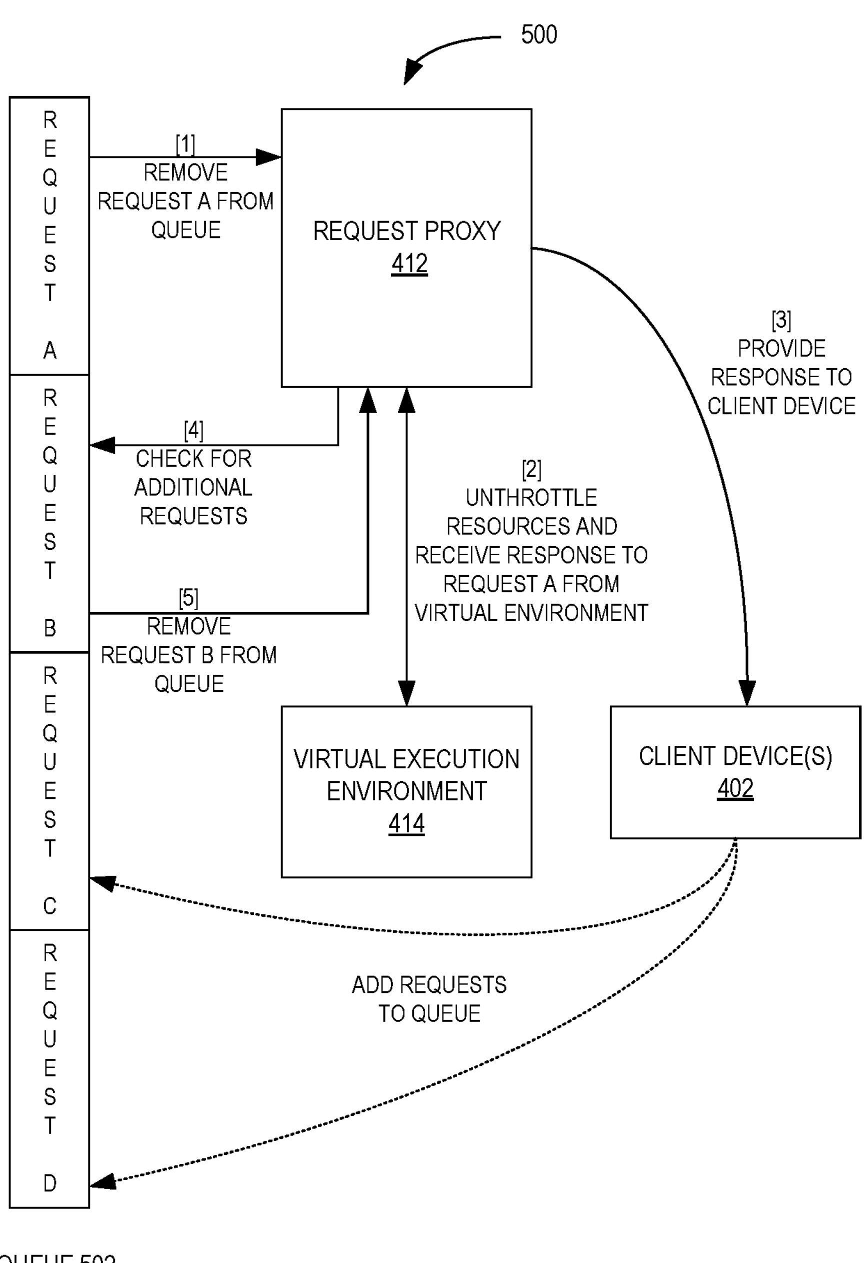
FIG. 5A illustrates a set of example interactions between components where a queue 502 is used to handle multiple requests received from client devices.

FIG. 5A illustrates a set of example interactions 500 between components where a queue 502 is used to handle multiple requests received from client devices 402. The virtual execution environment 414 illustrated in FIG. 5A may initially be allocated a minimum non-zero level of computing capacity and be initialized to executing background process(es). Responses to additional requests received through the processes described below may be generated by executing invoked function(s) and applications in addition to the executing background process(es).

Returning to FIG. 5A, a "queue" or "queues" are used herein in accordance with its usual and customary meaning in the field of computer technology and refer to a linear data structure that is open at both ends to facilitate performance of operations in order of receipt. In some embodiments, each virtual execution environment 414 may have its own queue. For example, requests to be executed by invoking function (s) or application(s) on a virtual execution environment 414 may be stored in the same queue. Additionally, or alternatively, a queue may be provided for a larger component of an on-demand code execution system including, but not limited to, a host device, a worker manager, or a virtual machine, as described in FIG. 4. The queue for the larger component may be processed by a frontend of on-demand code execution system 406 (e.g., frontends 130 of FIG. 1) and split into smaller queues for smaller components including, but not limited to, virtual execution environments, such as virtual execution environment 414. As discussed above, virtual execution environment 414 may include containers.

In some embodiments, client device(s) 402 may be the same as client devices 102 of FIG. 1. Client device(s) 402 may add requests to the queue 502 any time after the data structure for the queue 502 is created. In some embodiments, the data structure for the queue 502 may be created on booting a virtual execution environment 414. In some embodiments, requests may be received simultaneously by the queue 502. For example, client device(s) 402 may transmit multiple requests for addition to the queue at the same time. In some embodiments, the simultaneously-received requests may be incorporated into the queue in a random order. However, in some embodiments, the simultaneously received requests may be incorporated into the queue in order of importance. For example, a first request and a second request may be received simultaneously by an on-demand code execution system or a component of the on-demand code execution system. The first request may include an indication of high importance, such as the text string "high importance." The second request may include an indication of low importance, such as the text string "low importance." Based, at least in part, on these importance indicators, the first request may be stored prior to the second request in the queue 502.

In embodiments where client device(s) 402 include multiple client devices, the client device(s) 402 may share a unique identifier that may be used in configuring handling of requests from client device(s) 402. For example, requests from client device(s) which share a unique identifier may be added to the same queue. Responses generated for those requests may be transmitted to all client device(s) sharing the unique identifier. Of course, in some embodiments, responses generated for those requests may be transmitted to a subset of the client device(s) sharing the unique identifier. In some embodiments, the request may identify the subset of client device(s) to which the response for a request should be provided.

Request proxy 412 may remove requests from the queue 502 at [1]. For example, the request proxy 412 may retrieve request A from the queue 502 and simultaneously delete request A from queue 502. However, in some embodiments, request proxy 412 may delete request A from queue 502 after retrieving request A from queue 502. In some embodiments, request proxy 412 may instruct another component of the on-demand code execution system to delete request A from the queue 502. For example, the on-demand code execution system may include a queue manager which may remove request A after request proxy 412 transmits a notification that it has retrieved request A.

After retrieving request A, request proxy 412 may communicate with virtual execution environment 414 at [2] to obtain a response A to request A. In some embodiments, the request proxy 412 may generate instructions based, at least partly, on request A. The instructions may be transmitted directly to virtual execution environment 414. However, in some embodiments, the instructions may be transmitted to a supervisor process. In some embodiments, the supervisor process may be a component of the machine 410. Additionally, or alternatively, the supervisor process may also be a subcomponent of another component of the on-demand code execution system.

The instructions may include instructions to unthrottle resources and invoke function(s) or application(s) configured to execute on virtual execution environment 414 to obtain a response A to request A, as discussed above with respect to FIG. 3 at blocks 306 and 308. The instructions may be transmitted directly to virtual execution environment 414. For example, request proxy 412 may determine that generating a response A to request A requires invoking specific function(s) and or application(s). Accordingly, request proxy 412 may generate instructions for virtual execution environment 414 to invoke the specific function(s) or application(s).

In some embodiments, request proxy 412 may also generate instructions to unthrottle computing resources to an increased level of computing capacity. This increased level may be a maximum level of computing capacity. The increased level may also fall within a range defined by a minimum non-zero level of computing capacity and a maximum level of computing capacity. The increased level of computing capacity may be received from the client device. For example, the increased level of computing capacity may be received in configuration data provided for the client device to configure virtual execution environment 414. Additionally, or alternatively, the increased level of computing capacity may be provided in the requests. For example, request A may include an increased level of computing capacity to allocate in order to complete a set of tasks. Request proxy 412 may process this request and generate a request to unthrottle resources to the increased level of computing capacity and to invoke specific function (s) or application(s).

Of course, in some embodiments, instructions to unthrottle computing resources may not be generated or transmitted. For example, in some embodiments virtual execution environment 414 may be in the process of generating a response A to request A. Computing resources may have been unthrottled to a maximum level to generate the response A to request A. Accordingly, when request B is accessed, request proxy 412 may not generate further instructions to unthrottle computing resources. Instead, request proxy 412 may generate instructions to invoke specific function(s) or application(s) to generate a response B to request B. In further embodiments, response B and response A may be generated simultaneously and transmitted to client device(s) 402 at the same time. In some embodiments, response B and response A may be generated within a predefined time interval. For example, the first response generated may be held for the predefined time interval. Other responses generated during that period will also be held until the end of the predefined time interval. At the end of the predefined time interval, all held responses will be transmitted to client device 402. In some embodiments, the predefined time interval may be defined by the client device in the configuration data.

In some embodiments, once response A has been generated by virtual execution environment 414 it may be transmitted to request proxy 412. Once request proxy 412 receives the response A, request proxy 412 may provide response A to the client device(s) 402 at [3]. Request proxy 412 may also check for additional requests in the queue 502 at [4]. This may occur prior to, subsequent to, or simultaneous to transmitting the response to client device(s) 402 at [3].

As an example of checking queue 502 prior to providing response A to client device(s) at [3]. Request proxy 412 may check the queue 502 at intervals. The intervals may occur during processing of request A and/or during generation of response A, which are steps that occur prior to generation of response A. As an example of checking the queue 502 subsequently to providing response A to client device(s) at [3], request proxy 412 may receive response A transmit response A to client device(s) 402 at [3]. Request proxy 412 may then determine whether any requests remain in the queue prior to throttling computing resources allocated to virtual execution environment 414 to a minimum non-zero level, as discussed at block 316 of FIG. 3.

At [4], request proxy 412 may check for additional requests stored in queue 502 and determine that there are additional requests present. For example, request proxy 412 may determine that request B is present in the queue 502. Request proxy 412 may subsequently remove request B from queue 502, as described above at [1] with respect to request A. A response B for request B may subsequently be generated in the manner described above with respect to steps [1]-[4] for request A. This process may be repeated for all requests remaining in the queue 502, such as request C and request D. Request proxy 412 may not generate instructions to throttle computing resources to a minimum non-zero level while requests remain in the queue and/or while responses being generated for those requests in virtual execution environment 414.

If a response fails to be generated within a set time period, the invoked function(s) or application(s) associated with that request may be killed or cancelled. If no other function(s) or applications are executing, and no requests remain in the queue, request proxy 412 may generate instructions to throttle computing resources allocated to virtual execution environment 414 to a minimum non-zero level. Background process(es) may continue to execute subsequent to computing resources being throttled to the minimum non-zero level. As an example, there may be a set time period set in the configuration data for virtual execution environment 414 to generate a response for a request of 15 minutes. Virtual execution environment 414 may generate response A, response C, and response D within this set time period. However, response B may not be generated within the time period. Accordingly, the invoked function(s) or application (s) used to attempt to generate response B may be killed. If no other requests remain in the queue, and no other function (s) or application(s) are processing, besides the background process(es), request proxy 412 may throttle resources to a minimum non-zero level. Background process(es) will not be cancelled or killed and will continue to execute using the computing resources at the minimum non-zero level.

Figure 5B:
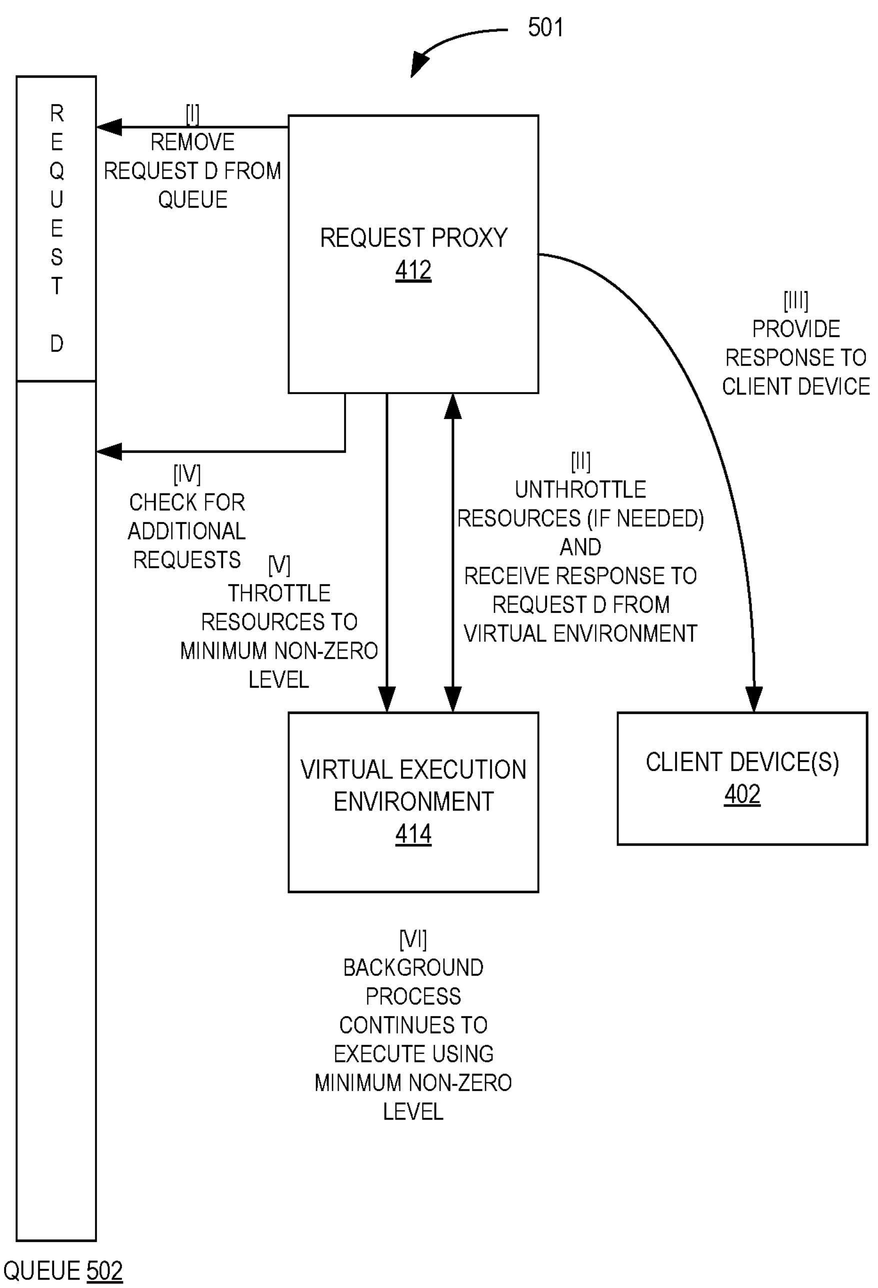
FIG. 5B illustrates another set of example interactions between components where a queue 502 is used to handle multiple requests received from client devices 402.

FIG. 5B illustrates a set of example interactions 501 between components where a queue 502 is used to handle multiple requests received from client devices 402. The interactions shown in FIG. 5B may occur after processing of requests A-C as shown in FIG. 5A and described above.

Queue 502 may include a request D. At [I], the request proxy 412 may remove request D from queue 502. For example, the request proxy 412 may retrieve request D from the queue 502 and simultaneously delete request D from queue 502. However, in some embodiments, request proxy 412 may delete request D from queue 502 after retrieving request D from queue 502. In some embodiments, request proxy 412 may instruct another component of the on-demand code execution system to delete request D from the queue 502. For example, the on-demand code execution system may include a queue manager which may remove request D after request proxy 412 transmits a notification that it has retrieved request D. Prior to removal of request D, responses A-C may be generated an no other function(s) or application(s) may be processing in virtual execution environment 414.

At [II], request proxy 412 may communicate with virtual execution environment 414 to unthrottle the resources allocated to virtual execution environment 414 to respond to request D, if needed. Instructions provided by request proxy 412 to unthrottle resources may be implemented by a supervisor process of virtual machine 410. Unthrottling resources may not be needed if virtual execution environment 414 has already been allocated the maximum level of computing capacity during processing of a prior request. Request proxy 412 may also invoke function(s) or application(s) to generate response D.

Once response D is generated, response D may be provided to client device(s) 402 at [III]. If response D is not generated within a set time period, the function(s) or application(s) invoked to generate response D may be cancelled or killed. Regardless, the request proxy 412 may subsequently check for additional requests at [IV] and determine that no requests remain in the queue. After determining that no requests remain in the queue and that no requests are being current processed by invoked function(s) or applications in virtual execution environment 414, request proxy 412 may initiate throttling of the computing resources allocated to virtual execution environment 414 to a minimum non-zero level at [V]. The request proxy 412 may send instructions that may be implemented by a supervisor process of virtual machine 410. After virtual execution environment 414 has been throttled to a minimum non-zero level of computing capacity, the background process(es) executing on virtual execution environment 414 may continue to execute using the minimum non-zero level of computing capacity at [VI]. Request proxy 412 may continue to monitor queue 502 at intervals to check whether a request is received. If a request is received, request proxy 412 may communicate with virtual execution environment 414 to generate a response to the request using the steps described above with respect to FIGS. 5A-B.

Example Resource Throttling Extension Interactions

Figure 6:
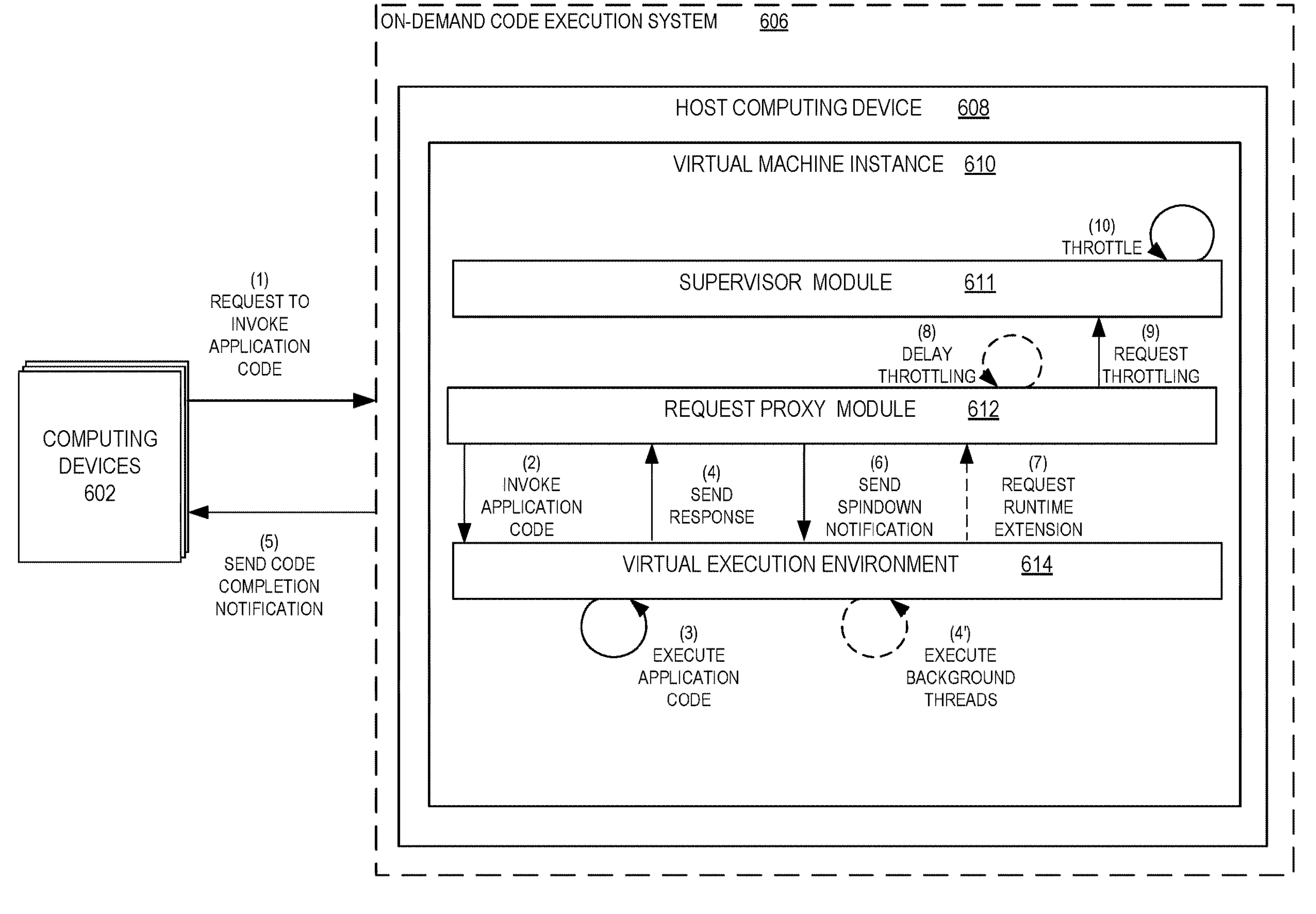
FIG. 6 is a block diagram illustrating execution of background threads via an interaction between an application, request proxy module, and supervisor module within a virtual machine (VM) according to some embodiments.

FIG. 6 shows management of computing resources associated with execution of long-running processes, such as background threads or other processes outside of a request-response protocol, via an interaction between a container application, request proxy module, and supervisor module within a virtual machine (VM) according to an on-demand code execution system according to some embodiments. The features and services provided by and used to manage such applications may be implemented as web services consumable via one or more communication networks. In some embodiments, the features and services provided by and used to manage such applications are provided by one or more VM instances implemented on an on-demand code execution system 606.

An application may be deployed within a sandbox of a host computing device 608 of the on-demand code execution system, such as a VM 610 that includes a supervisor module 611, request proxy module 612, and a virtual execution environment 614. The supervisor module 611, request proxy module 612, and virtual execution environment 614 may communicate with each other within the VM 610. The VM 610 may be initialized by an on-demand code execution system 606 when a function or application is invoked by a computing device 602. As explained in more detail below, a component of the VM 610 such as the request proxy module 612 can send a notification to the virtual execution environment 614, once the virtual execution environment 614 finishes execution of code, indicating that the computing resources allotted to the virtual execution environment 614 are to be reduced or de-allocated ("throttled"). Such a notification may be referred to as a "spin-down notification." In response to such a spin-down notification, the virtual execution environment 614 can optionally request a delay of throttling by communicating a request to the request proxy module 612. Such a request may be referred to as a "throttle delay request." The request proxy module 612 may determine whether to proceed with throttling down the computing resources allotted to the virtual execution environment 614 depending upon whether a throttle delay request is received, one or more throttle delay criteria are satisfied, etc.

In the example illustrated in FIG. 6, at (1) a computing device 602 makes a request to invoke code, or an application, on the on-demand code execution system 606. As described herein, the on-demand code execution system 606 can initialize a VM instance, such as the VM instance 610, to execute the requested code, or application, to completion using one or more modules, components (e.g., the supervisor module 611, request proxy module 612, the virtual execution environment 614, etc.), or the like. At (2), the request proxy module 612 causes the virtual execution environment 614 to invoke the code, or application, requested by the computing device 602. For example, if the virtual execution environment 614 is not yet executing the application, the supervisor module 611 may initialize execution of the virtual execution environment 614 based on an application image specified in application configuration data. If the virtual execution environment 614 is executing the application or has otherwise already been initialized, the request proxy module 612 or some other module or component of the virtual machine 610 may cause execution of the appropriate function, feature, or process.

At (3), the virtual execution environment 614 executes the invoked code to completion utilizing computing resources (e.g., vCPU time, networking bandwidth, etc.) allotted to it by the VM 610. At (4), the virtual execution environment 614 responds or otherwise communicates to the request proxy module 612 that the virtual execution environment 614 has completed execution of the code, or application, requested by the computing device 602 (and potentially also communicates the results of the execution). At (5), the on-demand code execution system 606 may communicate or cause to communicate of a notification of completion to the computing device 602.

At (6), a module or component of the virtual machine 610 such as the request proxy module 612 may send a communication (e.g., as a spin-down signal) to the virtual execution environment 614 indicating that one or more computing resources utilized by the virtual execution environment 614 to execute the code, or application, to completion, will be throttled. The request proxy module 612 may allow the virtual execution environment 614 a window of time to respond prior to throttling (e.g., the request proxy module 612 may wait up to about 100 milliseconds, up to about 1 second, up to about 5 seconds, etc. for a response from the virtual execution environment 614 prior to initiating throttling).

At (4'), the virtual execution environment 614 may begin (or continue) executing one or more threads or processes outside the request-response protocol described above. For example, the virtual execution environment 614 may execute background threads during or after the execution of the code, or application, requested by the computing device 602. As described herein, the one or more background processes or threads may not be directly associated with the code, or application, requested by the computing device 602. However, the virtual execution environment 614 may need the computing resources provisioned to it (e.g., which was provisioned to execute the code, or application, requested by the computing device 602) to complete execution of the background processes or threads. Because the request proxy module 612 may not wait until the one or more background processes finished execution before throttling computing resources associated with the virtual execution environment 614, the background process may not complete before such throttling occurs unless the virtual execution environment 614 can inform the request proxy module 612 to delay throttling the computing resources.

At (7), the virtual execution environment 614 may communicate to the request proxy module 612 a request for runtime extension (e.g., delay throttling). As described herein, the virtual execution environment 614 may determine that one or more background processes or threads have yet to finish execution. Based on this determination, the virtual execution environment 614 can communicate to the request proxy module 612 (or some other module or component of the VM 610) that throttling should be delayed. In some embodiments, the virtual execution environment 614 may determine an amount of time the background processes or threads requires to finish execution. Based on this determined amount of time, the virtual execution environment 614 can communicate to the request proxy module 612 that throttling should be delayed for a period of time so that the background processes or threads can complete.

At (8), a module or component of the virtual machine 610, such as the request proxy module 612, can delay throttling of the computing resources based on the throttle delay request sent by the virtual execution environment 614. In some embodiments, the request proxy module 612 may limit the number of times the virtual execution environment 614 may request delay of throttling (e.g., three times, four times, five times, etc.) and/or may limit the length of time the throttling of computing resources can be delayed for (e.g., up to about one minute, up to about two minutes, up to about three minutes, etc.). These limits may also be based on user configuration (e.g., by an administrator).

At (9), the request proxy module 612 initiates throttling of the computing resources by communicating with the supervisor module 611. For example, the request proxy module 612 may initiate such throttling if the virtual execution environment 614 does not respond to a spin-down communication within a certain amount of time (e.g., five seconds). As another example, the request proxy module 612 may initiate throttling if the maximum number of runtime extension requests is reached (e.g., five extensions are allowed and the virtual execution environment 614 is requesting a sixth extension) and/or if a maximum time of runtime extension would be exceeded. At (10), the supervisor module 611 or some other module or component of the VM 610 causes the computing resources to be throttled. As described herein, once the computing resources are throttled, any background threads or processes not finished may cease to execute or have its execution paused.

Figure 7A:
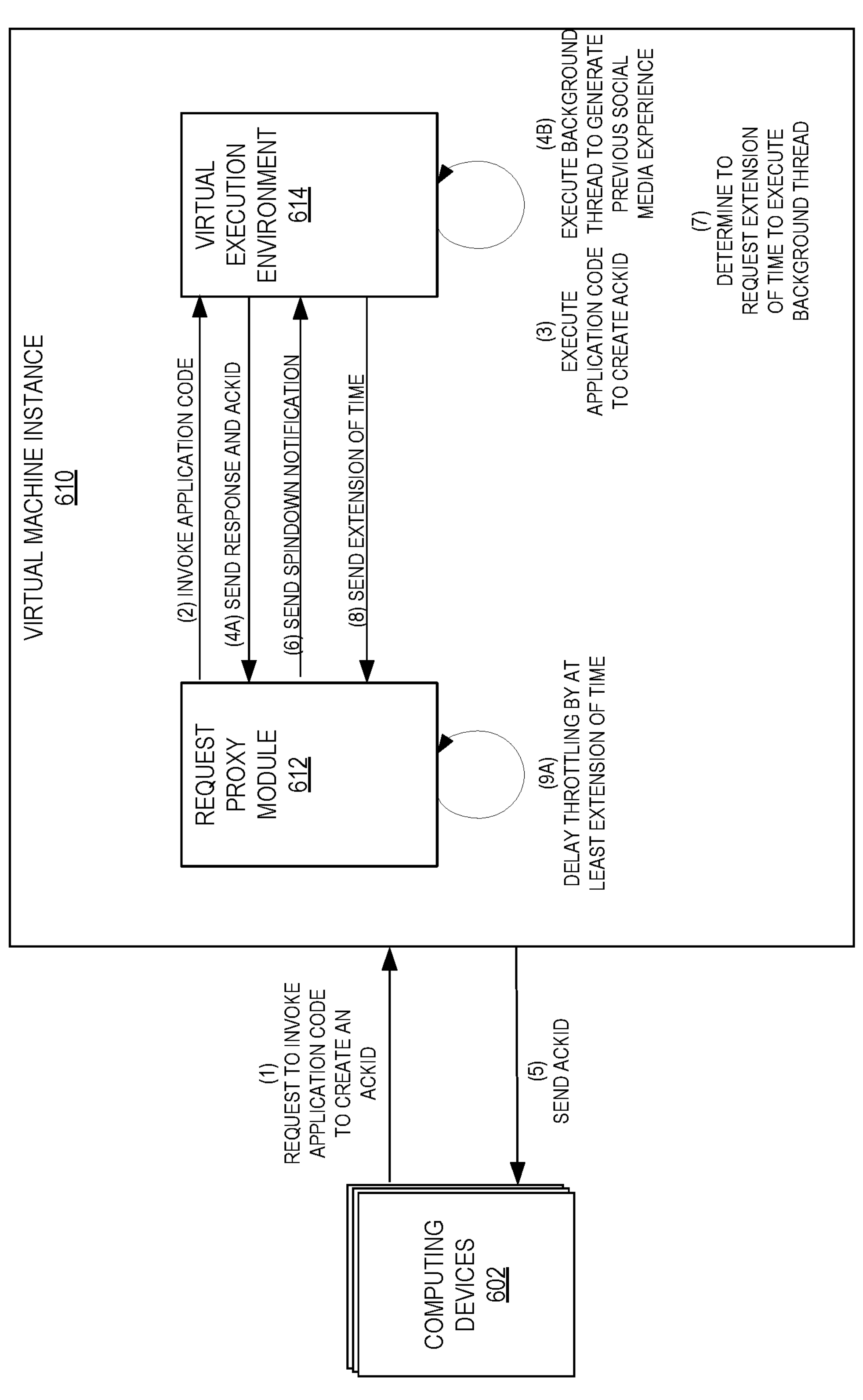
FIGS. 7A and 7B illustrate data flows and interactions between a virtual machine and a computing device, and between components of the virtual machine, according to some embodiments.
Figure 7B:
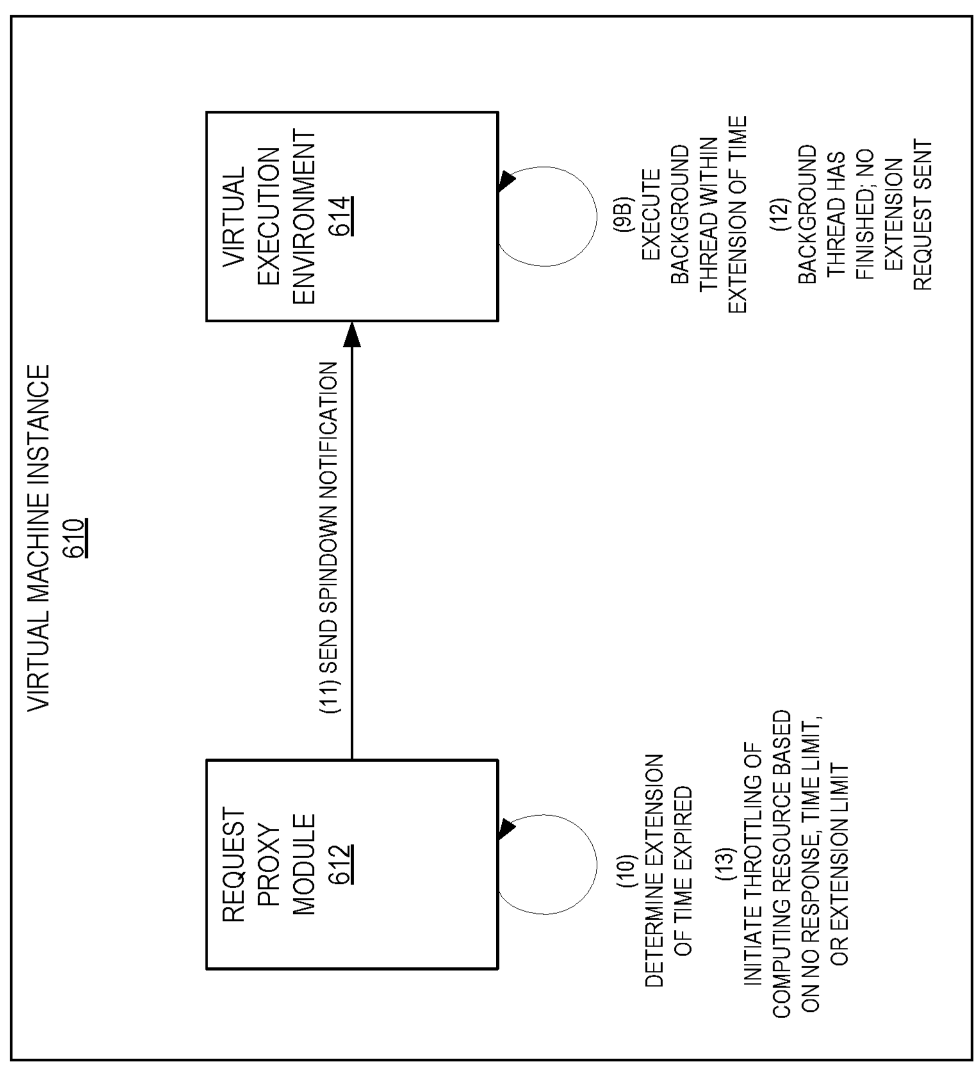

FIGS. 7A and 7B illustrate data flows and interactions between the request proxy module 612 and the virtual execution environment 614 according to an embodiment in which the virtual execution environment 614 requests multiple delays and the request proxy module 612 enforces delay request constraints. In the example illustrated in FIG. 7A, the computing device 602 can request execution of a feature of an application that results in generation of an acknowledgement identification (ACKID) (e.g., related to a user signing on a social media application such that the user may see their last social media interactions and latest posts by other social media users). It may be desirable to generate the acknowledgement identification quickly while triggering execution of another process. Thus, virtual execution environment 614 may generate the acknowledgement identification according to a request-response protocol, while executing additional code outside of the request-response protocol. Advantageously, the virtual execution environment 614 can request a delay of resource throttling after generating the response so that the additional code can complete execution prior to throttling of a computing resource allotted to virtual execution environment 614.

The interactions begin at (1), where the computing device 602 makes a request to invoke code, or an application, on the on-demand code execution system 606 to create an ACKID (e.g., for a social media request). For example, the user of the computing device 602 may want to sign onto her social media application in order to determine what her friends have been up to since her last sign on to the social medial application. At (2), the request proxy module 612 sends a communication to the virtual execution environment 614 to invoke the code, or application, requested by the computing device 602 to create the ACKID for the social media request.

At (3), the virtual execution environment 614 executes retrieved or received code to completion (e.g., to create the ACKID) utilizing computing resources dedicated to it (e.g., vCPU time) 612 by the VM 610 or the on-demand code execution system 606. At (4A), the virtual execution environment 614 sends or communicates to the request proxy module 612 that the virtual execution environment 614 has completed execution of the code to create the ACKID along with the ACKID.

At (4B), the virtual execution environment 614 begins execution of a background thread or process associated with creation of the ACKID to generate the user's social media experience. For example, the thread or process may determine the last pages or feeds the user viewed or responded to on the social media application and surface those pages and feeds such that the user can continue her last social media experience. However, as stated herein, the request proxy module 612 may not automatically wait for the background thread or process to finish prior to throttling of computing resources because the request proxy module 612 may not be aware of it. Thus, a spin-down communication may be sent to the virtual execution environment 614 prior to throttling computing resources allotted to the virtual execution environment 614, as described below.

At (5), the on-demand code execution system 606 communicates or causes to communicate a notification of the ACKID to the computing device 602. For example, the computing device 602 may receive the ACKID and communicate to the user via a user interface (UI), that the user is signed onto the social media application because the ACKID is an indication by the social media application that a user is actively in the application.

At (6), due at least to the requested code being completed, the request proxy module 612 sends a spin-down communication (e.g., as a signal) to virtual execution environment 614 indicating that one or more computing resources allotted to the virtual execution environment 614 to execute the code, or application, to create the ACKID will be throttled. As stated above, the virtual execution environment 614 may still be executing a background thread or process when the spin-down communication is sent and may not be able to complete such background thread or process prior to the computing resources being throttled. The request proxy module 612 can allow the virtual execution environment 614 a window of time to respond prior to throttling (e.g., the request proxy module 612 may wait five seconds to hear back from the virtual execution environment 614 prior to initiating throttling).

At (7), the virtual execution environment 614 determines or request an extension of runtime to complete the background thread or process prior to throttling of one or more computing resources allotted to the virtual execution environment 614. As described herein, the background process or thread (e.g., to gather the user's most recent social media experience) may not be directly associated with the code, or application, requested by the computing device 602 to create the ACKID. To obtain additional time, the virtual execution environment 614 can request a delay in throttling (e.g., request an extension without necessarily specifying a period of time). In some embodiments, the virtual execution environment 614 can determine the amount of time required to finish the background thread or process and respond to the request proxy module 612 with a request for the determined amount of time. Moreover, if the virtual execution environment 614 determines that the determined amount of time is greater than a maximum amount of time a single extension request can be, the virtual execution environment 614 may initially request for delay of throttling at the maximum request of time (e.g., one minute) and then wait to for the next spin-down request to automatically make another request for runtime extension (e.g., additional delay of throttling).

At (8), the virtual execution environment 614 communicates to the proxy module 612 a request for runtime extension. At 9(A), the request proxy module 612 delays initiating throttling in response to the requested runtime extension.

Continuing with FIG. 7B, at (9B), the virtual execution environment 614 executes (e.g., using the available computing resources provided by the VM instance 610) the background process or thread to completion (e.g., gathers all the previous social media interactions of the user and surfaces them for her to see on a UI). As stated above, the request proxy module 612 may limit the number of times the virtual execution environment 614 may request for runtime extensions (e.g., three times, four times, five times, etc.) and may also limit the length of time the throttling of computing resources can be delayed for (e.g., up to one minute, two minutes, etc.).

At (10) the request proxy module 612 may determine that the runtime extension has expired. At (11), due to the runtime extension expiring, the request proxy module 612 sends another spin-down notification to the virtual execution environment 614. At (12), the because the virtual execution environment 614 has completed execution of the background process, the virtual execution environment 614 may determine not to send a request for an extension of time before throttling.

At (13), because the request proxy module 612 has not received any runtime extensions within a threshold period of time after sending the spin-down notification at (11), the request proxy module 612 can initiate throttling of one or more computing resources allotted to the virtual execution environment 614. In some embodiments, the request proxy module 612 may send a throttle request to the supervisor module 611 in order for the supervisor module 611 to cause throttling of the computing resources used by the virtual execution environment 614 to create the ACKID and also to execute, and finish the background process or thread. As described herein, the request proxy module 612 may initiate such throttling if the virtual execution environment 614 does not respond with a runtime extension after a spin-down communication within a certain amount of time (e.g., five seconds). Moreover, the request proxy module 612 may additionally initiate such throttling if the maximum amount of time or number of runtime extension requests is reached (e.g., five extensions are allowed and the virtual execution environment 614 is requesting a sixth extension).

Figure 8:
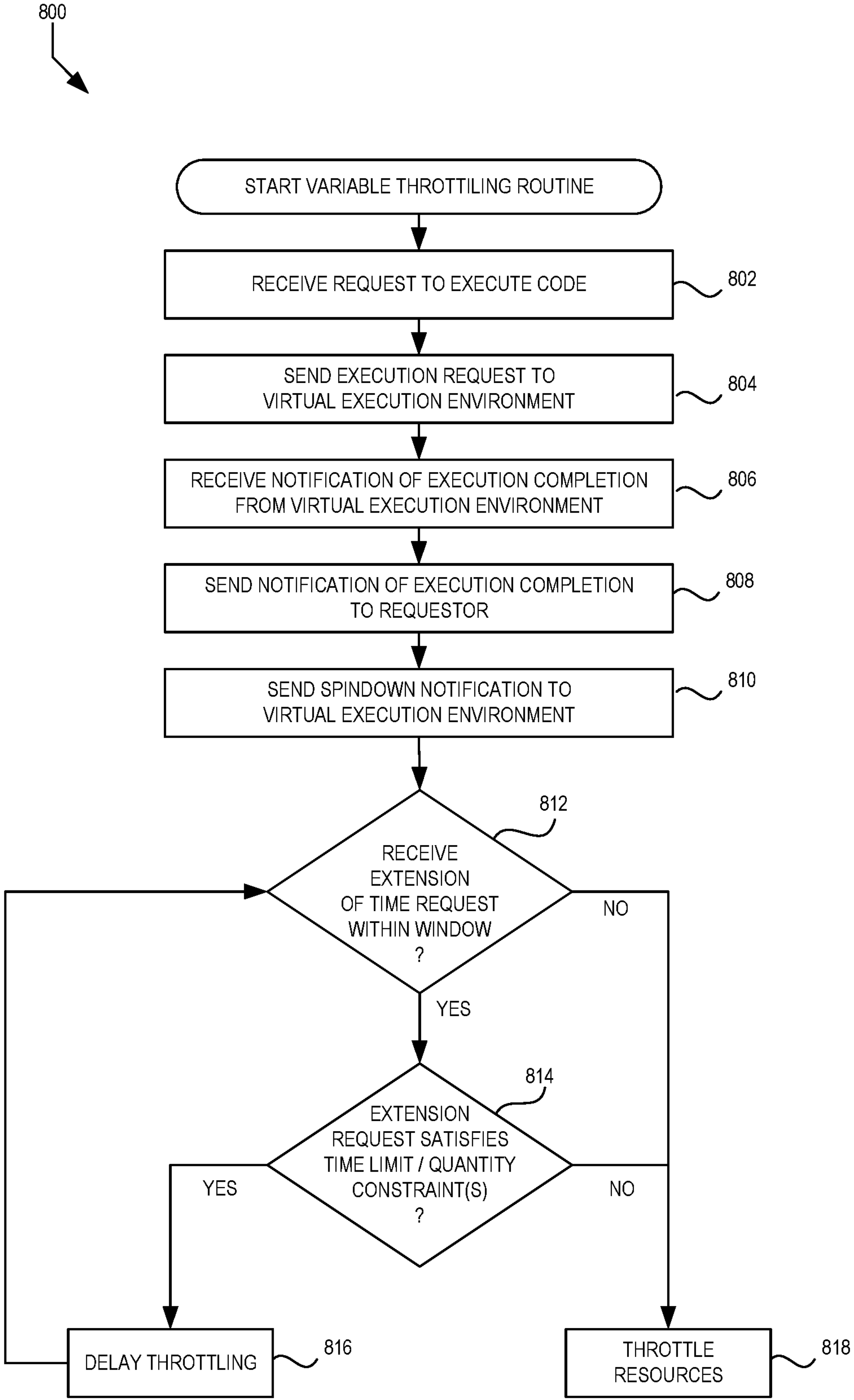
FIG. 8 is a flow diagram of an illustrative routine for variable de-allocation of computing resources based on extensions according to some embodiments.

FIG. 8 is a flow diagram of an illustrative routine 800 that a module or component of an on-demand code execution system 606, such as a request proxy module 612 or supervisor module 611, may execute for variable throttling based on extensions requested by the virtual execution environment 614 according to some embodiments.

Routine 800 begins at block 802, where the on-demand code execution system 606 receives a request to execute code, or an application, from the computing device 602. At block 804, the on-demand code execution system 606 or the request proxy module 612 sends a request to the virtual execution environment 614 to execute code, or an application, in a virtual execution environment 614. As described herein, the on-demand code execution system 606 may allocate certain computing resources for the virtual execution environment 614 to execute the code.

At block 806, the on-demand code execution system 606 (or a component thereof, such as the request proxy module 612) receives a communication that the virtual execution environment 614 finished executing the code, or application. As stated herein, this communication may not comprise information regarding whether the virtual execution environment 614 is executing additional background threads or processes. Therefore, the on-demand code execution system 606 or the request proxy module 612 may not determine that the virtual execution environment 614 still needs the allocated computing resources to process a background thread or process.

At block 808, the on-demand code execution system 606 communicates to the computing device 602 that execution of the requested code is complete. This communication may not inform the computing device 602 about any background threads or processes still running where the virtual execution environment 614 may need to continue using the computing resources to finish processing the background processes or threads.

At block 810, the on-demand code execution system 606 (or a component thereof, such as the request proxy module 612) sends a spin-down notification to the virtual execution environment 614. As described herein, the spin-down notification informs the virtual execution environment 614 that tone or more computing resources (e.g., vCPU time) used to complete the code request will be throttled.

At decision block 812, the on-demand code execution system 606 (or a component thereof, such as the request proxy module 612) determines whether a runtime extension request has been received from the virtual execution environment 614. In some embodiments, the on-demand code execution system 606 may wait for a predetermined or dynamically-determined period of time for an extension request. For example, the on-demand code execution system 606 may wait a threshold amount of time, such as 100 milliseconds, 500 milliseconds, 1 second, 3 seconds, etc. As another example, the on-demand code execution system 606 may wait a dynamically-determined period of time, such as a period of time determine based on observed communication latency. If a request is received prior to the wait period elapsing, the routine 800 may proceed to decision block 814. Otherwise, if a request is not received prior to the wait period elapsing, the routine 800 may proceed to block 818 where one or more computing resources allotted to the virtual execution environment 614 are throttled.

At decision block 814, the on-demand code execution system 606 (or a component thereof, such as the request proxy module 612) determines whether one or more throttle delay criteria are satisfied. In some embodiments, the throttle delay criteria relate to a quantity of extensions or an amount of time that throttling has been delayed. For example, the on-demand code execution system 606 may determine whether a maximum number of extensions have already been requested or granted. As another example, the on-demand code execution system 606 may determine whether a maximum amount of time that throttling has been delayed has passed. If the execution request satisfies the one or more criteria (e.g., fewer than the maximum quantity of extensions and/or less than the maximum time of extension), the routine 800 may proceed to block 816 where throttling is delayed. Otherwise, the routine 800 may proceed to block 818 where one or more computing resources allotted to the virtual execution environment 614 are throttled.

At block 816, the on-demand code execution system 606 (or a component thereof, such as the request proxy module 612) determines that the runtime extension has expired and returns to decision block 812 to see if there were any additional run time extensions and potentially delay throttling again.

Figure 9:
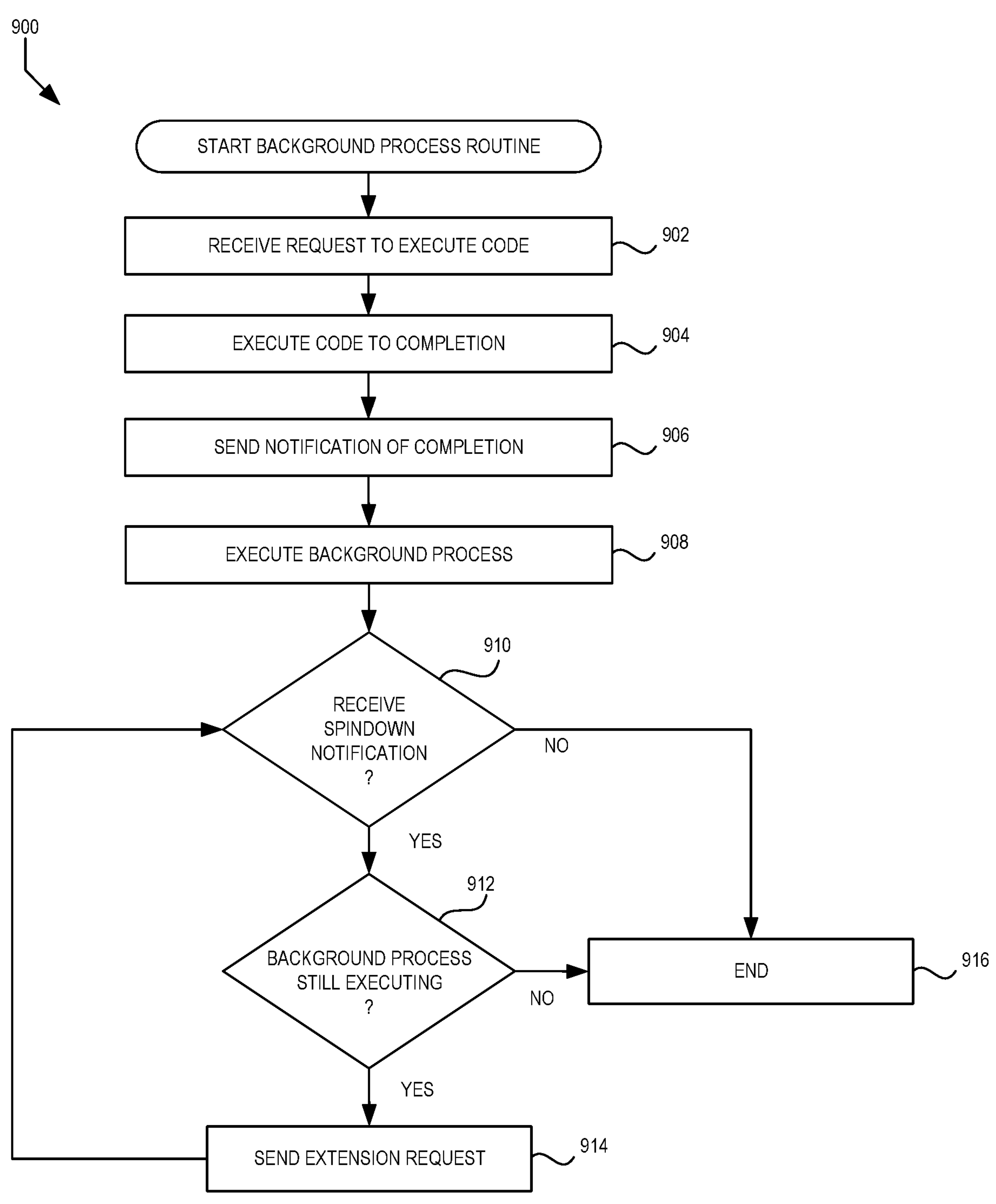
FIG. 9 is a flow diagram of an illustrative routine for a virtual computing component to execute a background process according to some embodiments.

FIG. 9 is a flow diagram of an illustrative routine 900 that a virtual execution environment 614 may execute to manage a background process and request throttle delays or extensions according to some embodiments.

Routine 900 begins at block 902, where virtual execution environment 614 receives a request from the on-demand code execution system 606 (or a component thereof, such as the request proxy module 612) to execute code, or an application. For example, the computing device 602 may request code, or an application, to be invoked in order to log into a social media application, or the like.

At block 904, the virtual execution environment 614 executes the code to completion. As described herein, the code, or application, that is executed to completion (e.g., using computing resources allocated to it by the on-demand code execution system 606) may be executed according to a request-response protocol, and may not include code, or an application, associated with executing a background thread executed outside of the request-response protocol.

At block 906, the virtual execution environment 614 communicates to the on-demand code execution system 606 or the request proxy module 612 that the code has been fully executed. As described herein, the on-demand code execution system 606 may further notify the computing device 602 that the code has been completed.

At block 908, the virtual execution environment 614 starts or continues execution of a background thread or process. As described herein, this background thread or process may be started before or while the computing resources assigned to the virtual execution environment 614 to execute the code, or application, requested at block 902 are to be throttled. Therefore, without any runtime extensions, the virtual execution environment 614 may not be able to finish the background process or thread.

At decision block 910, the virtual execution environment 614 may determine whether a spin-down notification is received from the on-demand code execution system 606 (or a component thereof, such as the request proxy module 612). If a spin-down request is received, the routine 900 may proceed to decision block 912. Otherwise, if a spin-down request is not received and any additional thread of execution outside the request-response protocol has completed execution, the routine 900 may terminate at block 916.

At decision block 912, the virtual execution environment 614 may determine whether any additional thread of execution outside the request-response protocol is still executing. If the spin-down request is received while an additional thread of execution remains to be completed, the routine 900 may proceed to block 914.

At block 914, the virtual execution environment 614 may request delay of the throttling of one or more computing resources allotted to the virtual execution environment 614. In some embodiments, the request may be a request for a particular amount of time. For example, the virtual execution environment 614 may determine an expected amount of time until the additional thread of execution completes, and may request that amount of time.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:

under control of a computing system comprising one or more computing devices configured to execute specific instructions:

receiving, from a virtual computing component executing on a host computing device, a communication that a first process of an application of the virtual computing component has completed execution, wherein the virtual computing component is allotted a set of computing resources for execution;

sending, to the virtual computing component, a notification indicating that a computing resource allotted to the virtual computing component will be de-allocated;

receiving, from the virtual computing component, a request to delay de-allocation of the computing resource, wherein a second process of the application executes subsequent to the virtual computing component sending the communication; and delaying de-allocation of the computing resource based on the request from the virtual computing component.

2. The computer-implemented method of claim 1, further comprising determining, in response to receiving the request to delay de-allocation of the computing resource, that the virtual computing component has not exceeded a maximum number of requests to delay de-allocation of the computing resource.

3. The computer-implemented method of claim 1, further comprising determining, in response to receiving the request to delay de-allocation of the computing resource, that a maximum amount of time that de-allocation of the computing resource is permitted to be delayed has not been exceeded.

4. The computer-implemented method of claim 3, further comprising determining, by the virtual computing component, whether the maximum amount of time the virtual computing component is permitted delay de-allocation of the computing resource will provide enough time to finish execution of the second process.

5. The computer-implemented method of claim 1, further comprising:

receiving, from a computing device and prior to invocation of the application, a request to invoke the application; and sending, to the computing device after completion of the first process of the application, a notification that the first process of the application completed.

6. The computer-implemented method of claim 1, further comprising allocating the computing resource to the virtual computing component, wherein the computing resource comprises virtual central processing unit time.

7. The computer-implemented method of claim 1, further comprising:

sending, to the virtual computing component, a second notification indicating that the computing resource allotted to the virtual computing component will be de-allocated;

determining that no response to the second notification is received from the virtual computing component within a threshold period of time; and de-allocating the computing resource from the virtual computing component.

8. The computer-implemented method of claim 1, further comprising provisioning a virtual machine, wherein the virtual computing component comprises a container instantiated using an application image within the virtual machine.

9. A system comprising:

computer-readable memory; and one or more processors in communication with the computer-readable memory and configured by executable instructions to:

receive, from a virtual computing component executing on a host computing device, a communication that a first process of an application of the virtual computing component has completed execution, wherein the virtual computing component is allotted a set of computing resources for execution;

send, to the virtual computing component, a notification indicating that a computing resource allotted to the virtual computing component will be de-allocated;

receive, from the virtual computing component, a request to delay de-allocation of the computing resource, wherein a second process of the application executes subsequent to the virtual computing component sending the communication; and delay de-allocation of the computing resource based on the request from the virtual computing component.

10. The system of claim 9, wherein the one or more processors are further configured to determine, in response to receiving the request to delay de-allocation of the computing resource, that the virtual computing component has not exceed a maximum number of requests to delay de-allocation of the computing resource.

11. The system of claim 9, wherein the one or more processors are further configured to determine, in response to receiving the request to delay de-allocation of the computing resource, that a maximum amount of time that de-allocation of the computing resource is permitted to be delayed has not been exceeded.

12. The system of claim 11, wherein the virtual computing component is configured to determine whether the maximum amount of time the virtual computing component is permitted delay de-allocation of the computing resource will provide enough time to finish execution of the second process.

13. The system of claim 9, wherein the one or more processors are further configured to:

receive, from a computing device and prior to invocation of the application, a request to invoke the application; and send, to the computing device after completion of the first process of the application, a notification that the first process of the application completed.

14. The system of claim 9, wherein the one or more processors are further configured to allocate the computing resource to the virtual computing component, wherein the computing resource comprises virtual central processing unit time.

15. The system of claim 9, wherein the one or more processors are further configured to:

send, to the virtual computing component, a second notification indicating that the computing resource allotted to the virtual computing component will be de-allocated;

determine that no response to the second notification is received from the virtual computing component within a threshold period of time; and de-allocate the computing resource from the virtual computing component.

16. The system of claim 9, wherein the one or more processors are further configured to provision a virtual machine, wherein the virtual computing component comprises a container instantiated using an application image within the virtual machine.

17. A system comprising:

a set of host computing devices for on-demand execution of application code, wherein each of the set of host computing devices comprises computer-readable memory and one or more processors, and wherein the system is configured to at least:

receive, from a computing device, a request to execute an application that comprises a request-response process and a background process;

initialize execution of a virtual computing component on a host computing device, wherein the application executes within the virtual computing component, wherein the virtual computing component is provisioned with a set of computing resources, and wherein the request-response process executes using the set of computing resources;

receive a response from the virtual computing component, wherein the response comprises output of the request-response process;

send, to the computing device, a notification based on the request-response process;

send a first spin-down notification to the virtual computing component, wherein the first spin-down notification indicates the set of computing resources will be de-allocated from the virtual computing component;

receive, from the virtual computing component and prior to expiration of a first period of time, a request to delay de-allocation of the set of computing resources, wherein the virtual computing component sends the request to delay de-allocation of the set of computing resources based on the background process continuing to execute when the first spin-down notification is received;

send a second spin-down notification to the virtual computing component after expiration of a second period of time, wherein the second spin-down notification indicates the set of computing resources will be de-allocated from the virtual computing component;

determine, after a third period of time, that the virtual computing component has not requested delay of de-allocation of the set of computing resources; and cause de-allocation of the set of computing resources from the virtual computing component.

18. The system of claim 17, wherein the virtual computing component is permitted up to a maximum number of requests to delay de-allocation of the set of computing resources.

19. The system of claim 17, wherein the virtual computing component is permitted up to a maximum amount of time de-allocation of the set of computing resources is permitted to be delayed.

20. The system of claim 19, wherein the virtual computing component is configured to determine whether the maximum amount of time will provide enough time to finish execution of the background process.

* * * * *